United States Patent [19]

Erdman et al.

[11] Patent Number: 5,023,527

[45] Date of Patent: Jun. 11, 1991

[54] CONTROL CIRCUITS, ELECTRONICALLY COMMUTATED MOTOR SYSTEMS AND METHODS

[75] Inventors: David M. Erdman; James A. Beatty; Amritlal H. Patel, all of Fort Wayne, Ind.

[73] Assignee: General Electric Company, Fort Wayne, Ind.

[21] Appl. No.: 515,317

[22] Filed: Apr. 18, 1990

Related U.S. Application Data

[63] Continuation of Ser. No. 200,766, May 31, 1988, abandoned, which is a continuation-in-part of Ser. No. 15,409, Feb. 17, 1987, Pat. No. 4,763,347, which is a continuation-in-part of Ser. No. 463,147, Feb. 2, 1983, Pat. No. 4,654,566, which is a continuation-in-part of Ser. No. 412,421, Aug. 27, 1982, Pat. No. 4,449,079, which is a continuation of Ser. No. 141,267, Apr. 17, 1980, abandoned, which is a continuation-in-part of Ser. No. 77,656, Sep. 21, 1979, abandoned, which is a continuation-in-part of Ser. No. 802,484, Jun. 1, 1977, Pat. No. 4,169,990, which is a continuation-in-part of Ser. No. 729,761, Oct. 5, 1976, abandoned, which is a continuation-in-part of Ser. No. 482,409, Jun. 24, 1974, Pat. No. 4,005,347, which is a continuation-in-part of Ser. No. 482,407, Jun. 24, 1974, Pat. No. 4,015,182.

[51] Int. Cl.$^5$ ............................................. H02P 6/02
[52] U.S. Cl. .................................... 318/254; 318/138
[58] Field of Search ..................... 318/138, 254, 439

[56] References Cited

U.S. PATENT DOCUMENTS

| | | | |
|---|---|---|---|
| 3,096,467 | 7/1963 | Angus et al. | 318/138 |
| 3,152,462 | 10/1964 | Elliott et al. | 68/12 |
| 3,165,685 | 1/1965 | Manteuffel et al. | 318/138 |
| 3,216,226 | 11/1965 | Alger et al. | 68/23 |
| 3,274,471 | 9/1966 | Moczala | 318/138 |
| 3,284,692 | 11/1966 | Gautherin | 321/16 |
| 3,290,572 | 12/1966 | Hartmann et al. | 318/138 |
| 3,293,532 | 12/1966 | Dubin et al. | 321/18 |
| 3,304,481 | 2/1967 | Saussele | 318/138 |
| 3,329,852 | 7/1967 | Saussele et al. | 318/138 |
| 3,353,076 | 11/1967 | Haines | 318/138 |
| 3,359,474 | 12/1967 | Welch et al. | 318/138 |

(List continued on next page.)

FOREIGN PATENT DOCUMENTS 259174 1/1979 Argentina .
74713 10/1974 Australia .
81938 3/1982 Australia .

(List continued on next page.)

OTHER PUBLICATIONS

Gottleib, I., Switching Regulators & Power Supplies 1976, pp. 11-15, 71-73.

(List continued on next page.)

*Primary Examiner*—Bentsu Ro
*Attorney, Agent, or Firm*—Ralph E. Krisher, Jr.

[57] ABSTRACT

Control circuit for an electronically commutated motor which has a rotatable assembly and further has a stationary assembly with a plurality of winding stages having terminals for energization, and switches for applying a voltage to one or more of the terminals of the winding stages at a time and commutating the winding stages in a preselected sequence to rotate the rotatable assembly. A preselected sequence of winding stages are left correspondingly unpowered so that a plurality of the winding stages are unpowered at some time. The winding stages generate back emf signals and also couple electrical signals from each energized winding stage to the unpowered winding stages which signals can interfere with detection of back emf for position sensing purposes. The control circuit includes a first circuit for selecting at least two of the unpowered winding stages which have electrical signals coupled to them that have a predetermined relationship in polarity and magnitude. A second circuit produces an electrical output from the voltages on the winding stage terminals of the winding stages selected, so that the electrical signals coupled from each energized winding stage are substantially canceled when they have the predetermined relationship while the back emf is preserved for position sensing substantially free from interference from the electrical signals that are coupled from each energized winding stage to the unpowered winding stages. Other control circuits, electronically commutated motor systems and methods of control and operation are also disclosed.

143 Claims, 17 Drawing Sheets

U.S. PATENT DOCUMENTS

| | | | |
|---|---|---|---|
| 3,369,381 | 2/1968 | Crane et al. | 68/12 |
| 3,384,801 | 5/1968 | Rodgers | 318/334 |
| 3,449,297 | 3/1969 | Ruff et al. | 62/160 |
| 3,475,668 | 10/1969 | Mieslinger | 318/138 |
| 3,488,566 | 1/1970 | Fukuda | 318/138 |
| 3,531,702 | 9/1970 | Hill | 318/138 |
| 3,559,013 | 1/1971 | Burch et al. | 318/138 |
| 3,577,053 | 5/1971 | McGee | 318/254 |
| 3,577,057 | 5/1971 | Dyer | 318/328 |
| 3,581,173 | 5/1971 | Hood et al. | 318/254 |
| 3,599,062 | 8/1971 | Crane et al. | 318/281 |
| 3,603,161 | 9/1971 | Schwarz | 74/5.6 |
| 3,603,869 | 9/1971 | Neuffer et al. | 322/31 |
| 3,611,081 | 10/1971 | Watson | 318/138 |
| 3,628,110 | 12/1971 | Casaday | 318/138 |
| 3,633,084 | 1/1972 | Rakes | 318/254 |
| 3,634,873 | 1/1972 | Nishimura | 318/254 |
| 3,651,368 | 3/1972 | Hanada | 318/254 |
| 3,663,878 | 5/1972 | Miyasaka | 318/254 |
| 3,689,815 | 9/1972 | Thibaut | 318/281 |
| 3,696,277 | 10/1972 | Liska et al. | 318/138 |
| 3,696,278 | 10/1972 | Kuniyoshi et al. | 318/138 |
| 3,700,987 | 10/1972 | Deering | 318/227 |
| 3,733,540 | 5/1973 | Hawkins | 321/47 |
| 3,766,458 | 10/1973 | Nishimura et al. | 318/313 |
| 3,775,648 | 11/1973 | Brown et al. | 318/138 |
| 3,780,363 | 12/1973 | Doemen et al. | 318/254 |
| 3,783,307 | 1/1974 | Breuer | 307/243 |
| 3,783,357 | 1/1974 | Ichiyanage | 318/138 |
| 3,783,359 | 1/1974 | Malkiel | 318/254 |
| 3,794,895 | 2/1974 | Coupin et al. | 318/254 |
| 3,803,863 | 4/1974 | Jednacz et al. | 62/209 |
| 3,806,785 | 4/1974 | DeValroger et al. | 318/138 |
| 3,824,446 | 7/1974 | Forster et al. | 321/12 |
| 3,829,661 | 10/1974 | Wada | 318/138 |
| 3,829,749 | 8/1974 | Richt | 318/331 |
| 3,831,073 | 8/1974 | Tanikoshi | 318/254 |
| 3,849,718 | 11/1974 | Förster et al. | 321/40 |
| 3,875,463 | 4/1975 | Reuter et al. | 317/13 R |
| 3,877,243 | 4/1975 | Kramer | 62/180 |
| 3,894,277 | 7/1975 | Tachibana et al. | 318/138 |
| 3,896,348 | 7/1975 | Loderer | 318/227 |
| 3,896,357 | 7/1975 | Tanikoshi | 318/254 |
| 3,898,544 | 8/1975 | Tanikoshi | 318/254 |
| 3,906,320 | 9/1975 | Doemen | 318/331 |
| 3,932,793 | 1/1976 | Muller | 318/138 |
| 3,938,014 | 2/1976 | Nakajima | 318/138 |
| 3,942,083 | 3/1976 | Takahashi et al. | 318/138 |
| 3,942,083 | 3/1976 | Takahashi et al. | 318/138 |
| 3,969,658 | 7/1976 | Htsui | 318/202 |
| 3,986,086 | 10/1976 | Muller | 318/138 |
| 3,997,823 | 12/1976 | Machida | 318/138 |
| 3,999,108 | 12/1976 | Tanikoshi | 318/138 |
| 4,004,202 | 1/1977 | Davis | 318/138 |
| 4,011,487 | 3/1977 | Loomis | 318/138 |
| 4,016,468 | 4/1977 | Graf | 318/434 |
| 4,024,725 | 5/1977 | Uchida et al. | 62/176 |
| 4,025,833 | 5/1977 | Lawton | 318/221 |
| 4,025,835 | 5/1977 | Wada | 318/254 |
| 4,027,215 | 5/1977 | Knight et al. | 318/341 |
| 4,030,005 | 6/1977 | Doemen | 318/138 |
| 4,047,081 | 9/1977 | Liska | 318/138 |
| 4,051,417 | 9/1977 | Fujinawa et al. | 318/138 |
| 4,064,443 | 12/1977 | Yamada et al. | 318/331 |
| 4,078,198 | 3/1978 | Murakoshi et al. | 318/282 X |
| 4,080,553 | 3/1978 | Lyman | 318/138 |
| 4,103,216 | 7/1978 | Hayes | 318/685 |
| 4,132,930 | 2/1979 | Schalk | 318/238 |
| 4,151,450 | 4/1979 | Fukuma et al. | 318/317 |
| 4,162,435 | 7/1979 | Wright | 318/138 |
| 4,167,692 | 9/1979 | Sekiya et al. | 318/138 |
| 4,175,409 | 11/1979 | Morey | 68/4 |
| 4,227,106 | 10/1980 | Druss et al. | 310/184 |
| 4,232,536 | 11/1980 | Koseki et al. | 68/12 R |
| 4,233,548 | 11/1980 | Kirtley, Jr. | 318/138 |
| 4,233,549 | 11/1980 | Dighe | 318/317 |
| 4,238,717 | 12/1980 | Knight et al. | 318/341 |
| 4,241,434 | 12/1980 | Shida et al. | 318/138 X |
| 4,250,435 | 2/1981 | Alley et al. | 318/138 |
| 4,250,544 | 2/1981 | Alley | 346/110 |
| 4,255,696 | 3/1981 | Field, II | 318/696 |
| 4,270,074 | 5/1981 | Duckworth et al. | 318/254 |
| 4,275,343 | 6/1981 | Fulton et al. | 318/721 |
| 4,282,464 | 8/1981 | Uzuka | 318/138 |
| 4,282,471 | 8/1941 | Budniak et al. | 318/685 |
| 4,292,573 | 9/1981 | Ebert et al. | 318/138 |
| 4,327,302 | 4/1982 | Hershberger | 310/156 |
| 4,346,434 | 8/1982 | Morinaga | 364/183 |
| 4,348,621 | 9/1982 | Hyldal | 318/138 X |
| 4,368,411 | 1/1983 | Kidd | 318/254 |

(List continued on next page.)

U.S. PATENT DOCUMENTS

| | | | |
|---|---|---|---|
| 4,390,826 | 6/1983 | Erdman et al. | 318/439 |
| 4,403,177 | 9/1983 | Weber et al. | 318/254 |
| 4,409,526 | 10/1983 | Yamauchi et al. | 318/254 |
| 4,415,844 | 11/1983 | Mendenhall et al. | 318/254 |
| 4,423,343 | 12/1983 | Field, II | 310/49 R |
| 4,429,262 | 1/1984 | Utenick | 318/254 |
| 4,459,519 | 7/1984 | Erdman | 318/254 |
| 4,479,078 | 10/1984 | Kidd et al. | 318/254 |
| 4,491,770 | 1/1985 | Gotou | 318/254 |
| 4,491,771 | 1/1985 | Kimura | 318/254 |
| 4,491,772 | 1/1985 | Bitting | 318/254 |
| 4,494,051 | 1/1985 | Bailey | 318/254 |
| 4,494,055 | 1/1985 | Bitting et al. | 318/254 |
| 4,495,450 | 1/1985 | Tokizaki et al. | 318/138 |
| 4,499,408 | 2/1985 | Bitting et al. | 318/254 |
| 4,500,821 | 2/1985 | Bitting et al. | 318/254 |
| 4,510,422 | 4/1985 | Ogura | 318/254 |
| 4,528,485 | 7/1985 | Boyd, Jr. | 318/138 |
| 4,540,921 | 9/1985 | Boyd, Jr. et al. | 318/254 |
| 4,544,868 | 10/1985 | Murty | 318/254 |
| 4,560,909 | 12/1985 | Peil | 315/291 |
| 4,580,082 | 4/1986 | Guerin-Pinaud | 318/138 X |
| 4,588,933 | 5/1986 | Sun | 318/138 X |
| 4,595,865 | 6/1986 | Jahns | 318/138 X |
| 4,603,283 | 7/1986 | Oltendorf | 318/254 |
| 4,629,959 | 12/1986 | Okuyama et al. | 318/727 |
| 4,631,458 | 12/1986 | Furuichi | 318/254 |
| 4,633,150 | 12/1986 | Inaji et al. | 318/254 |
| 4,636,936 | 1/1987 | Boyd, Jr. et al. | 346/148 |
| 4,641,066 | 2/1987 | Nagata et al. | 318/254 |
| 4,642,536 | 2/1987 | Boyd, Jr. et al. | 318/254 |
| 4,642,537 | 2/1987 | Young | 318/254 |
| 4,654,566 | 3/1987 | Erdman | 318/254 |
| 4,667,480 | 5/1987 | Bessler | 62/180 |
| 4,678,973 | 7/1987 | Elliott et al. | 318/254 |
| 4,686,436 | 8/1987 | Archer | 318/254 |
| 4,687,977 | 8/1987 | Brahmavar et al. | 318/492 |
| 4,692,674 | 9/1987 | Packard et al. | 318/254 |
| 4,694,210 | 9/1987 | Elliott et al. | 310/68 R |
| 4,712,050 | 12/1987 | Nagasawa et al. | 318/254 |
| 4,743,815 | 5/1988 | Gee et al. | 318/254 |
| 4,752,724 | 6/1988 | Radziwill et al. | 318/254 |
| 4,763,347 | 8/1988 | Erdman | 318/254 |
| 4,780,651 | 10/1988 | Nakano et al. | 318/138 X |

FOREIGN PATENT DOCUMENTS

| | | | |
|---|---|---|---|
| 926464 | 5/1973 | Canada | 318/320 |
| 1035008 | 7/1978 | Canada | 318/90 |
| 1040287 | 10/1978 | Canada | 341/28 |
| 1082302 | 7/1980 | Canada . | |
| 1140658 | 2/1983 | Canada | 342/19.4 |
| 1199997 | 1/1986 | Canada . | |
| 2865/75 | 7/1975 | Denmark . | |
| 38694 | 10/1981 | European Pat. Off. | 6/2 |
| 146673 | 7/1985 | European Pat. Off. | 6/2 |
| 218017 | 4/1987 | European Pat. Off. | 6/2 |
| 1238998 | 4/1967 | Fed. Rep. of Germany . | |
| 1800557 | 5/1970 | Fed. Rep. of Germany . | |
| 1806620 | 5/1970 | Fed. Rep. of Germany . | |
| 1613776 | 11/1971 | Fed. Rep. of Germany | 7/44 |
| 2129272 | 12/1971 | Fed. Rep. of Germany . | |
| 2164685 | 7/1972 | Fed. Rep. of Germany . | |
| 1610045 | 8/1974 | Fed. Rep. of Germany | 29/4 |
| 2834523 | 2/1980 | Fed. Rep. of Germany . | |
| 1374991 | 9/1964 | France . | |
| 1405208 | 5/1965 | France . | |
| 2009348 | 1/1970 | France . | |
| 2239796 | 2/1975 | France . | |
| 2367373 | 5/1978 | France . | |
| 2540308 | 3/1984 | France . | |
| 1044299 | 5/1979 | Italy . | |
| 21502-A/63 | 7/1983 | Italy . | |
| 1087762 | 6/1985 | Italy . | |
| 98755 | 4/1986 | Japan . | |
| 1396865 | 8/1987 | Japan . | |
| 1358404 | 7/1974 | United Kingdom . | |
| 1510876 | 5/1978 | United Kingdom . | |
| 2068664A | 8/1981 | United Kingdom . | |
| 2119185 | 11/1983 | United Kingdom . | |
| 2134731 | 7/1987 | United Kingdom . | |
| 2176067 | 7/1987 | United Kingdom . | |
| 2176068 | 7/1987 | United Kingdom . | |

OTHER PUBLICATIONS

Liska, M., "Simotron K, drehzahlgereglte Kleinantribe mit Elektronikmotoren fur industrielle Anwendungen, pp. 274–275 (with translation).

Electro-Craft Corporation, "DC Motors Speed Controls Servo Systems", 1978, pp. 4-32 to 4-39, 5-86 to 5-93, 5-100, 6-1 to 6-15, 6-17, 6-29.

Revankar, G. N., et al., "Present Trends in Line-Current Harmonic Reduction in Single-Phase Thyristor Converters", J. Inst. Elect. & Telecom. Eng., vol. 25, No. 8 (Aug. 1979), pp. 349–355.

Intel Corporation, "MSC-48 Family of Single Chip Microcomputers User's Manual", Sep., 1981, pp. 2-2, 4-5.

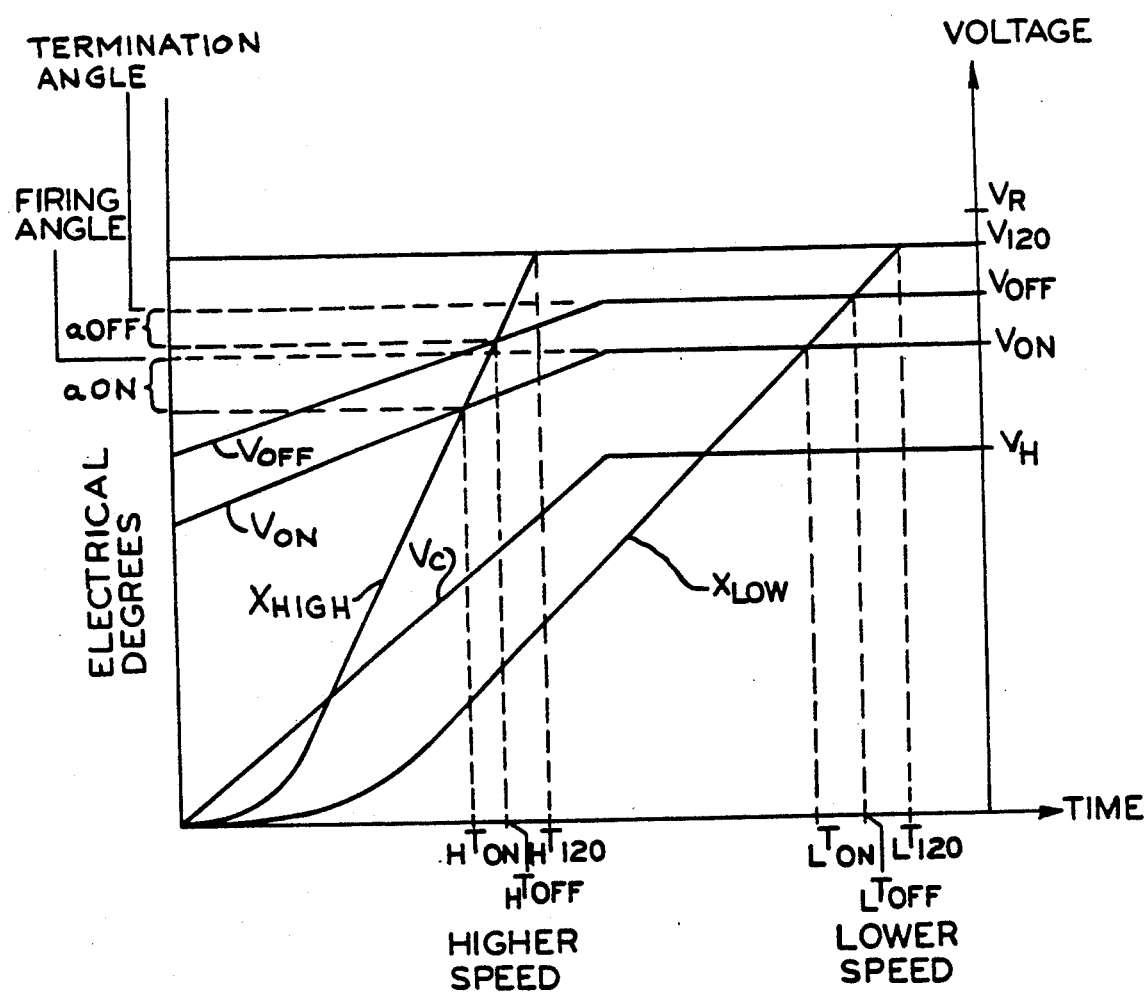
FIG_7

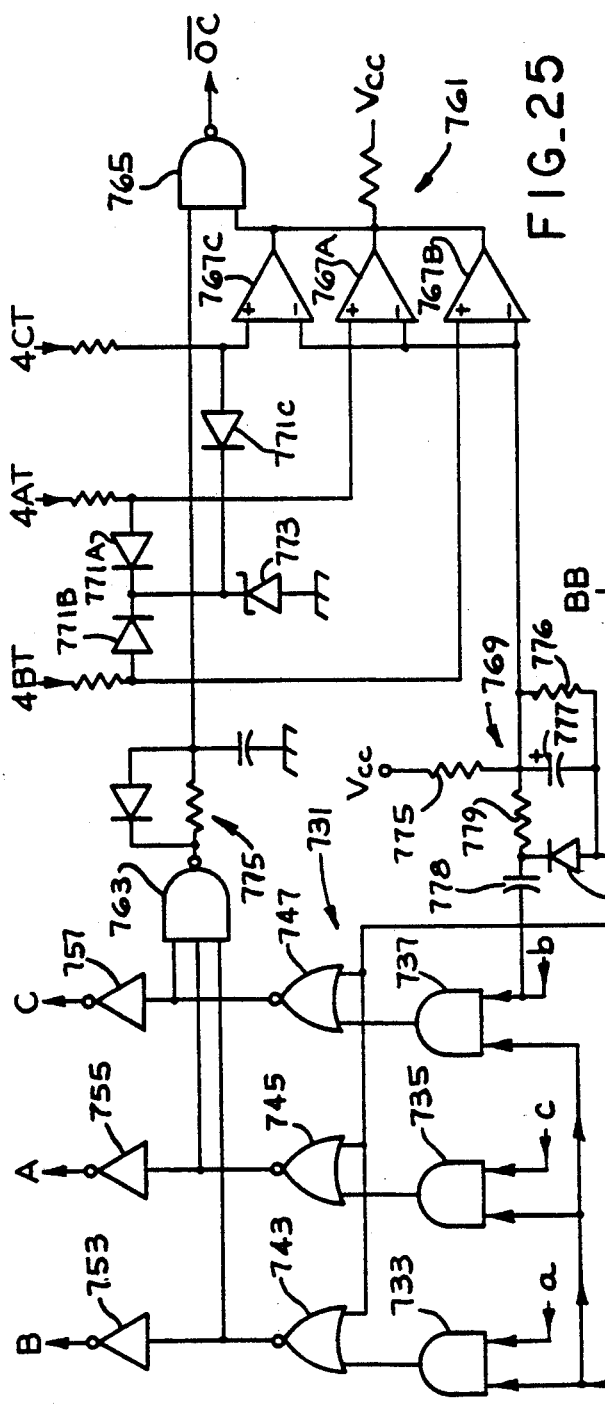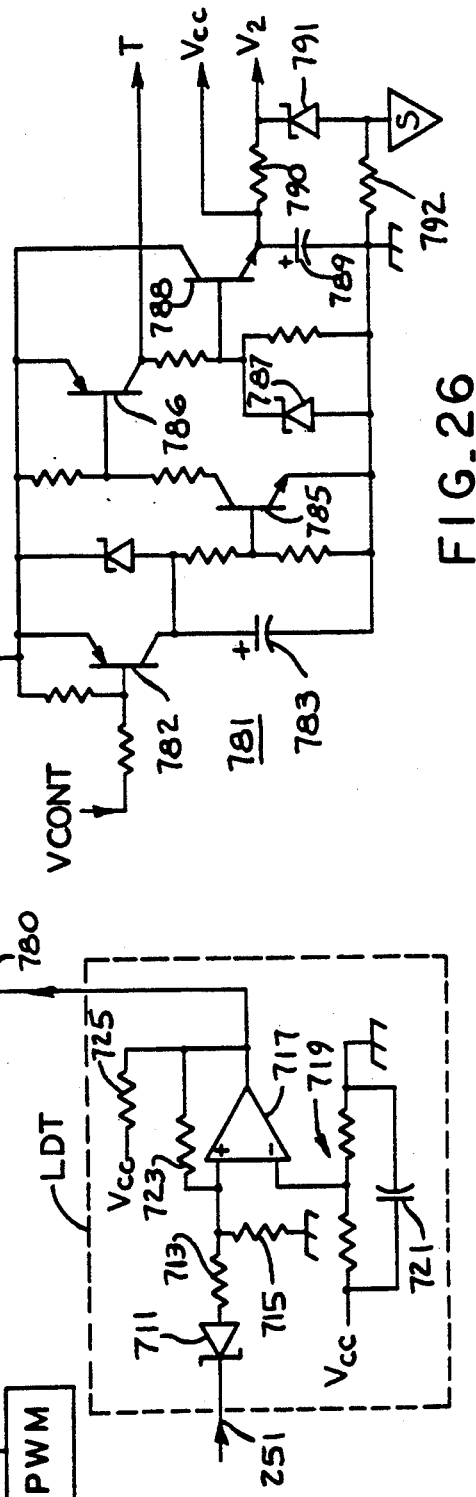

CONTROL CIRCUITS, ELECTRONICALLY COMMUTATED MOTOR SYSTEMS AND METHODS

CROSS-REFERENCE TO RELATED APPLICATIONS

This is a continuation of co-pending application Ser. No. 07/200,766 filed on May 31, 1988, now abandoned, which is a continuation-in-part of copending application Ser. No. 015,409 filed Feb. 17, 1987 now U.S. Pat. No. 4,763,374, which is a continuation-in-part of Ser. No. 463,147 filed Feb. 2, 1983 (now U.S. Pat. No. 4,654,566) which is a continuation-in-part of Ser. No. 412,421 filed Aug. 27, 1982 (now U.S. Pat. No. 4,449,079) which is a continuation of application Ser. No. 141,267 filed Apr. 17, 1980 (now abandoned) which is a continuation-in-part of application Ser. No. 077,656 filed Sept. 21, 1979 (now abandoned) which is a continuation-in-part of application Ser. No. 802,484 filed June 1, 1977 (now U.S. Pat. No. 4,169,990) which is a continuation-in-part of application Serial No. 729,761 filed Oct. 5, 1976 (now abandoned) which is a continuation-in-part of applications Ser. No. 482,409 filed June 24, 1974 (now U.S. Pat. No. 4,005,347) and Ser. No. 482,407 filed June 24, 1974 (now U.S. Pat. No. 4,015,182). Each of the aforementioned applications and patents are commonly assigned and the entire disclosures thereof are respectively incorporated by reference herein.

NOTICE

Copyright © 1988 General Electric Company. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates in general to control circuits and application systems for dynamoelectric machines and other electrical systems and to methods of their control and operation. More particularly, this invention relates to control circuits for electrical apparatus and systems such as electronically commutated motor systems, electronically commutated motor systems themselves and methods of control and operation.

BACKGROUND OF THE INVENTION

Without limiting the intended applications of the invention for all electrical systems which need improved control circuits and methods of operation and all applications generally to which the features and advantages of the invention commend it, the background of the invention is discussed in regard to a relatively specific example of controls for electronically commutated motors.

While conventional brush-commutated DC motors may have advantageous characteristics, including convenience of changing operational speeds, there may be disadvantages such as brush wear, electrical loss, noise and radio frequency interference caused by sparking between the brushes and the segmented commutator, which may limit the applicability of such brush-commutated DC motors in some fields such as the automotive and domestic appliance fields, for example. Electronically commutated motors, such as brushless DC motors and permanent magnet motors with electronic commutation, have now been developed and generally are believed to have the above discussed advantageous characteristics of the brush-commutated DC motors without many of the disadvantages thereof while also having other important advantages. These electronically commutated motors are advantageously employed, for instance, in air conditioning for cooling and warming of vehicular compartments and also in laundering apparatus. While there are some losses engendered by electronic switching of an electronically commutated motor, these are negligible compared to brush losses and rheostat losses in prior art variable speed systems.

Some circuits and electronically commutated motors are disclosed in coassigned Wright U.S. Pat. No. 4,162,435, in coassigned Boyd U.S. Pat. No. 4,528,485, in coassigned Boyd et al. U.S. Pat. Nos. 4,540,921, 4,636,936 and 4,642,536, in Alley U.S. Pat. No. 4,250,544, Alley et al. U.S. Pat. No. 4,250,435, Bitting et al. U.S. Pat. No. 4,500,821, in Young U.S. Pat. No. 4,642,537 and Archer U.S. Pat. No. 4,686,436. All of the foregoing coassigned U.S. Patents are hereby incorporated herein by reference. While the aforementioned coassigned patents, for instance, undoubtedly illustrated many features, it is believed that the control circuits for electronically commutated motors in general and for other applications could be even further improved, as well as the methods of control utilized therein.

Further improvements in control systems, electronically commutated motor systems, and methods of control and operation can beneficially contribute to more widespread use of such motors in their various applications. For example, improvements directed to increased noise immunity, fail-safe operation, economy of manufacture and greater versatility of response to various signal conditions generally would be desirable.

SUMMARY OF THE INVENTION

Among the objects of this invention are to provide improved control circuitry for electrical systems, improved electronically commutated motor systems, and improved methods of control and operation which provide increased noise immunity; to provide improved control circuitry for electrical systems, improved electronically commutated motor systems, and improved methods of control and operation having enhanced fail-safe features; to provide improved control circuitry for electrical systems, improved electronically commutated motor systems, and improved methods of control and operation having greater versatility of response to various signal conditions; and to provide improved control circuitry for electrical systems, improved electronically commutated motor systems, and improved methods of control and operation that are reliable and economical to manufacture.

Generally and in one form of the invention, a control circuit is provided for an electronically commutated motor which has a rotatable assembly and further has a stationary assembly with a plurality of winding stages having terminals for energization, and switching means for applying a voltage to one or more of the terminals of the winding stages at a time and commutating the winding stages in a preselected sequence to rotate the rotatable assembly. A preselected sequence of winding stages are left correspondingly unpowered so that a plurality of the winding stages are unpowered at some time. The winding stages generate back emf signals and also couple electrical signals from each energized winding stage to the unpowered winding stages which signals can interfere with detection of back emf for position sensing purposes. The control circuit includes a first circuit for selecting at least two of the unpowered winding stages which have electrical signals coupled to them that have a predetermined relationship in polarity and magnitude. A second circuit produces an electrical output from the voltages on the winding stage terminals of the winding stages selected, so that the electrical signals coupled from each energized winding stage are substantially canceled when they have the predetermined relationship while the back emf is preserved for position sensing substantially free from interference from the electrical signals that are coupled from each energized winding stage to the unpowered winding stages.

In general, another form of the invention is a control circuit including a commutating circuit that applies a voltage from the power source to energize an electronically commutated motor so that a winding stage is temporarily powered and another winding stage is temporarily unpowered, terminates the application of voltage to a temporarily powered winding stage in response to a first control signal and advances in a commutation sequence in response to a second control signal to effect rotation of the rotatable assembly. Another circuit responds to the terminal voltage of a temporarily unpowered winding stage to produce a sensing output which is a function of angular position of the rotatable assembly. A first electrical level is established to represent a first position of the rotatable assembly at which a temporarily powered winding stage is to be deenergized, and a second electrical level represents a second position of the rotatable assembly at which the commutating circuit is to advance in the sequence. A comparing circuit compares the sensing output with the first and second electrical levels to produce the first and second control signals for the commutating circuit when the first and second positions are respectively reached by the rotatable assembly.

In general, still another form of the invention is a control circuit including a set of bistables for the winding stages of an electronically commutated motor. Each bistable has a first state for powering a respective winding stage in response to a first control signal and a second state for terminating the application of voltage to the same winding stage in response to a second control signal. Also included is further controlling circuitry for generating a sequence of electrical signals to determine which of the bistables shall receive the first control signal and which of the bistables shall receive the second control signal, and the controlling circuitry is responsive to a third control signal to advance in the sequence. Sensing circuitry responds to the terminal voltage of at least one temporarily unpowered winding stage to produce a sensing output which is a function of angular position of the rotatable assembly. A comparing circuit compares the sensing output with first, second and third electrical levels to respectively produce the first and second control signals for the bistables and the third control signal for the further controlling circuitry.

Generally, yet another form of the invention is a control circuit with a sensing circuit responsive to the terminal voltage of at least one winding stage for producing a sensing output which is a function of angular position of the rotatable assembly. The sensing output has a variable frequency which depends on the speed of the rotatable assembly. A comparing circuit compares the sensing output with a first electrical level to produce a first control signal for commutation purposes. A second circuit generates a varying second electrical level representing a varying value beginning with an initial value, resets the second electrical level to the initial value in response to the first control signal and resumes generating the varying second electrical level which thereby depends on the frequency of the sensing output that results from the speed of the rotatable assembly. The comparing circuit also compares the sensing output with the second electrical level to produce a second commutation control signal.

In general, an additional form of the invention is a control circuit including a shift register circuit having a serial input, a set of parallel inputs, a control input to select the serial input or parallel inputs for entry, and outputs for supplying a parallel digital signal representing a commutation in the sequence. The shift register circuit is to be protected from electrical interference which could cause the outputs to supply a parallel digital signal unrepresentative of any commutation in the sequence. Another circuit supplies a parallel digital signal representing a particular commutation in the sequence to the set of parallel inputs of the shift register circuit. The shift register circuit has its control input connected to respond to at least one of the outputs, and its serial input connected to respond to at least one of the outputs so that if any unrepresentative parallel digital signal appears at the outputs which does not represent any commutation in the sequence, the unrepresentative parallel digital signal is replaced by another parallel digital signal representing a commutation in the sequence when the shift register circuit is next clocked.

Generally, another additional form of the invention is a control circuit for an electronically commutated motor and is used with a position sensor for repeatedly generating a sensing signal generally representative of rotation of the rotatable assembly. The control circuit has a circuit for frequency dividing oscillator pulses to supply lower frequency pulses. The frequency dividing circuit has a reset input for repeated resetting by the sensing signal, so that when the rotatable assembly is turning at least as fast as a predetermined spin rate the sensing signal is generated at a repetition rate for resetting that prevents the lower frequency pulses from being supplied and otherwise allows the lower frequency pulses to be supplied when the sensing signal is generated at a lower repetition rate. Another circuit responds to the lower frequency pulses when they occur to produce an electrical signal generally representing an accumulated number of the lower frequency pulses. A further circuit compares with a predetermined value the electrical signal representing the accumulated number of the lower frequency pulses, and supplies a disabling signal for a predetermined period of time for disabling commutation of the motor after the predetermined value is reached by the electrical signal, to prevent energization of the motor during that predetermined period of time.

In general, a further form of the invention is a control circuit for apparatus to be powered by a power source having a source voltage which is supposed to be in a range between a lower voltage limit and a higher voltage limit. The control circuit includes a first circuit for deriving a first voltage from the source voltage as a first function of the source voltage and a second circuit for deriving a second voltage from the source voltage as a second function of the source voltage, wherein the second voltage is equal to the first voltage only at the lower voltage limit and the higher voltage limit. A comparing circuit is connected to the first and second deriving circuits and compares the first and second voltages to produce a control signal for the apparatus to be powered, the control signal indicating whether the source voltage is within or outside the range.

Generally, a yet further form of the invention is a control circuit for an electronically commutated motor that is to be compatible with alternative external control devices indicating desired speed. The control circuit includes a circuit for generating pulse width modulated pulses to control switching devices for the motor, the pulses modulated in width as a function of an analog speed control signal. A second circuit supplies the analog speed control signal with respect to a common to the circuit for generating the pulse width modulated pulses. The second circuit has a capacitor and an active device circuit with an input resistively connected to a terminal for a voltage source, the input also for connection to any of the external control devices, and an output resistively connected to the capacitor so that the capacitor develops the analog speed control signal when the input of the active device circuit is connected to any of the following external control devices: A) pulse generator with a duty cycle representative of desired speed, B) variable voltage source representative of desired speed, or C) variable resistance representative of desired speed.

In general, a further additional form of the invention is a control circuit for use with an electrical load and a power source with a switching section therebetween, wherein the power source has a source voltage which is subject to a transient substantially in excess of a normal value of the source voltage. The control circuit includes a first control section for producing a varying first electrical signal for the switching section to repeatedly connect and disconnect the electrical load to and from the power source in normal operation. Further included is a second control section responsive to the transient in the source voltage when the transient occurs and connected to the first control section for overriding the first control section so that the first electrical signal is forced to a level to make the switching section connect the electrical load to the power source for the duration of the transient.

Generally, a yet further additional form of the invention is a control circuit for use with an electronically commutated motor and solid state switches for applying a source voltage to one or more of the terminals of the winding stages at a time, the solid state switches having a saturation voltage depending on current flowing through them when conducting. The control circuit includes a commutating circuit for generating commutation pulses in a preselected sequence to make the solid state switches conduct and commutate the winding stages in a preselected sequence to rotate the rotatable assembly. The repetition rate of the commutation pulses is related to the speed of the rotatable assembly. Further circuitry responds to the commutation pulses to supply a variable electrical level which varies in magnitude as a function of the repetition rate of the commutation pulses, the electrical level representing a current limit for the motor as a function of motor speed. A disabling signal is produced for the commutating circuit when the saturation voltage across the switches exceeds the variable electrical level in magnitude, whereby current for the motor is limited as a function of motor speed.

The invention comprehends electronically commutated motor systems improved to include control circuits as described above and other improvements. Also, various methods of the invention involve steps for accomplishing various aspects of control and operation of the circuits described above.

Other objects and features will be in part apparent and in part pointed out hereinafter.

BRIEF DESCRIPTION OF THE DRAWINGS

FIG. 7 is a voltage-versus-time diagram of waveforms including advancement capacitor voltage, voltages from Firing Angle and Termination Angle potentiometers, and integrator output X at a low motor speed and a higher motor speed in the circuit of FIG. 5, illustrating further inventive operations of the control circuit of FIG. 1 according to methods of the invention, the diagram having a second vertical axis for rotor angular position corresponding to the vertical axis for voltage;

FIG. 25 is a schematic diagram of inventive commutation logic, inventive load dump transient protective circuitry, and inventive autoprotective overcurrent sensing circuitry operating by methods of the invention and for use with the circuitry of FIGS. 10, 12 and 13;

FIG. 26 is a schematic diagram of inventive power supply circuitry operating by methods of the invention and for use with the circuitry of FIGS. 10, 12, 13, 19, 22 and 25.

Corresponding reference characters indicate corresponding parts throughout the several views of the drawings. A symbol "/" herein represents the logical complement of a digital logic signal where the context indicates.

DETAILED DESCRIPTION OF PREFERRED EMBODIMENTS

Figure 1:
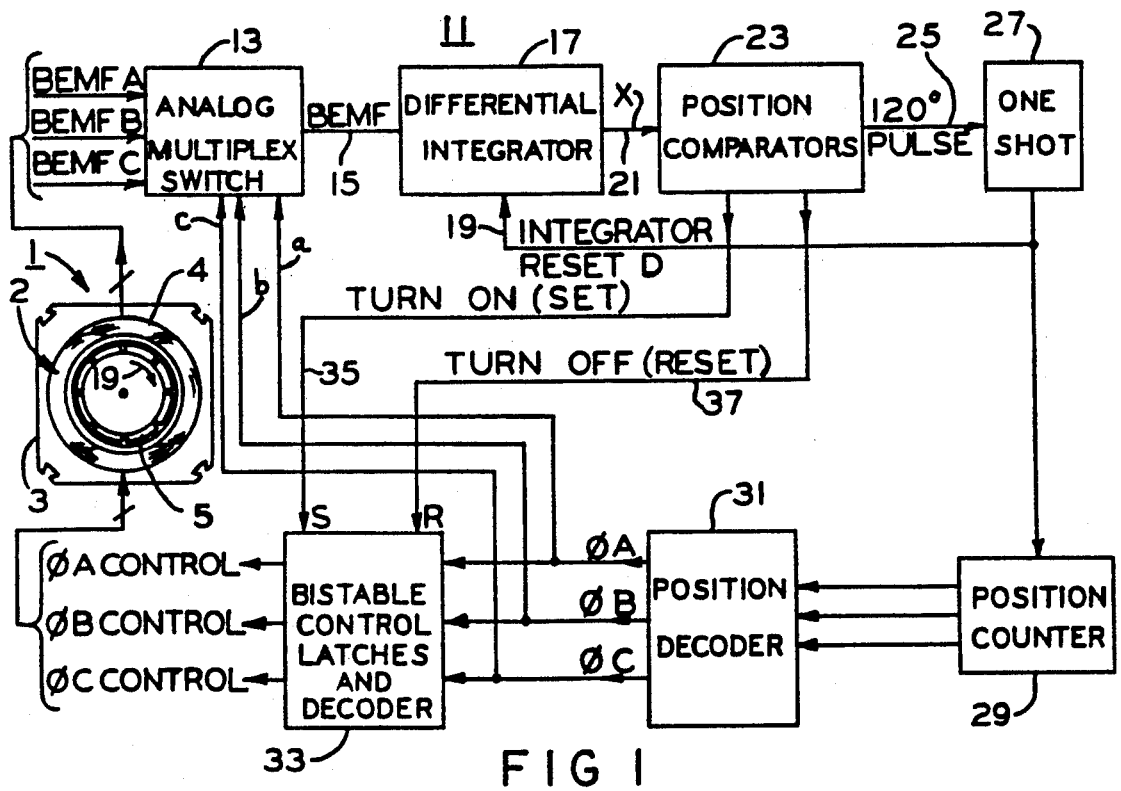
FIG. 1 is a block diagram of an electronic control circuit of the invention in an electronically commutated motor system of the invention.
Figure 2:
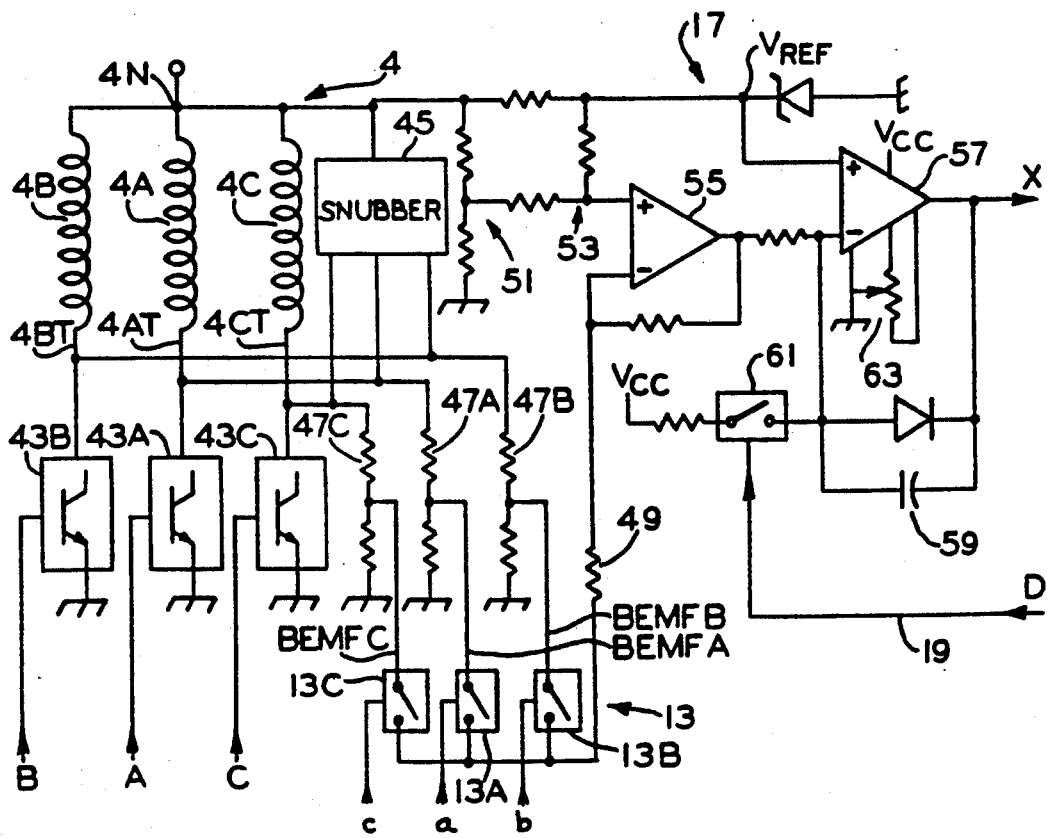
FIG. 2 is a schematic diagram of inventive circuitry in part of the system of FIG. 1.

In FIG. 1 an electronically commutated motor 1 has a stationary armature or assembly 2 with a core 3 and energizable wye-connected winding stages 4 such as the three winding stages also shown in FIGS. 1 and 2 of grandparent case Ser. No. 463,147 incorporated by reference herein. The winding stages 4 are arranged to establish a predetermined number P of magnetic poles, where P = 8, for instance. A permanent magnet rotor 5, illustratively having 8 magnets with alternating north and south poles facing the stationary assembly 2, is adapted to rotate as a rotatable assembly in response to the magnetic poles established by the winding stages. (An alternative motor with inside-out construction, not shown, has an exterior permanent magnet rotor and an interior stator with the winding stages wound thereon.)

A control circuit 11 in FIG. 1 is connected to the motor 1 to form an electronically commutated motor system. Control circuit 11 has an analog multiplexer 13 connected to the winding stages 4 that switches a selected one or more sensing lines for back EMF (counter electromotive force) designated BEMF A, BEMF B, and BEMF C. The analog multiplexer 13 operates in response to three position control signals OA, OB, and OC on respective lines a, b, and c. The one or more selected sensing lines from analog multiplexer 13 are switched to a BEMF path 15 to a differential integrator 17. The integrator 17 is reset by an integrator reset signal D on a line 19 at each commutation. The output of the integrator 17 is a voltage X which varies as a function of angular position 19 of the rotatable assembly 5 of the electronically commutated motor 1.

The output of integrator 17 is supplied on a line 21 to position comparators 23. There, it is determined when commutation should advance in a sequence of commutation by supplying a pulse on a line 25 to a one shot circuit 27. The one shot circuit 27 produces a pulse which acts as reset signal D on line 19 to reset the integrator 17. This same pulse D is also provided to a position counting circuit 29 which provides three outputs to a position decoder circuit 31. The position decoder circuit 31 supplies the position control signals OA, OB, and OC as three decoded outputs for the analog multiplexer 13 and for a further bistable circuit 33 that has more decoding circuitry and a set of control latches, or flip-flops. Bistable circuit 33 provides control signals OA Control, OB Control, and OC Control for switching the winding stages 4 and thereby energizing motor 1.

The latches in bistable circuit 33 are set and reset in response to TURN ON signals on a set S line 35 and TURN OFF signals on a reset R line 37. The TURN ON and TURN OFF signals are provided from position comparators circuit 23. In this way the initiation and termination of control signals OA Control, OB Control, and OC Control are precisely and adjustably determined by means of circuits 23 and 33.

In FIG. 2 examples of analog multiplexer 13 and differential integrator 17 of FIG. 1 are detailed with their connections to winding stages 4. Individual winding stages 4A, 4B, and 4C are connected together at a neutral 4N which is connected to a power supply or source (not shown) of a voltage B+. Each of the winding stages 4A, 4B, and 4C have respective winding stage terminals 4AT, 4BT, and 4CT, where it is to be understood that "terminal" refers to a conductive portion at an end of a winding stage, and does not necessarily denote a separate electrical component. A snubber circuit 45 partially dissipates and partially returns power to supply voltage B+ from the terminals of winding stages 4A, 4B and 4C when commutation occurs. An example of snubber circuit 45 is described in connection with FIG. 10.

A set of switches 43A, 43B, and 43C are connected respectively between the winding stage terminals 4AT, 4BT, and 4CT and a common which completes a return to the source of voltage. The switches connected to the winding stages in this way provide a half bridge configuration. In this way when any of control signals OB CONTROL, OA CONTROL and OC CONTROL on lines B, A, and C goes high, the corresponding electronic switch 43B, 43A, or 43C is made conductive and energizes its corresponding winding stage 4B, 4A, or 4C.

The winding stage terminals 4AT, 4BT, and 4CT are also connected to corresponding voltage dividers 47A, 47B, and 47C for back EMF sensing. A suitable voltage division ratio is provided to make the outputs of the voltage dividers compatible in level with integrated circuitry. Back EMF signals BEMF A, BEMF B, and BEMF C are thus supplied on correspondingly marked lines to three analog switches 13A, 13B, and 13C which operate as analog multiplexing circuit 13. Analog switches 13C, 13A, and 13B are controlled by signals OC, OA, and OB of FIG. 1 on lines c, a, and b respectively. Only one of the switches in the analog multiplexer 13 is activated at any given time for an unpowered winding stage in the embodiment of FIG. 2, while none, one or two of lines B, A and C may be high simultaneously to control switches 43B, 43A and 43C.

The outputs of the three analog switches 13A, 13B, and 13C are connected together to a resistor 49 which is connected to the inverting "−" input of a differential operational amplifier 55. Operational amplifier 55 is connected to amplify the difference between the back EMF voltage at the output of the analog multiplexer 13 and a voltage which is proportional to the voltage B+ at neutral 4N by the same proportion as voltage dividers 47A, 47B, and 47C provide for the voltages at terminals 4AT, 4BT and 4CT. A voltage divider 51 provides the voltage division for the neutral voltage from source voltage B+ which is connected through the voltage divider 51 and a resistance network 53 to the non-inverting "+" input of the operational amplifier 55. A Zener regulated voltage $V_{REF}$ is summed by resistance network 53 with the approximated neutral voltage from voltage divider 51 to bias the input voltage about halfway between ground and supply voltage $V_{CC}$ for operational amplifier 55 so that the input common mode voltage is within the operating range of amplifier 55.

The output of operational amplifier 55 is resistively connected to the inverting "−" input of a second operational amplifier 57 which is connected as an integrating amplifier with the amplifier 57 having an integrating capacitor 59 connected between the output and the inverting input. The inverting input is also connected by an analog switch 61 to a positive voltage $V_{CC}$ that exceeds $V_{REF}$ for resetting purposes. Analog switch 61 is made conductive when integrator reset voltage D goes high on line 19. Operational amplifier 57 is also supplied with the Zener regulated voltage $V_{REF}$ at its non-inverting "+" input to reference it compatibly with the operational amplifier 55. A potentiometer 63 trims the offset voltage for integrating amplifier 57 so that with zero differential voltage on the input side of the integrator, integration is negligible in either direction. Output X of the integrator operational amplifier 57 supplies position comparators 23 of FIG. 1 as described later hereinbelow in connection with FIG. 5. In this way, motor 1 has winding stages 4 connected at a neutral 4N. A voltage divider 51 for the neutral 4N provides a voltage generally proportional to the voltage on the neutral to integrator 17 to produce sensing output X. Analog switches 13A–C act as an example of an electronically controlled switch means responsive to the electrical signals from a circuit (e.g. 31) for controlling them. Switches 13A–C selectively connect at least one unpowered winding stage at any given time to the integrator 17 for producing sensing output X.

Figure 3:
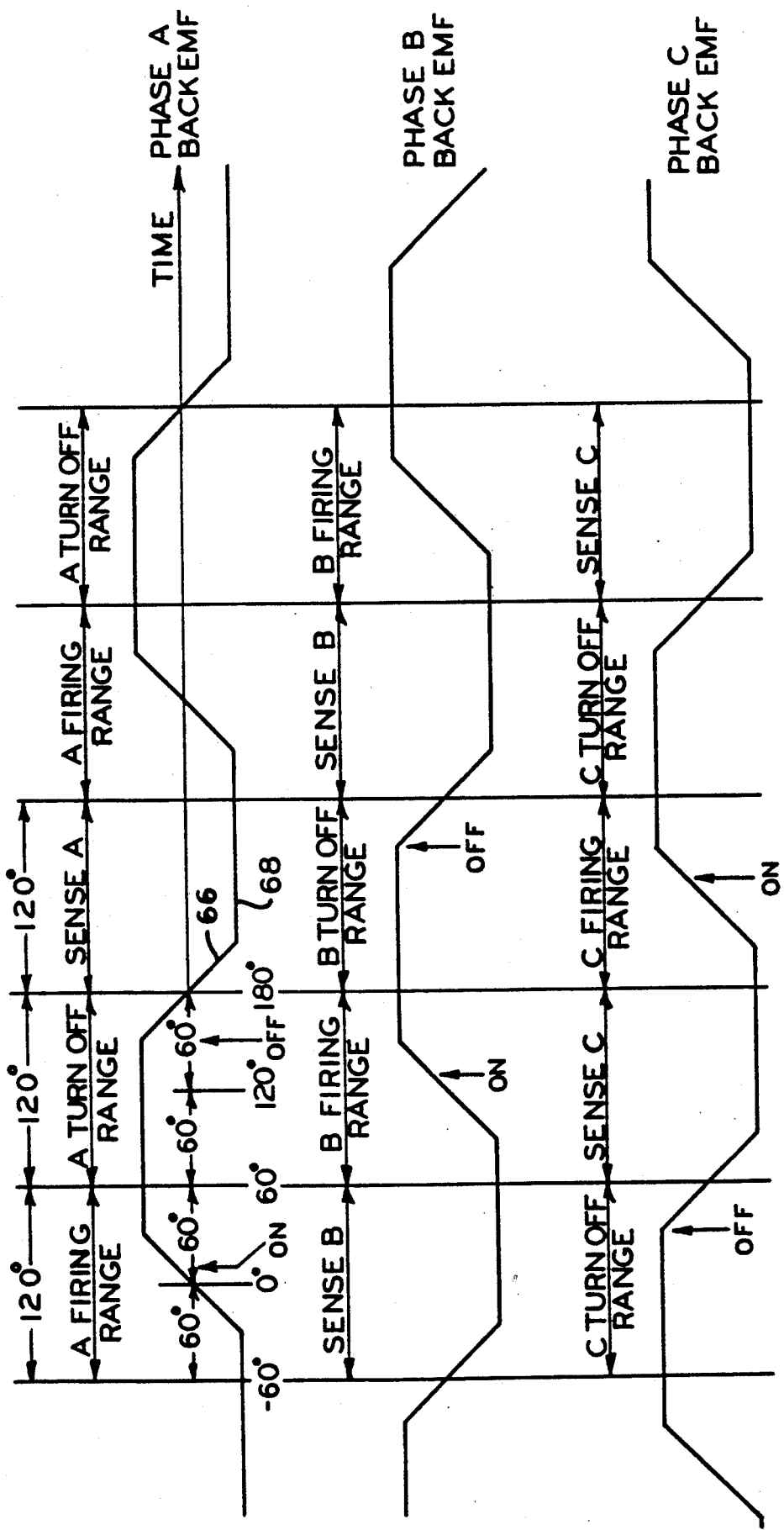
FIG. 3 is a set of voltage-versus-time diagrams of back EMF waveforms for the motor of FIGS. 1 and 2, illustrating inventive operations of the control circuit of FIG. 1 according to a method of the invention.

FIG. 3 shows waveform diagrams corresponding to the voltage at neutral 4N less the voltages at terminals 4AT, 4BT, and 4CT respectively. In FIG. 3 the voltages are 120 electrical degrees apart and have identical waveforms. Each waveform is high when its winding stage is energized by switch 43A, 43B or 43C to make its terminal voltage low. Each waveform is low during an unpowered period when the corresponding winding stage is unpowered and the terminal voltage exceeds the neutral voltage. Substantially linear ramp segments join the low and high voltage segments. The actual positions on the horizontal time axis which the various electrical degree positions occupy and the number of cycles of waveforms which occur in a given period of time depend on the speed of the rotatable assembly.

In this embodiment the voltage (back emf) during an unpowered period is utilized for position sensing purposes. Zero electrical degrees (0°) and 180° points on the ramps correspond to particular angular positions of the rotor where the terminal voltage of the winding stage 4A is equal to the neutral voltage (i.e., where the back emf is zero), and the actual number of these angular positions spaced around the circular bore of the motor depends on the number of poles of the motor.

For purposes of the embodiment of FIG. 2, each 360 degree repetition period in FIG. 3 is divided or partitioned into three 120° segments for Firing Range, Turn Off Range and Sense respectively. The Firing Range commences 60° electrical before a zero electrical degree 0° point is reached by the rotatable assembly. An instant or position ON for first actual application of voltage to a winding stage is established anywhere in the Firing Range, such as a few degrees after the 0° point as shown. An instant or position OFF for termination of voltage to a winding stage is established anywhere in the Turn Off Range, such as about 150° as shown. The winding stage is unpowered during the entire 120° of the Sense period, which is used in this embodiment for obtaining back EMF for position sensing purposes.

Circuits 17, 23, 27, 29 and 31 of FIG. 1 establish the timing of the various operations in FIG. 3 to properly select winding stages by analog multiplexer 13 for voltage sensing and to make bistable circuit 33 apply voltage and terminate voltage to the appropriate winding stages at desired times. During each 120° segment the control circuit 11 measures the back EMF of one motor winding, energizes the second winding and turns off the third winding. In this way, the back EMF from one winding is used to control the other two windings.

This illustrative form of method of partitioning allows the turn on (firing) angle for a particular winding stage to be selected to occur within an adjustment range of ±60° from the back EMF zero crossing of that winding stage. The turn off angle is independently adjustable from ±60° to 180° referenced to the back EMF zero crossing. In other words, the circuit advantageously provides independent control of the turn on and turn off angles of energization of the winding stages. Note that these selections can allow two phases to be energized simultaneously (overlapped firing) or can allow some dead time wherein all three windings are deenergized. With speed feedback, an example of which is described later hereinbelow, the firing angle is advantageously changed dynamically as a function of speed. The ability to control these angles dynamically opens another degree of freedom to optimize electronically commutated motor performance parameters such as torque ripple, efficiency, speed and power.

Figure 4:
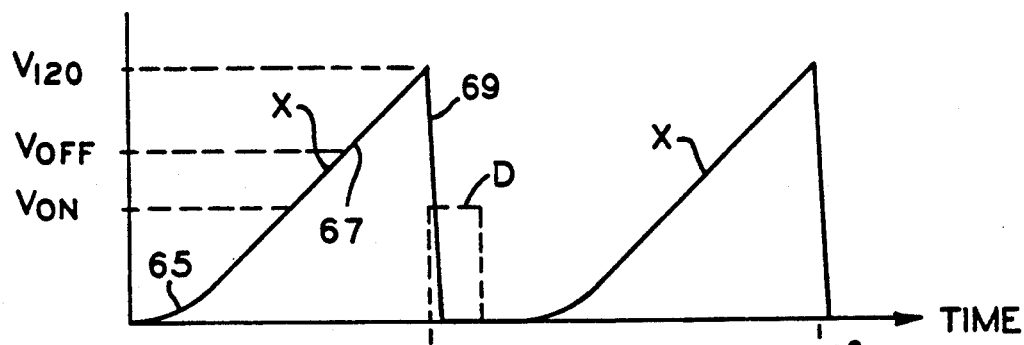
FIG. 4 is a voltage-versus-time diagram of integrator output X in the circuits of FIGS. 1 and 2, illustrating further inventive operations of the control circuit of FIG. 1 according to a method of the invention.

In FIG. 4 integrator output signal X rises positive. Signal X has a first generally parabolic curved part 65 resulting from integration of part 66 of the linear ramp in the Sense period of FIG. 3. Then signal X has a second generally linear ramp portion 67 resulting from integration of a generally constant or flat portion 68 of the back EMF in the Sense period of FIG. 3.

Figure 5:
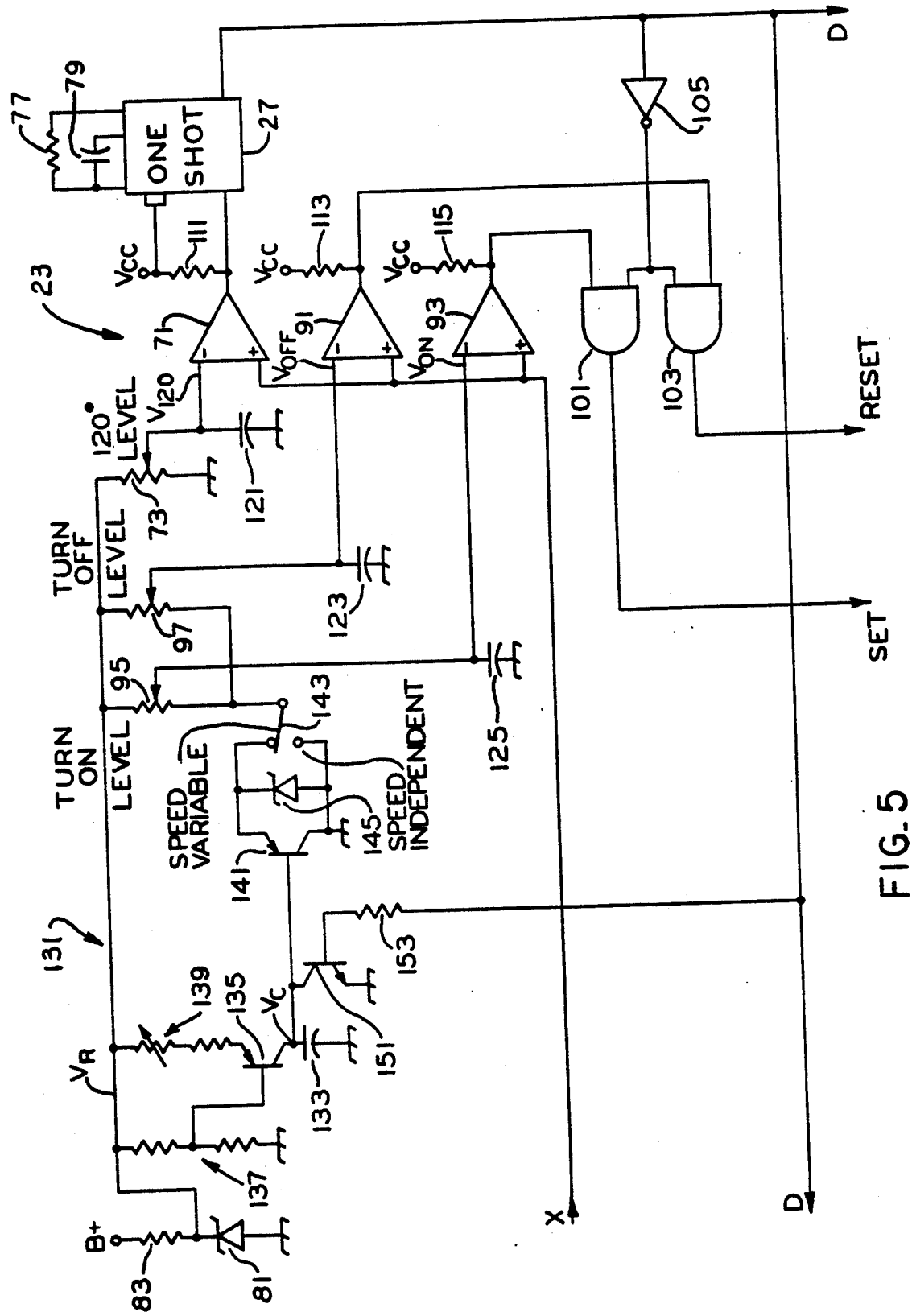
FIG. 5 is a schematic diagram of further inventive circuitry in part of the system of FIG. 1.

In FIG. 5 signal X is supplied to a comparator 71 at its non-inverting "+" input. When signal X rises to a predetermined level $V_{120}$ established by a potentiometer 73 at the inverting "−" input terminal of comparator 71, then comparator 71 supplies an output high to one shot circuit 27 causing that circuit 27 to produce a pulse D having a predetermined duration as illustrated in FIG. 4. The duration of pulse D is established by a resistor 77 and capacitor 79 in FIG. 5 associated with one shot circuit 27. A regulated voltage $V_R$ is provided for potentiometer 73 by means of a Zener diode 81 and a resistor 83 connected between common and a terminal for voltage B+.

Further in FIG. 5, two additional comparators 91 and 93 compare the signal X with a Turn On voltage level $V_{ON}$ established by a potentiometer 95 at its wiper or adjustable point, and a Turn Off voltage level $V_{OFF}$ established and adjustable independently by a potentiometer 97. Thus, when integrator output X, which is provided to non-inverting inputs of comparators 91 and 93, exceeds the Turn Off level $V_{OFF}$ then the output of comparator 91 goes high. When integrator output X exceeds the Turn On level $V_{ON}$ established by potentiometer 95, the output of comparator 93 goes high.

In the embodiment of FIGS. 2 and 5, the operational process thus starts with the analog multiplexer selecting that motor winding stage which is entering its sense period wherein it is not energized and will not be energized during the 120° Sense period. The selected back EMF signal is then integrated to remove (by averaging) mutually coupled noise resulting from the switching in the other windings and to yield a voltage which is related to angular position. This "position" voltage is compared with three reference voltages as discussed above to yield three comparator signals. One signal marks the 120° period, one marks the turn on or firing angle and the third marks the turn off angle. Each time the 120° marker occurs, it triggers the one shot 27 which advances position counter 29 of FIG. 1 and resets the integrator 17. One version of the position counter 29 is a two bit counter which has three states. The binary counter outputs are decoded by position decoder 31 to provide three signals which mark the particular 120° segment of the back EMF being operated on. Only one of the three is active at one time. These signals are asserted to the analog multiplexer 13 to select the proper motor winding stage for sensing and to provide control windows for turning on and off the three winding stages 4A, 4B and 4C.

A Set output for initiating pulse energization for each latest winding stage is produced by an AND-gate 101. A Reset output for termination of the pulse energization of each winding stage to be deenergized is supplied by an AND-gate 103. AND-gate 101 has a first input connected to the output of $V_{ON}$ comparator 93, and AND-gate 103 has a first input connected to the output of $V_{OFF}$ comparator 91. An inverter 105 is connected from the D output of one-shot 27 to a second input of each of AND-gates 101 and 103. AND-gates 101 and 103 are enabled by inverter 105 at all times except when the D output of one-shot 27 is high. This embodiment does not recognize any occasion for initiation or termination of winding stage energization during the D output, and so the presence of inverter 105 enhances reliability and noise immunity. Thus, when integrator output X exceeds the Turn On level $V_{ON}$ established by potentiometer 95, comparator 93 output goes high and AND-gate 101 output goes high to produce the Set signal. When output X exceeds the Turn Off level $V_{OFF}$ established by potentiometer 97, the output of comparator 91 goes high producing a high Reset output from AND-gate 103.

Integrator 17 of FIG. 1 thus acts as an example of a means responsive to the terminal voltage of a temporarily unpowered third winding stage for producing a sensing output which is a function of angular position of the rotatable assembly. Other circuits besides an integrator could also exemplify such means. Potentiometers 95, 97 and 73 act as an example of a means for establishing a first electrical level representative of a first position of the rotatable assembly at which voltage is to be applied to a second winding stage, a second electrical level representative of a second position of the rotatable assembly at which voltage to a first winding stage is to be terminated, and a third electrical level representative respectively of a third position of the rotatable assembly at which a commutating circuit (e.g. in FIG. 8) is to advance in sequence. Further, comparators 93, 91 and 71 act as an example of a means for comparing the sensing output with the first, second and third electrical levels to produce first, second and third control signals (e.g. Set, Reset, and D) for the commutating circuit when the first, second and third positions are respectively reached by the rotatable assembly.

A further advantageous speed variable operation is provided by a circuit 131 of FIG. 5 for making circuit 11 of FIG. 1 a speed compensated firing circuit. Circuit 131 changes the firing angle (angular position of the rotor at which the turn on signal is generated to energize a winding stage) as a preadjustable function of speed to yield better motor performance. Fine angle compensation as a function of speed is also possible using this circuit 131, which provides independent adjustment of turn on angle, turn off angle, and advancement control of these angles as speed increases. For example, higher speed and shaft power are obtained in some motor contexts by advancing the firing angle determined by voltage $V_{ON}$ as the speed increases. This means that voltage $V_{ON}$ should decrease as speed increases, as provided by circuit 131.

In circuit 131 a capacitor 133 produces a ramp voltage $V_C$ in response to a PNP transistor 135 acting as a current source. The capacitor 133 is connected between the collector of transistor 135 and common. The base of transistor 135 is held at an approximately constant voltage by means of a voltage divider 137 connected across zener diode 81. The emitter of transistor 135 is connected by a variable resistor 139 to zener diode 81. In this way, a constant current level, provided by transistor 135 acting as a charging circuit, is adjustable by variable resistance 139, and voltage $V_C$ across charging capacitor 133 ramps up linearly.

Each time one-shot 27 produces signal D to advance in the commutation sequence, the capacitor voltage $V_C$ is reset to zero by discharging capacitor 133 in response to the signal D whereupon the charging circuit 135, 139 resumes charging capacitor 133. As the capacitor voltage rises, so does the turn on voltage $V_{ON}$. As the motor runs faster the capacitor is reset more often causing the peak capacitor voltage to be less. This causes the angle of energization to advance as speed increases.

It should be noted that advancement angle and angle advance herein are distinct concepts from advancing in sequence. Advancing in sequence continually changes signal patterns in control circuit 11 for different winding stages as the rotatable assembly or rotor turns. Advancement angle as used herein is an angle difference in electrical degrees between the physical rotor position for zero back emf and a rotor position for which the control circuit 11 is set to initiate energization of a latest winding stage. Angle advance as used herein is a relative advancement angle between the physical rotor position for energization of a winding stage at low speeds and a rotor position for which the control circuit 11 is set to initiate energization of a latest winding stage at a given speed.

Capacitor 133 with its voltage $V_C$ is further connected to the base of a PNP buffer transistor 141 connected in a common collector configuration as a high impedance buffer circuit connected across capacitor 133 for producing a buffer output that at least initially rises with capacitor voltage $V_C$. A selector switch 143 has its movable member connected to the lower voltage end of potentiometers 95 and 97. In a Speed Independent mode switch 143 connects the potentiometers 95 and 97 to common. Potentiometers 95 and 97 supply the voltages $V_{ON}$ and $V_{OFF}$ as preadjustable constant voltage levels independent of the speed of motor 1 by voltage-dividing the regulated voltage of Zener diode 81 in the Speed Independent mode.

In a Speed Variable mode of selector switch 143 the lower voltage ends of potentiometers 95 and 97 are connected to the emitter of buffer transistor 141. The collector of transistor 141 is connected to common. A zener diode 145 is connected across the emitter and collector of buffer transistor 141 and acts to limit the buffer output provided it reaches a predetermined level $V_H$. Each potentiometer 95 or 97 acts as a voltage division means connected between the power source and capacitor 133, with comparators 93 and 91 having their inverting inputs connected to the adjustable points of potentiometers 95 and 97 respectively.

Figure 6A:
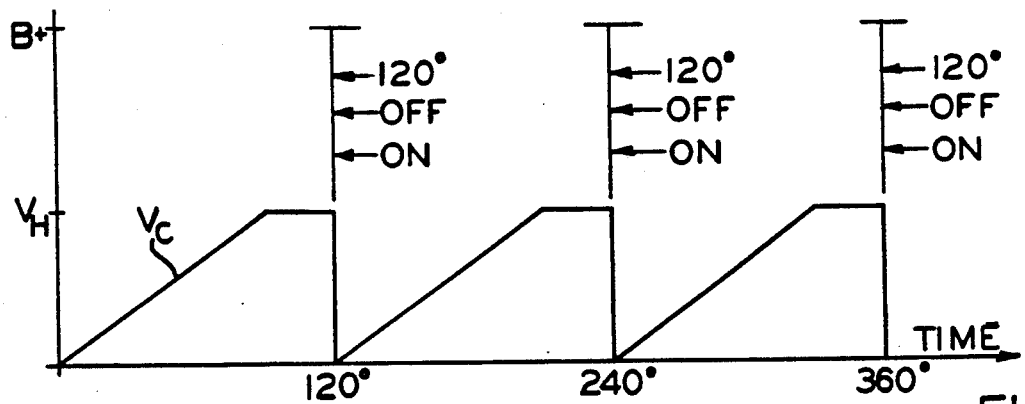
FIGS. 6A and 6B are a pair of voltage-versus-time diagrams of waveforms of advancement capacitor voltage in the circuit of FIG. 5, illustrating further inventive operations of the control circuit of FIG. 1 according to a method of the invention.
Figure 6B:
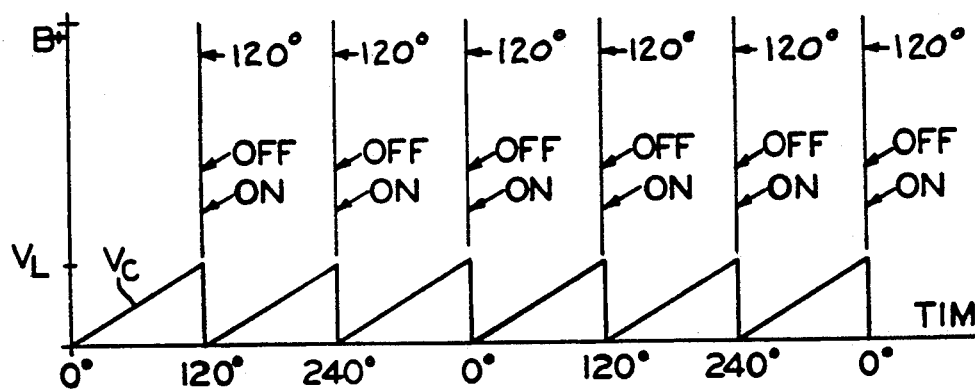

As shown in FIGS. 6A and 6B the Turn On level $V_{ON}$ and Turn Off level $V_{OFF}$ developed by potentiometers 95 and 97 vary with motor speed in the Speed Variable mode, while the 120 degree level $V_{120}$ remains the same. For example, in FIG. 6A the emitter voltage of transistor 141 increases with the ramp voltage $V_C$ across capacitor 133 of FIG. 5 until the emitter voltage reaches a relatively high level at zener voltage $V_H$ of zener diode 145, because a substantial period of time is consumed in turning the rotatable assembly 5 of motor 1 of FIG. 1 through a full 120° electrical. Therefore, the Turn On and Turn Off voltage levels are relatively high in FIG. 6A at slower speeds. Zener diode 145 thus restrains the electrical level of the emitter voltage from varying beyond a predetermined value provided it reaches the predetermined value before the control signal D next occurs. In this way, the emitter voltage reaches and is limited to the predetermined value at speeds of the rotatable assembly less than a predetermined speed.

On the other hand, at higher speeds as shown in FIG. 6B, a shorter length of time is required to turn the rotatable assembly through 120° and there is insufficient time for capacitor 133 to develop a voltage as high as $V_H$. Instead, a lower peak voltage $V_L$ is developed, and $V_L$ varies with speed. The charge on capacitor 133 of FIG. 5 is thereupon discharged by a discharging NPN transistor 151 which has its collector and emitter connected across capacitor 133 and which is turned on through a base resistor 153 each time signal D from one shot 27 goes high.

As just discussed, the lower voltage ends of potentiometers 95 and 97 only reach the voltage $V_L$ and they develop lower ON and OFF voltages of FIG. 6B which are equal to $$V_{ON} = V_C + k1(V_R - V_C) \quad (1)$$

$$V_{OFF} = V_C + k2(V_R - V_C) \quad (2)$$

where $V_{ON}$ is the Turn On voltage, $V_{OFF}$ is the Turn Off voltage, $V_C$ is the voltage across capacitor 133 at a given time, $V_R$ is the zener voltage of zener diode 81, and k1 and k2 are the preadjusted voltage division constants for potentiometers 95 and 97 respectively.

Since potentiometers 95 and 97 are independently adjustable, The Turn On voltage can either exceed or be exceeded by the Turn Off voltage. When the Turn On voltage exceeds the Turn Off voltage, one winding stage is deenergized before the next one is energized, leaving a time period or gap when none of the winding stages are energized. When the Turn On voltage is exceeded by the Turn Off voltage, one winding stage is energized before the next one is deenergized, leaving a time period of overlap when two of the winding stages are energized.

Circuit 131 of FIG. 5 thus generates a varying electrical level representing a varying value beginning with an initial value. Transistor 151 responds to the control signal D for resetting circuit 131 so that the electrical level is returned to the initial value, whereupon circuit 131 resumes generating the varying electrical level. That level thereby depends on the frequency of the sensing output X that results from the speed of the rotatable assembly. The comparators 93 and 91 compare the sensing output X with the electrical level from each of potentiometers 95 and 97 to produce Set and Reset control signals for the commutating circuitry.

Two circuits like 133, 135 and 139 can be provided for potentiometers 95 and 97 respectively, for independent adjustment of angle advancement or retardation per unit of speed change. Still other embodiments can use a single potentiometer in place of potentiometers 95 and 97 to produce a voltage which is provided to comparators 91 and 9 as both the OFF and ON voltage.

FIG. 7 further illustrates the operations of the Speed Variable mode. A charging curve of capacitor voltage $V_C$ ramps up to a plateau at voltage $V_H$. Corresponding curves for potentiometer 95 voltage $V_{ON}$ per Equation (1) and potentiometer 97 voltage $V_{OFF}$ per Equation (2) have generally higher initial ramps and final voltage plateaus than voltage $V_C$ but have smaller ramp slopes. Superimposed on the curves for $V_{OFF}$ and $V_{ON}$ are two alternate curves of integrator output X for an example of a high speed and a low speed respectively.

At a low speed as shown in FIG. 7, the integrator output $X_{LOW}$ rises from zero, intersects the plateau level of $V_{ON}$ at time $_LT_{ON}$, then intersects the illustratively higher plateau level of $V_{OFF}$ at time $_LT_{OFF}$, and eventually reaches constant voltage level $V_{120}$ (potentiometer 73 of FIG. 5) at a time $_LT_{120}$. At a high speed the integrator output $X_{HIGH}$ rises much more rapidly from zero, intersects the ramp portion of $V_{ON}$ at time $H_{TON}$, then intersects the illustratively higher ramp part of $V_{OFF}$ at time $_HT_{OFF}$, and soon reaches constant voltage level $V_{120}$ at a time $_HT_{120}$.

Due to the integration of back EMF by integrator 17, the output $X_{HIGH}$ or $X_{LOW}$ is directly related to the electrical degrees of rotor angular position, as indicated by the parallel vertical axes labeled "Electrical Degrees" and "Voltage" in FIG. 7. The Firing Angle of the motor for purposes of FIG. 7 is regarded as the rotor angular position in electrical degrees corresponding to the voltage plateau level of Turn On voltage $V_{ON}$. In other words, at slow speeds, each winding stage is energized at the rotor angular position represented by the Firing Angle. At increasingly higher speeds, however, the intersection of the integrator output X moves leftward along the plateau of $V_{ON}$ and down the ramp part of $V_{ON}$, so that energization of each winding stage is initiated at progressively earlier angular positions of the rotor. At the rotor speed which produces the example integrator output $X_{HIGH}$, an angle advance $a_{ON}$ represents the difference between the Firing Angle and the actual angle at which energization is initiated at that rotor speed.

A Termination Angle of the motor is herein regarded as the rotor angular position in electrical degrees corresponding to the voltage plateau level of Turn Off voltage $V_{OFF}$. (Strictly speaking the Termination Angle is 120° plus the Y axis value of electrical degrees corresponding to voltage $V_{OFF}$ in FIG. 7.) At slower speeds, each winding stage is deenergized at the rotor angular position represented by the Termination Angle. At increasingly higher speeds, and analogously to firing, the intersection of the integrator output X moves leftward along the plateau of $V_{OFF}$ and down the ramp portion of $V_{OFF}$, so that energization of each winding stage is terminated at progressively earlier angular positions of the rotor relative to the Termination Angle. At the rotor speed which produces the integrator output $X_{HIGH}$, a termination angle advance value $a_{OFF}$ represents the difference between the Termination Angle and the actual angle at which energization is terminated at that rotor speed.

It is desirable to make the advancement or angle advance change in a controlled manner with rotor speed. For example, in some applications it is desirable to make the advancement or angle advance increase relatively slowly with increase of speed at lower speeds and to increase more rapidly with increase of speed at the higher speeds. In one embodiment a tachometer circuit detects the speed, feeds it to a lookup table which supplies a value of advancement (or else firing angle advanced by the angle advance) which then is fed for summation (or directly) to the comparator 93 input. In another embodiment a motor current sensor detects the current (which represents the torque loading) and the tachometer circuit detects the speed. Both the speed and torque information are fed to the lookup table (implemented either in custom-designed hardware or in software in a computer) which supplies the value of advancement (or else firing angle advanced by the angle advance) which then is fed for summation (or directly) to the comparator 93 input. In other embodiments, a resistance-capacitance charging circuit provides a voltage which is used to modify the potentiometer output to the comparator. In the embodiment shown in the drawings, for instance, a linear ramp charging circuit with zener clamp provides the appropriate firing angle for low speeds and then increases the advancement at the higher speeds. For even more pronounced rate of increase of advancement at the higher speeds, a charging exponential $(C1+C2e^{-t/RC})$ curve for $V_{ON}$ and $V_{OFF}$ is obtained by eliminating transistor 135 and voltage divider 137. In this latter embodiment, capacitor 133 is charged directly from variable resistance 139 to economically obtain a charging exponential curve. In still another embodiment a computer is triggered by one shot 27 to produce a series of digital values which are converted to analog form by a digital-to-analog converter to produce any curve desired. It is contemplated that other embodiments within the inventive scope also produce desired advancements as a function of speed and/or torque so that the needs of particular motor applications are met.

In FIG. 5, variable resistor 139 provides a fine adjustment of the angle advance as speed increases. In the discussion hereinbelow, the angle advance is analyzed generally for a relatively broad class of embodiments and the function of variable resistor 139 is derived as a special case.

Assume a relationship X(A) between the integrator output X and actual rotor position A in electrical degrees, where position A equals the product of rotor speed w multiplied by time t. For illustration, the relationship X(A) is assumed linear in he region of intersection with the ramping parts of $V_{OFF}$ and $V_{ON}$ in FIG. 7. The slope of the integrator output graphed as a function of time in FIG. 7 varies as a function of speed w. However, the derivative of integrator output with respect to angle A can be assumed constant with a value $s_1$.

At slower speeds, comparator 91 senses when the following equation is satisfied $$X(A_o) = V_H + k_1(V_R - V_H) \tag{3}$$

where $A_o$ is the Firing Angle and $V_H$ is the limit as time goes to infinity of a voltage $V_C(t)$ provided to potentiometer 95 in Speed Variable mode.

At higher speeds, comparator 91 senses the intersection of integrator output X with the $V_{ON}$ output as follows:

$$X(A_o - a_{ON}) = V_C(t) + k_1(V_R - V_C(t)) \tag{4}$$

where $a_{ON}$ is angle advance and $V_C$ is capacitor 133 voltage or some substitute produced by other means such as a computer. Subtracting Equation (4) from Equation (3) yields $$X(A_o) - X(A_o - a_{ON}) = (1 - k_1)(V_H - V_C(t)) \tag{5}$$

Since X(A) is linear in the range of interest, the expression on the left side of Equation (5) is the constant $s_1$ multiplied by angle advance $a_{ON}$. Substituting and rearranging yields an equation for angle advance $a_{ON}$:

$$a_{ON} = ((1 - k_1)/s_1)V(t) \tag{6}$$

where $a_{ON}$ is angle advance, $k_1$ is the voltage division constant of the potentiometer, $s_1$ is the slope of the relation of integrator output X to rotor position in electrical degrees, and V(t) is a voltage function of time of intersection where $V(t) = V_H - V_C(t)$. This voltage function V(t) is entirely general and does not depend on particular circuitry of circuit 131. Equation (6) is thus descriptive of microprocessor-based firing advance circuits, capacitor-based circuits as in FIG. 5 and other embodiments. The time t of intersection is inversely related to speed w according to the relationship $$t = (A_o - a_{ON})/w \quad (7)$$

where $A_o$ is Firing Angle and $a_{ON}$ is the angle advance.

In practicing the invention in this aspect, the skilled worker either assumes the function V(t) to be linear or decaying exponential in time as described above, or maps V(t) by measurements as described next.

A laboratory measurement method for mapping the function V(t) uses the control circuit (such as the embodiment of FIG. 5 in Speed Independent mode) to determine the desired advance angle values at several speeds w of the motor. At each speed solve for t using equation (7) and solve for V by rearranging equation (6) as $$V = a_{ON} s_1/(1-k_1) \quad (8)$$

The corresponding values of V and t thus obtained map the function V(t) which then is generated by analog circuitry designed to model it or by a microprocessor programmed to generate it. Where it is desired to include motor torque as well as motor speed in the determination of the angle advance $a_{ON}$, the torque dependence of the Firing Angle is determined by measurements which then are implemented in a lookup table for the value $k_1$.

In the special case of circuit 131 of FIG. 5, the resistance R of variable resistor 139 is related to the slope (herein $s_2$ volts per second) of the capacitor 133 voltage $V_C$ in FIG. 5. This slope is given by $$s_2 = V_R/(RC) \quad (9)$$

where $V_R$ is the zener voltage of zener diode 81, R is the effective resistance including variable resistor 139 in series with capacitor 133, and C is the capacitance of capacitor 133. The voltage across capacitor 133 is given by $$V_C = s_2 t \quad (10)$$

where $s_2$ is slope and t is time in seconds.

Substituting Equation (10) into Equations (1) and (2), the Turn On and Turn Off voltages are given by $$V_{ON} = (1-k_1)s_2 t + k_1 V_R \quad (11)$$

$$V_{OFF} = (1-k_2)s_2 t + k_2 V_R \quad (12)$$

Finally, substituting Equations (9) and (10) with (5) and rearranging yields $$a_{ON} = ((1-k_1)/s_1)(V_H - V_R t/RC) \quad (13)$$

where t is given by Equation 7.

Figure 8:
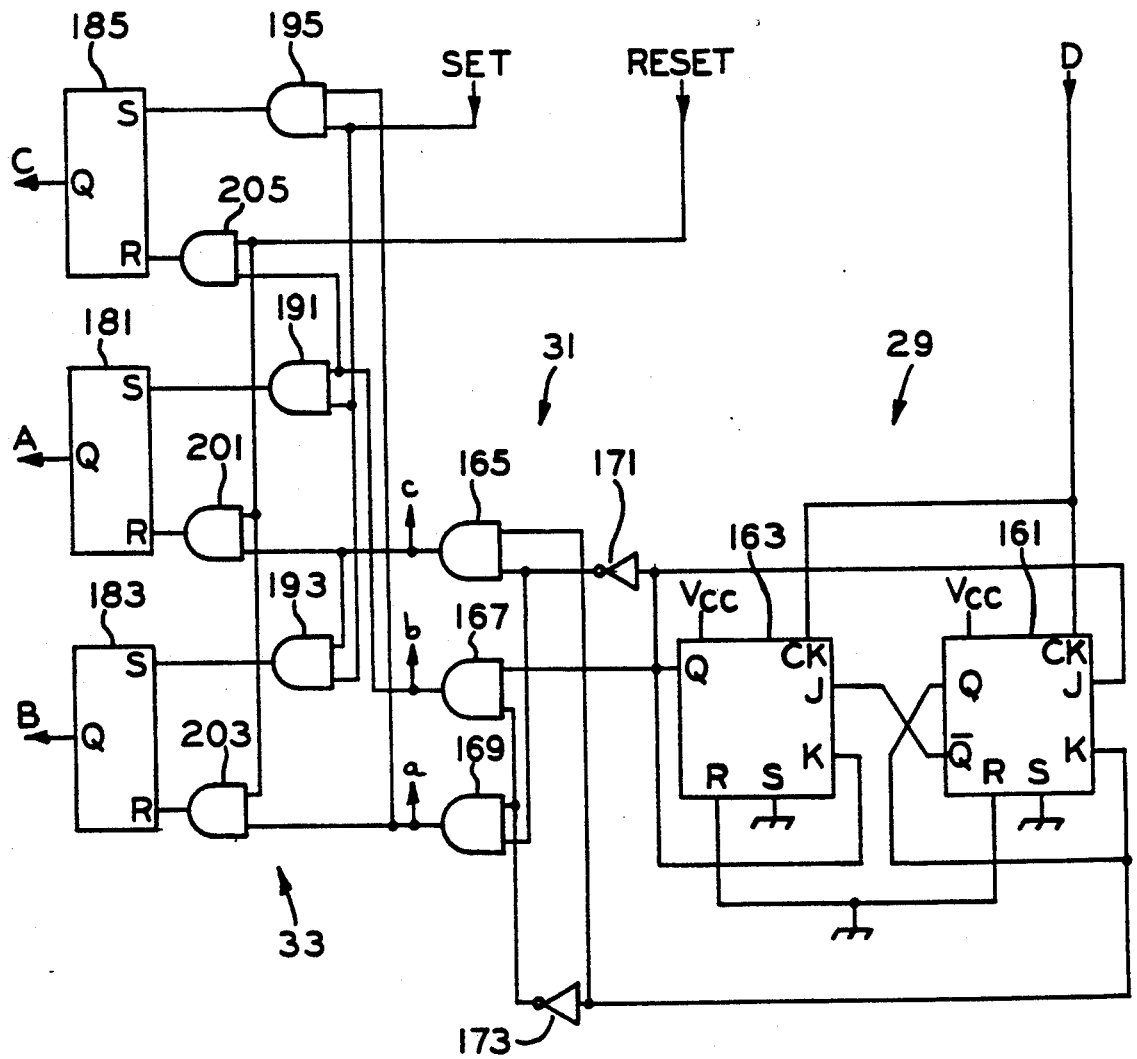
FIG. 8 is a schematic diagram of further inventive circuitry in a commutation section of the system of FIG. 1.

In FIG. 8 commutation circuitry for operating winding stages 4 of FIG. 1 includes counter 29, decoder 31, and latches and decoding circuitry 33. Counter 29 is illustratively realized by a 3-state circuit comprised of a first JK flip-flop 161 and a second JK flip-flop 163. Flip-flops 161 and 163 both have signal D connected to their clock CK inputs. The Q output of flip-flop 161 is connected to its K input. The Q output of flip-flop 163 is connected to its own K input and to the J input of flip-flop 161. A not-Q output of flip-flop 161 is connected to a J input of flip-flop 163. The set S and reset R inputs of flip-flops 161 and 163 are all tied to common and are inactive. Thus, for example, if the flip-flops 161 and 163 initially have their Q outputs low (first counter state 00), then their not-Q outputs are high. When signal D clocks both flip-flops, the high not-Q output of flip-flop 161 is supplied to the J input of flip-flop 163 setting the Q output of flip-flop 163 high (second counter state 10). Clocking the flip-flops a second time with signal D causes the now-high Q output of flip-flop 163 at input J of flip-flop 161 to set the Q output of flip-flop 161 high. Simultaneously, the Q output of flip-flop 163 is reset low because of the high at the K input of flip-flop 163 at this time (third counter state 01). Clocking the flip-flops a third time with signal D resets the Q output of flip-flop 161 because of the high at the K input of flip-flop 161 at this time, returning the flip-flops to first counter state 00.

A decoding network comprised of the three AND-gates 165, 167, 169, and inverters 171 and 173 produces outputs a, b, and c from AND-gates 169, 167, and 165 respectively. AND-gates 169, 167, and 165 respectively decode the first (00), second (10) and third counter state (01) to produce a high output a, b, c when each state occurs. One and only one of these a, b, c outputs is high during each arc of rotation of the motor from commutation to commutation, and the output which is high remains high throughout the entirety of a given arc between commutations.

A set of bistables (RS flip-flops or latches) 181, 183 and 185 initiate and terminate energization pulses and establish their pulse width on lines A, B, and C to the circuit of FIG. 2. Each bistable 181, 183 and 185 has a first state (high) for powering a respective winding stage 4A, 4B or 4C in response to the Set control signal and a second state (low) for terminating the application of voltage to the respective winding stage in response to the Reset control signal. Counter 29 and decoder 31 act as a control for generating a sequence of electrical signals at outputs a, b, c to determine which of the bistables receives the Set control signal and which of the bistables receives the Reset control signal. The counter 29 responds to signal D as a third control signal to go to the next state and make outputs a, b, c advance in the sequence upon each occurrence of signal D.

In FIG. 8, AND-gates 191, 193, and 195 are all enabled at a first input by the Set control signal. AND-gates 191, 193, and 195 are also respectively connected at a second input to outputs b, c, and a from AND-gates 167, 165, and 169 respectively. As discussed hereinabove, only one of these AND-gate outputs a, b, and c is high at any one time. Therefore, only one corresponding bistable 185, 181, or 183 becomes set during any one sequence interval for the appropriate winding stage which is to be energized.

Similarly, the Reset control signal enables AND-gates 201, 203 and 205 at the same time but only one of those AND-gates 201, 203, and 205 is qualified by an output c, a, or b respectively. In this way, a flip-flop 181, 183, or 185 which was set just prior to the present sequence interval is reset in the present interval. Thus, output a allows the Set signal to set the line C latch and allows the Reset signal to reset the line B latch. Output b allows the Set signal to set the line A latch and allows the Reset signal to reset the line C latch. Output c allows the Set signal to set the line B latch and allows the Reset signal to reset the line A latch, whence the sequence repeats. Over a series of intervals, a repeating sequence of pairs of the bistables have one bistable in each pair set and the other bistable in each pair reset.

Thus, the circuitry of FIG. 8 acts as an example of a commutating means for applying a voltage from a power source to energize the motor so that a winding stage is temporarily powered in response to a Set control signal in a first sequence interval and another winding stage is temporarily unpowered, initiating energization of another winding stage in response to another occurrence of the Set control signal in the next sequence interval and terminating the application of voltage to the temporarily powered winding stage in response to a Reset control signal and advancing in the sequence in response to a sequence control signal (e.g. signal D) to effect rotation of the rotatable assembly. Independently adjustable potentiometers 95 and 97 of FIG. 5 vary the first and second electrical levels for Turn On and Turn Off relative to each other so that at least two of the winding stages either variably overlap in a time period of energization or variably in time terminate the voltage applied to one of the winding stages before a time when the second of the two winding stages has voltage applied to it. In other words, depending on the setting of the potentiometers (or of fixed voltage dividers which can be used), two of the winding stages may be energized at once during an overlap period in the half-bridge circuit of FIG. 2, or there may be a gap in energization when none of the winding stages is energized.

Figure 9:
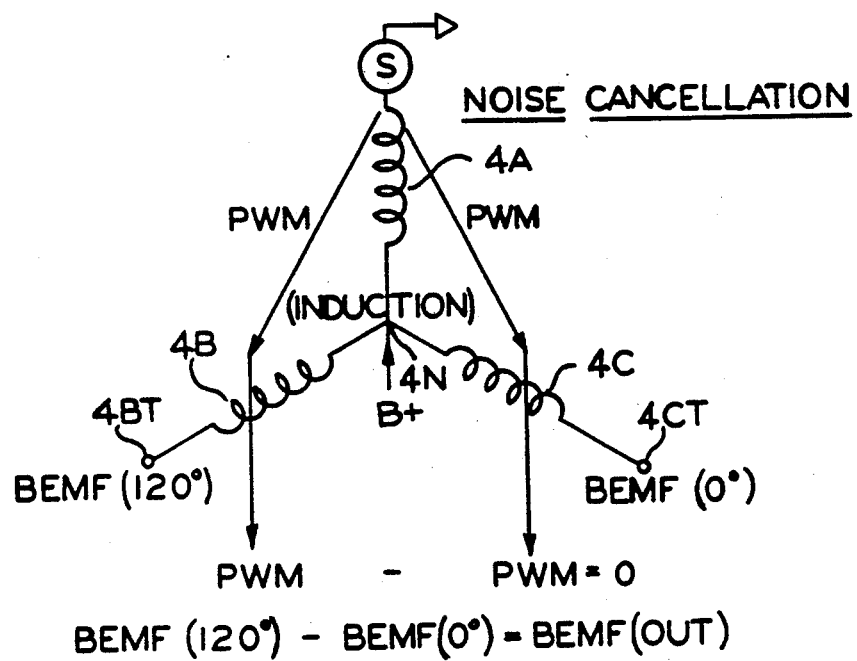
FIG. 9 is a simplified electrical diagram of an electronically commutated motor showing mutually coupled signals from an energized winding into two unpowered windings, to illustrate an interference cancellation process of a further preferred embodiment of the invention.

FIG. 9 illustrates a noise cancellation process of the invention applied in a motor with winding stages 4A, 4B, and 4C connected together at neutral 4N which is connected to supply voltage B+. Two of the winding stages 4B and 4C are caused to be unenergized when a switch S is applying pulse width modulation (PWM) to winding stage 4A. As a result, the PWM switching by switching element S induces a noise voltage or interfering PWM signal into the unpowered winding stages 4B and 4C. This PWM signal appears at the terminals 4BT and 4CT of winding stages 4B and 4C. The back EMF voltages for position sensing at winding stage terminals 4BT and 4CT are 120° out of phase with each other, while the PWM signals are substantially the same at winding stage terminals 4BT and 4CT.

Therefore, it is advantageously recognized herein that the voltages at winding stage terminals of a pair of winding stages which are unenergized at a given time can be subtracted from each other to achieve a noise cancellation in the control circuitry. This subtraction does not substantially affect the back EMF voltage which is of interest for rotor position sensing purposes, yielding a back EMF output BEMF(OUT) according to the equation $$\text{BEMF(OUT)} = \text{BEMF}(120°) - \text{BEMF}(0°) \qquad (9)$$

By integrating the back EMF of one motor winding relative to a second winding, mutually coupled PWM and other noise can be virtually eliminated, allowing even more reliable back EMF detection (position information) at low speeds. The form of back EMF sensing thus obtained is called differential phase back EMF sensing or differential integration herein. It is believed that circuitry based on this process is less susceptible to integrator offsets (position error) caused by mutually coupled PWM noise at very low motor speeds and facilitates starting of the motor by providing more accurate position information substantially free of mutually coupled interference.

Figure 10:
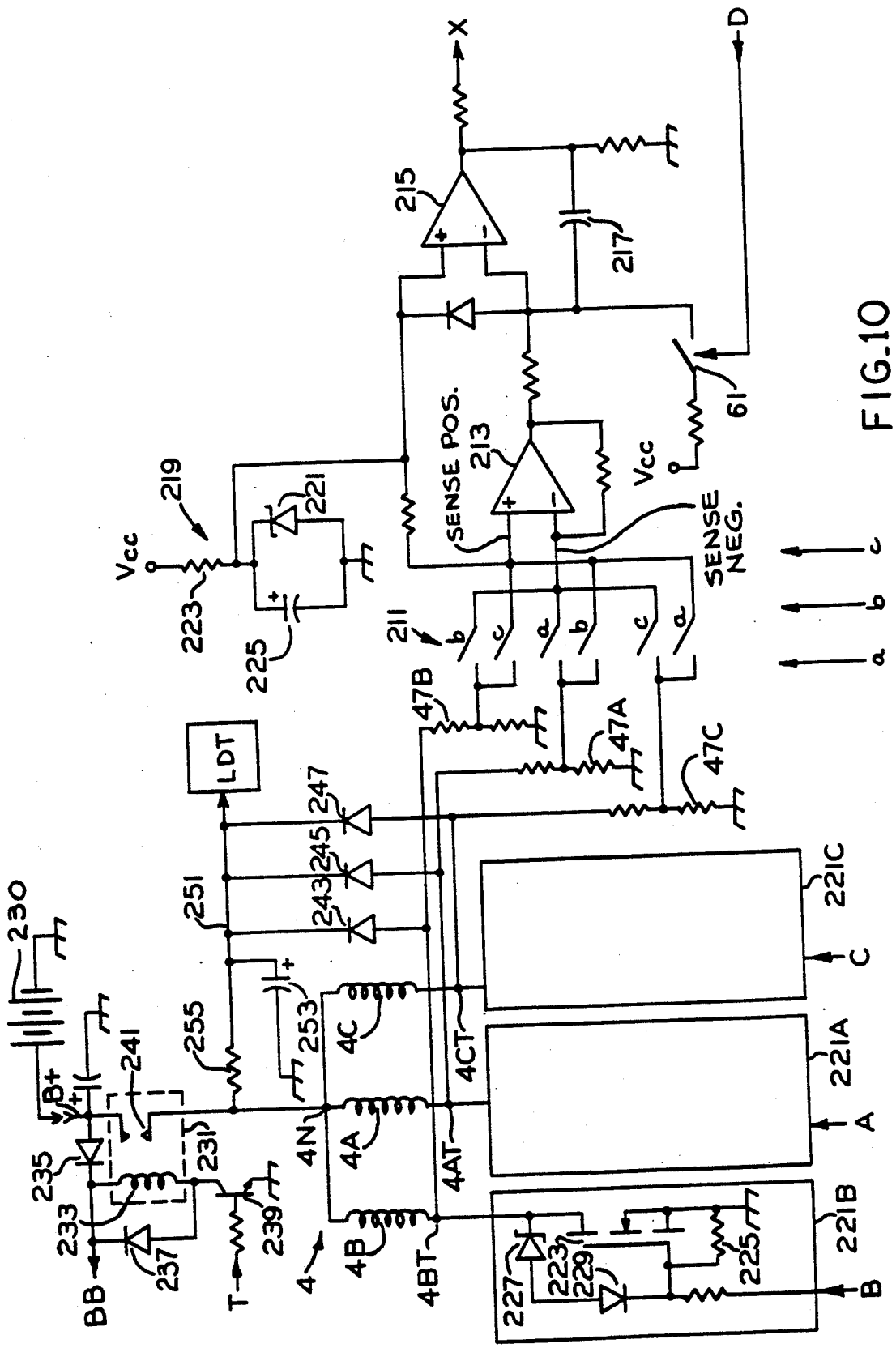
FIG. 10 is a schematic diagram of inventive circuitry for position sensing and other functions which implements interference cancellation according to FIG. 9.

In FIG. 10 a position sensing circuit (compare with the circuit of FIG. 2) illustrates an embodiment implementing this noise cancellation process. Motor 1 with its winding stages 4A, 4B and 4C has its winding stage terminals 4BT, 4AT and 4CT connected to respective voltage dividers 47B, 47A, and 47C as in FIG. 2. An analog switch matrix 211 has a set of six analog switches that are made conductive in pairs by respective high levels of outputs a, b, and c when each of these occur. An operational amplifier 213 is connected to switch matrix or assembly 211 by a pair of lines SENSE POS. (Sense Positive) and SENSE NEG. (Sense Negative). It is noted that in the embodiment of FIG. 10, the three analog switches that are connected to the SENSE NEG. line and marked a, b, and c in the switch matrix 211 are analogous to the analog switches 13A, 13B and 13C of FIG. 2. The remaining three analog switches that are connected to the SENSE POS. line in FIG. 10 represent a further improvement for differential phase back EMF sensing.

For example, when output a is high, switch matrix 211 connects voltage divider 47C to line SENSE POS. to a non-inverting "plus" input of operational amplifier 213. Also at this time, switch matrix 211 connects voltage divider 47A to line SENSE NEG. to the inverting "minus" input of operational amplifier 213. Winding stage B is suitably energized during all or part of the time when output a is high. Similarly, when output b is high, voltage dividers 47A and 47B are respectively connected to SENSE POS. and SENSE NEG. Winding stage C is suitably energized during all or part of the time when output b is high. Further, when output c is high, voltage dividers 47B and 47C are respectively connected to SENSE POS. and SENSE NEG. Winding stage A is suitably energized during all or part of the time when output c is high. In this way, the operational amplifier 213 acts as a differential amplifier which is always connected in the appropriate sense to a pair of winding stages which are not energized at a given time and which are symmetrically arranged with respect to the third winding stage so that the PWM signals induced into them are substantially the same in magnitude and polarity.

In FIG. 10 a further operational amplifer 215 has an integrating capacitor 217 connected between its output and minus input. The inverting (−) input of amplifier 215 is resistively connected to the output of differential amplifier 213. The non-inverting "plus" input of integrator 215, 217 is connected to a regulated voltage supply 219 which has a Zener diode 221 and a resistor 223 connected between common and a source of supply voltage $V_{CC}$. A filter capacitor 225 is connected across Zener diode 221 and the voltage developed by Zener diode 221 is supplied both to the plus inputs of integrator amplifier 215 and resistively to the plus input of operational amplifier 213. As in FIG. 2 an electronic switch 61 is actuated by the signal D to reset the integrator 215, 217 at each commutation. The output of integrator amplifier 215 is resistively connected to a line for supplying the integrator output voltage X. Together operational amplifiers 213 and 215 act as a differential integrator. Thus, the switch matrix 211 connects a pair of the motor winding stages to the differential integrator, changing the particular pair selected as the sequence of control progresses. One of the winding stages in a particular selected pair is connected to the inverting or Sense Negative input and the other is connected to the noninverting or Sense Positive input. In a three winding motor application, the remaining winding is energized.

Figure 12:
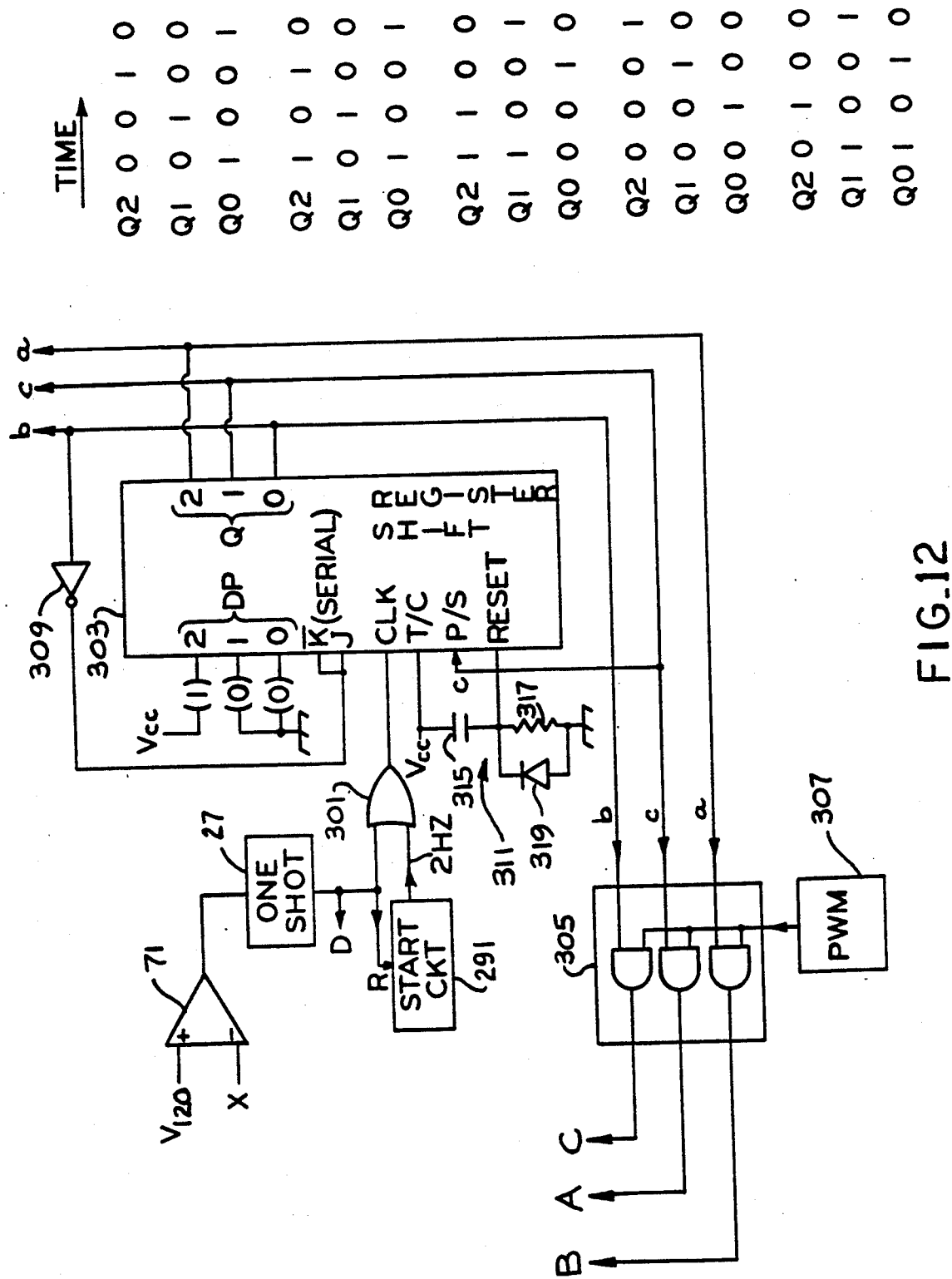
FIG. 12 is a schematic diagram of an alternative position counter of the invention using a shift register approach for increased immunity from electrical interference, for use with the circuit of FIG. 10.

As thus described, the differential integrator integrates the difference between the back EMFs of any two selected motor windings. By integrating the difference, the mutually coupled noise from the energized winding is canceled as illustrated in FIG. 9. The integrator output X is a voltage representative of rotor angular position. After integration the resultant signal is compared to a reference voltage which represents an angle of desired commutation of the motor and a pulse is produced by one shot 27 each time this angle is reached, to provide proper timing for resetting the integrator 17 and clocking position counter 29. The position counter, another embodiment of which is shown in FIG. 12, performs two tasks. It is responsible for the analog switch matrix timing and it provides the signals necessary for firing the motor winding stages. Each time a commutation pulse occurs, the position counter advances to the next state. The output of the position counter selects each winding stage in sequence for commutation.

As discussed hereinabove, the control circuitry of FIGS. 5 and 8 allow variable times of Set and Reset relative to sequence intervals during which back EMF sensing occurs. In a three winding motor, some of the time settings might provide only one unenergized winding in certain time periods for use by the PWM signal cancellation circuitry of FIG. 10 although the PWM signal cancellation process utilizes two unenergized winding stages. Accordingly, the circuitry of FIG. 10 is preferably automatically disconnected, isolated or otherwise rendered insensitive to the source voltage energizing any winding stage during any period when only one unenergized winding is available such as during an energization overlap period when potentiometers 95 and 97 of FIG. 5 are adjusted to provide overlap.

The circuit of FIG. 10 is also advantageously usable with the circuits of FIGS. 5 and 8 when potentiometers 95, 97 and 73 of FIG. 5 are adjusted in Speed Independent mode so that turn-on voltage $V_{ON}$ is set equal to voltage $V_{120}$, and turn-off voltage $V_{OFF}$ is set less than or equal to the other two voltages. If potentiometer 73 is omitted and the turn-on level from potentiometer 95 is connected as both $V_{ON}$ and $V_{120}$ to comparators 93 and 71, both the Speed Independent and Speed Variable modes are advantageously available for use with the FIG. 10 circuit. Also, as shown in subsequent FIGS. 12 and 25, circuitry in other embodiments is suitably provided to hardwire a commutation process by which only one winding stage at a time is energized, thus guaranteeing that two unenergized winding stages are available for position sensing.

In further features shown in FIG. 10 a set of identical switching units 221A, 221B, and 221C switch winding stages 4. For example, switching unit 221B has an input line B resistively connected to the gate of a power field effect transistor (FET) 223. A resistor 225 is connected between the gate and the source of FET 223 and the source is connected to common. A drain terminal of FET 223 is connected to winding stage terminal 4BT. FET 223 is protected from transients by a Zener diode 227 and a diode 229 connected in series between the drain and gate of FET 223. In this way, when gate line B goes high, FET 223 is turned on allowing energization of winding stage 4B. The other winding stages 4A and 4C are energized analogously.

Further in FIG. 10, a battery 230 is shown as a typical automotive power source of a voltage B+, details of alternator and voltage regulator and other automotive electrical circuitry being suppressed for clarity. A relay 231 has a coil 233 connected through a diode 235 to voltage B+. A free wheeling diode 237 is connected across relay coil 233. An NPN transistor 239 is connected between relay coil 233 and common. In this way, when a signal T is provided to the base of transistor 239, the coil 233 of relay 231 is energized closing contacts 241 and connecting supply voltage B+ to neutral 4N of the winding stages 4. A snubber circuit has three diodes 243, 245 and 247 respectively connected from winding stage terminals 4BT, 4AT, and 4CT respectively to a common point 251. A capacitor 253 is connected between point 251 and common, and a resistor 255 on the order of several ohms is connected between neutral 4N and point 251. A load dump transient circuit LDT has an input connected to point 251 and is further connected for protective control purposes as shown in FIG. 25 discussed later herein.

In this way FIG. 10 shows a control circuit for an electronically commutated motor with a plurality of winding stages having terminals for energization, and switches for applying a voltage to one or more of the terminals of the winding stages at a time and commutating the winding stages in a preselected sequence to rotate the rotatable assembly, leaving a preselected sequence of winding stages correspondingly unpowered so that a plurality of the winding stages are unpowered at any time. The winding stages generate back emf signals and also couple electrical signals from each energized winding stage to the unpowered winding stages which signals can interfere with detection of back emf for position sensing purposes. Switch matrix 211 selects at least two of the unpowered winding stages at any given time which have electrical signals coupled to them that have a predetermined relationship in polarity and magnitude. In the present embodiment, the relationship is equality, although in other embodiments using various winding configurations and connection schemes, other relationships such as proportionality in magnitude with polarities either same or opposite are contemplated. Switch matrix 211 has electronically controlled analog switches for selectively connecting to a given winding stage either of two inputs of operational amplifier 213 to maintain the same polarity of the back emf across those two inputs for position sensing purposes. Operational amplifier 213 produces an electrical output as a function of the difference of the voltages on the winding stage terminals of the winding stages selected, so that the electrical signals coupled from each energized winding stage are substantially canceled when they have the predetermined relationship while the back emf is preserved for position sensing substantially free from interference from the electrical signals that are coupled from each energized winding stage to the unpowered winding stages. Integrator 215, 217 integrates a function of the difference of the voltages on the winding stage terminals of a pair of the winding stages selected so that the back emf is integrated substantially free of interference from electrical signals coupled from the energized winding stages and the integrated output is generally representative of the angular position of the rotatable assembly.

Figure 11:
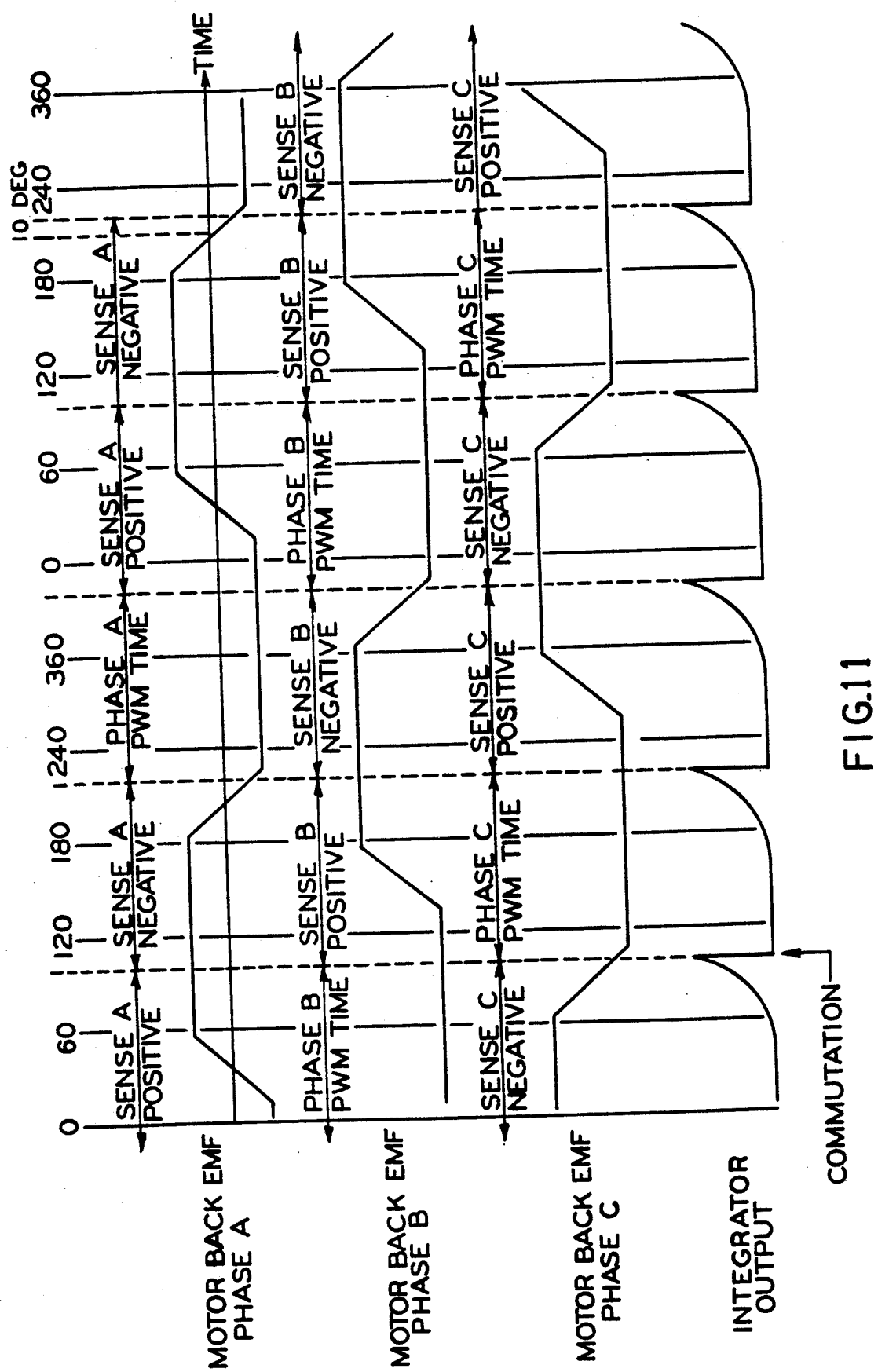
FIG. 11 is a set of voltage-versus-time diagrams of back EMF waveforms for the motor of FIGS. 1 and 2, having the vertical axis sense of each waveform inverted relative to FIG. 3, and illustrating inventive operations of the control circuit of FIG. 10 according to a method of the invention.

FIG. 11, which shows back EMF waveforms for a three winding stage salient pole electronically commutated motor, further illustrates the differential integration concept. Each of three back EMF wave forms are partitioned into three 120° segments or time intervals per cycle. These segments are designated Sense Positive, Sense Negative, and PWM Time. The PWM Time is the segment allowed for a particular winding stage to be energized to produce motor torque. During the Sense Positive and Sense Negative segments, various identified pairs of motor windings are not energized and are used to sense position. When a particular winding is passing through the Sense Positive time, it is automatically connected by switch matrix 211 to the noninverting "+" input of a differential integrator. Similarly, when a winding passes through the Sense Negative segment it is automatically connected by switch matrix 211 to the inverting "−" input of the differential integrator. At all times there is one Sense Positive and one Sense Negative winding, i.e., one winding in its Sense Positive segment and another winding in its Sense Negative segment. The mutually coupled noise, or mutual noise, which shows up in the Sense Positive interval of one winding will also show in the Sense Negative interval of another winding. The differential measurement technique subtracts back EMF of a Sense Positive winding from the back EMF of a Sense Negative winding and integrates the result. During the subtraction process the mutual noise which appeared on both windings is canceled, eliminated and prevented from interfering with the position sensing process, leaving only the true back EMF to be integrated. Reversing the motor amounts to revering the connections of two winding stages such as 4A and 4B at their terminals 4AT and 4BT, and FIG. 11 describes such reversed connection when the letters A and B are transposed thereon.

In FIG. 12 alternative counter 29 circuitry for increased immunity from electrical interference is illustrated. In circuit context, comparator 71 compares integrator output X with voltage $V_{120}$ and feeds one shot 27, which in turn produces signal D when output X reaches $V_{120}$. Signal D, which is generally representative of rotation of the rotatable assembly, is supplied through an OR gate 301 to a clock CLK input of a shift register 303, which is the nucleus of the counter. Comparator 71, one-shot 27, and OR gate 301 act as an example of a means for clocking the shift register means, which further has a start circuit 291 connected to a second input of OR gate 301 for generating a series of 2 Hertz pulses for starting the motor.

Shift register 303 has Q outputs Q0, Q1, and Q2 which are respectively connected to lines b, c, and a for control purposes as shown in other drawing figures herein. The Q outputs supply a parallel digital signal representing a commutation in the sequence. The counter circuit based on shift register 303 resists electrical interference which could otherwise cause the outputs to supply and disadvantageously propagate a parallel digital signal unrepresentative of any commutation in the sequence. The lines b, c, and a are also supplied to a logic gate circuit 305 consisting of a set of AND-gates. The AND-gates are enabled and disabled by pulse width modulated pulses supplied by a PWM circuit 307 to produce switching control outputs on lines C, A, and B respectively for the FIG. 10 switches 221C, 221A and 221B to commutate the motor. Gate circuit 305 and PWM circuit 307 are also representative of circuits having similar functions shown in portions of FIGS. 5, 8, 13, 19 and 25.

Output Q0 of shift register 303 in FIG. 12 is connected by an inverter 309 to a serial input J of shift register 303. Shift register 303 also has parallel inputs DP0, DP1 and DP2, as well as a control input P/S (parallel/ serial) for enabling the DP parallel inputs (P/S high) or the J serial input (P/S low) for data entry. For example, when input P/S is low the output of inverter 309 is entered as the least significant bit into one end of shift register 303.

When the voltage at the P/S input is high then a parallel digital signal is entered at DP inputs DP0, DP1, and DP2 as a parallel digital signal 001. Wiring as shown to $V_{CC}$ and common from the DP inputs thus acts as a type of means for supplying a parallel digital signal representing a particular commutation in the sequence to the set of parallel inputs of the shift register. Inputs DP0 and DP1 are tied low to common and thus have zero inputs. Input is tied high to $V_{CC}$ and thus receives a "one" input. In this way, one of the input bits has a first logic state and two further input bits have the complementary logic state in a fixed form with one bit high and the two further bits low.

Output Q1 which is connected to line c is also connected to the P/S input. Therefore, when output Q1 is high and the shift register 303 is clocked at input CLK, the signal 001 is loaded at the DP inputs of the shift register. Otherwise, shift register 303, when clocked, is loaded from serial input J. As thus described, the P/S control input of shift register 303 is connected to respond to at least one of the outputs (e.g. Q1) and the serial input is connected to respond to at least one of the outputs via inverter 309 so that if any unrepresentative parallel digital signal appears at the Q outputs which does not represent any commutation in the sequence, the unrepresentative parallel digital signal is replaced by another parallel digital signal representing a commutation in the sequence when shift register 303 is next clocked.

A Reset input of shift register 303 is connected to a Power On Reset circuit 311 which has a capacitor 315 connected between supply voltage $V_{CC}$ and the Reset input. A resistor 317 is connected between Reset input and common, and a diode 319 is connected across resistor 317 with its cathode connected to the Reset input of shift register 303. The Power On Reset circuit 311 resets the Q outputs of shift register 303 low when power from a power source is interrupted and resumes.

The operation of this counter circuit is illustrated in five charts shown as part of FIG. 12. The charts show the states of outputs Q0, Q1, and Q2 of shift register 303 in columns. Sucessive columns show the changes in the output states as time progresses. For example, in the topmost chart when the output Q0, Q1, Q2 is 100 and shift register 303 is clocked, the P/S input is low (Q1 low) and the Q0 output (1) is inverted by inverter 309 and entered into the shift register serially as a zero. The clocking by OR gate 301 also moves up the previous Q0 and Q1 (10) into the Q1 and Q2 positions causing the new output of shift register 303 to be 010. With Q1 now high, the P/S control input is high (parallel loading activated), and the next clock signal output from OR gate 301 causes shift register 303 to enter the 001 (Q1=0, Q2=0, Q3=1) parallel digital signal hardwired at the DP inputs, as shown in a third column of the chart. Q1 is thus low, making P/S low (serial loading activated). The Q0 low is inverted by inverter 309, and a one (1) is entered upon next clocking, with a resulting output 100, completing the sequence.

A particular advantage of the shift register circuit shown is its ability to clear itself of conditions that have all zeroes, or two or three ones, in the output triplet Q0, Q1, and Q2. For example, in the second chart if noise causes production of an improper output 101, Q1 is low and the Q0 high output is inverted by inverter 309 and entered as a zero at the least significant digit. Forward shifting results in a Q output 010, thus clearing the improper state Q0 = Q2 = 1 and allowing the sequence to continue thereafter without error propagation.

In still another example, the noise produces an improper state 011. Since Q1 is high, parallel loading of allowed state 001 occurs on the next clock cycle and the sequence continues thereafter without error propagation either. The same result pertains if improper state 110 or 111 occurs, since Q1 is high. A 000 state due to resetting or interference is succeeded by the 100 state since QO=0 is inverted and entered serially to produce 100.

In this way, the shift register counter circuit of FIG. 12 advantageously recovers within one clock pulse of any incorrect or inoperative state which may occur. This circuit thus is highly noise resistant and useful for electronically commutated motor control and other purposes.

Figure 13:
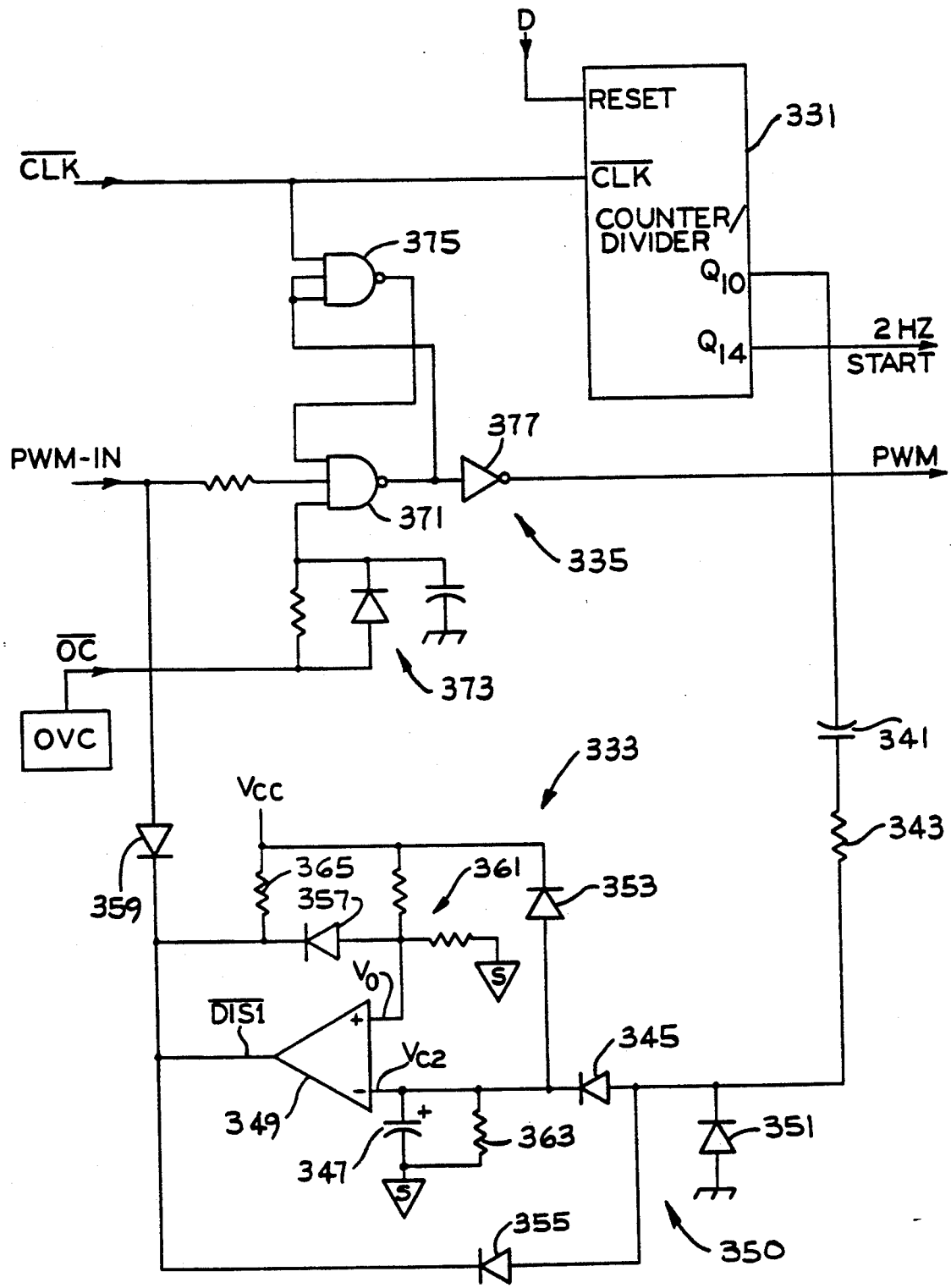
FIG. 13 is a schematic diagram of a blocked rotor protective circuit of the invention and pulse width modulation circuitry of the invention, for use with the circuit of FIG. 12.

FIG. 13 shows a protective control circuit for detecting a locked rotor or blocked or overloaded rotor condition in automotive blower and other applications. 20 kiloHertz clock pulses CLK/ (from an oscillator shown in FIG. 19) are provided to a corresponding CLK/ low active input of a binary counter 331 that frequency divides the pulses to supply lower frequency pulses at output Q10 as well as the start pulses at output Q14. Output Q10 provides frequency division of $2^{10}$, or 1024, and thus the 20 kHz. clock pulses are divided down to about 20 Hz. Output Q14 provides frequency division of 16K to produce nominally 2 Hertz start pulses at about 1.25 Hertz. Signal D from one shot 27 of FIG. 12 repeatedly resets counter 331.

The repetition rate F in Hertz of the signal D is $$F = R \times (P/2) \times N / 60 \qquad (14)$$

where R is the motor speed in RPM (revolutions per minute), P is the number of magnetic poles in the motor and P/2 is the number of pairs of magnetic poles, and N is the number of winding stages.

In one example motor, back EMF is readily detectable at rotor speeds of 200 RPM and higher, and also a persistent condition of speed less than 200 RPM would indicate a torque overload or blocked rotor condition. Accordingly, the embodiment of FIG. 13 uses counter 331 to detect speed less than a particular amount (or absence of signal D if that occurs) as well as a circuit 333 to determine whether the underspeed is persistent. If so, circuit 333 provides a disable signal to a PWM conditioning circuit 335.

Figure 14:
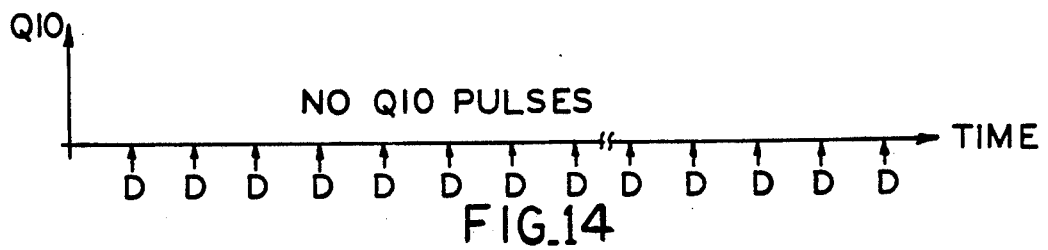
FIGS. 14 and 15 are voltage-versus-time diagrams of output Q10 of a counter in the circuit of FIG. 13 illustrating further inventive operations.
Figure 15:
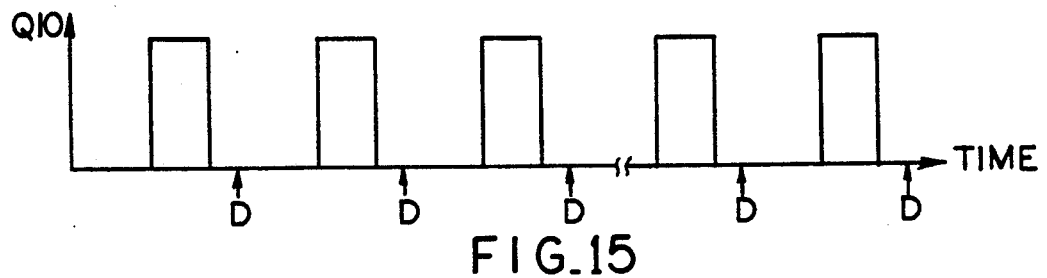

In this way, when the rotatable assembly of the motor is turning at least as fast as a predetermined spin rate such as 200 RPM, signal D is generated at a repetition rate F for resetting that is high enough to prevent the lower frequency Q10 pulses from being supplied (see FIG. 14) and otherwise allows the Q10 pulses to be supplied when signal D occurs at a lower repetition rate (see FIG. 15). For example, at 200 RPM, the repetition rate F from the above equation is about 33 Hertz in a six pole motor with three winding stages. The period of signal D at 33 Hertz is less than the period of Q10 (at 20 Hertz) which would be generated if the counter 331 were allowed to run freely. Therefore, output Q10 is effectively disabled at normal rotor speeds.

In general, the desired output Q index (here 10 decimal) is calculated as the first integer Q satisfying the following inequality $$Q \text{ GREATER THAN } \log_2[120 \times f / (S \times P \times N)] \qquad (15)$$

where f is clock frequency, S is predetermined spin rate or speed threshold for detection, P is number of poles and N is number of winding stages.

Given a Q index value, the exact value of the predetermined spin rate threshold or speed S is $$S = 120 \times f / (P \times N \times 2^Q) \qquad (16)$$

Put still another way, and using Equation (14) for F, the frequency division provided by counter 331 is $2^Q$, and $$2^Q = f / F \text{ at threshold speed S} \qquad (17)$$

Figure 16:
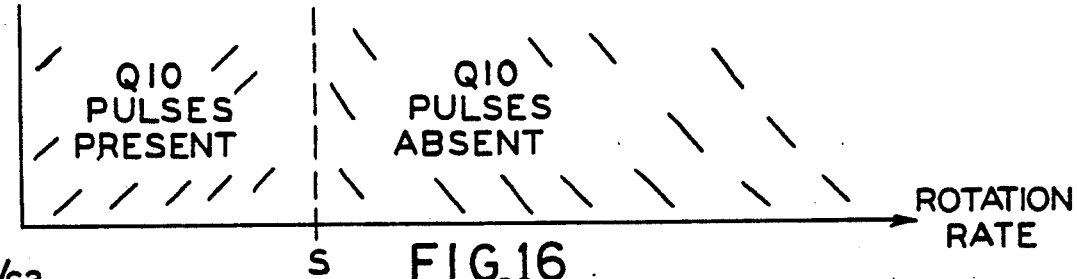
FIG. 16 is a diagram of output Q10 of the counter in the circuit of FIG. 13 versus motor rotation rate, illustrating inventive operations.

In this way, counter 331 provides frequency division of the oscillator pulses by a factor at least equal to the ratio of the repetition rate f of the oscillator pulses to the repetition rate F of the sensing signal D at the predetermined spin rate of the motor above which the lower frequency pulses are prevented (see FIG. 16). Put another way, counter 331 provides frequency division of the oscillator pulses by a factor of two-to-power-Q ($2^Q$) where the power Q at least equals the logarithm-to-the-base-2 of the ratio of the repetition rate of the oscillator pulses to the product of the predetermined spin rate (in Hertz) with the number of pole pairs and the number of winding stages.

Figure 17:
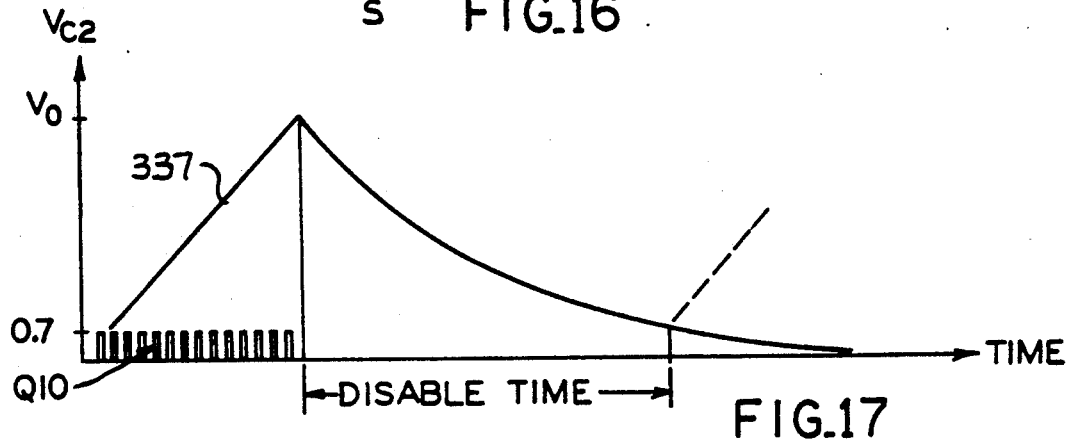
FIG. 17 is a voltage-versus-time diagram of a voltage $V_{C2}$ in FIG. 13 representing an accumulation of pulses from output Q10 in the circuit of FIG. 13 and illustrating further inventive operations, the time scale of FIG. 17 being longer than that of FIGS. 14 and 15.

Circuit 333 of FIG. 13 responds to the lower frequency pulses from output Q10 when they occur to produce an electrical signal $V_{C2}$ generally representing an accumulated number of the lower frequency pulses. FIG. 17 shows a rising ramp 337 of increase in $V_{C2}$ when Q10 pulses (demagnified in scale for clarity) are present. A resistance-capacitance (RC) charging network in circuit 333 has a first capacitor 341 connected from output Q10 to a resistor 343, which resistor is connected via a diode 345 to an accumulating capacitor 347. The RC network as shown is connected between the frequency dividing counter 331 and the inverting (−) input of a comparator 349. As shown in FIG. 17, the Q10 pulses charge the capacitor 347 in the RC charging network to a voltage representing an accumulated number of the lower frequency pulses when they occur.

Diode 345 in FIG. 13 is part of a diode network 350 that also includes clamp diodes 351 and 353 to common and $V_{CC}$ respectively, as well as an isolating diode 355 connected between the output DIS1/ of comparator 349 and diode 345. The anodes of diodes 355 and 345 are connected together. The diode network 350 also has a hysteresis diode 357 connected between the output of comparator 349 and its noninverting (+) input with the diode anode to the input. Further, a diode 359 has its cathode connected to the output of comparator 349, and its anode connected to a line PWM-IN for disabling PWM when the output DIS1/ of comparator 349 goes low (see FIG. 18).

A voltage divider 361 establishes a reference voltage $V_0$ representing a predetermined value or number of accumulated Q10 pulses which represent a persistent underspeed condition. Comparator 349 has its inverting input connected to capacitor 347 of the RC network for sensing actual accumulation of Q10 pulses which have charged it, and its noninverting input connected to voltage divider 361. Diode 357 connects the comparator output to the voltage divider 361 to reduce the reference voltage $V_0$ when the disabling output low from the comparator occurs. The diode network 350 further interconnects the RC network and the comparator 349 output to isolate capacitor 347 in the RC network from counter 331 when the disabling signal DIS1/ low is produced.

Output $DIS_1$ of comparator 349 goes low when voltage $V_{C2}$ has reached the predetermined value for accumulation represented by reference voltage $V_0$. At such time, a discharging resistor 363 in FIG. 13 discharges the capacitor 347 over a predetermined period of time (e.g. 1–20 seconds) to the reference voltage $V_0$ which has now been reduced by action of hysteresis diode 357.

Figure 18:
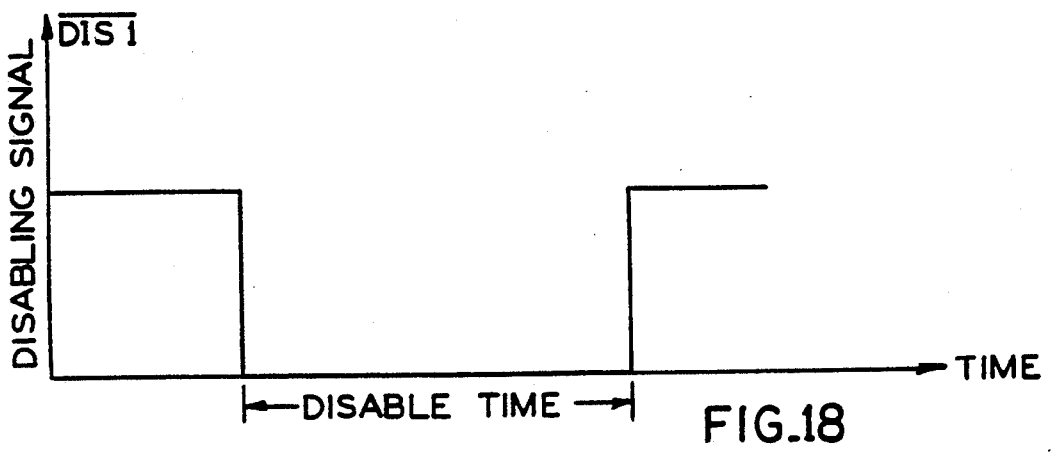
FIG. 18 is a voltage-versus-time diagram, to the same time scale as FIG. 17, of a disabling signal output DIS1/ in FIG. 13 and illustrating further inventive operations.

FIG. 17 shows exponential decay of voltage $V_{C2}$ down to a 0.7 volt diode drop of diode 357 during this predetermined period of time labeled DISABLE TIME during which comparator output disabling signal DIS1/ remains low in FIG. 18.

Thereupon the comparator output DIS1/ goes high in FIG. 18 and thus ceases to produce the disabling signal. Isolating diode 355 in FIG. 13 becomes backbiased and the RC network is again chargeable by any Q10 pulses from counter 331. Also, hysteresis diode 357 becomes backbiased from supply voltage $V_{CC}$ through a pullup resistor 365, causing voltage $V_0$ to return to its full reference value provided by voltage divider 361. In this way comparator 349 acts as an example of a means for comparing with a predetermined value an electrical signal representing an accumulated number of lower frequency pulses, and for supplying a disabling signal for a predetermined period of time for commutating circuitry after the predetermined value is reached by the electrical signal, to prevent energization of the motor during that predetermined period of time.

PWM circuit 335 in FIG. 13 conditions PWM input provided on line PWM-IN by means of a NAND gate 371. NAND gate 371 has a first input resistively connected to line PWM-IN, another input connected to an overcurrent detector $OV_C$ that provides it a low active output OC/ through a fast-charge, slow-discharge RC circuit 373, and a third input connected to the output of a second NAND gate 375. NAND gate 375 has one input connected to the output of NAND gate 371 and another input connected to the clock pulse line CLK/. Output PWM from the circuit 335 is supplied by an inverter 377 which has its input connected to the output of NAND gate 371. NAND gates 371 and 375 cooperate as an RS flip-flop which synchronizes the PWM with the transitions in the clock pulses and prevents multiple cycles of PWM in the same clock cycle. A disabling output DIS1/ from the blocked rotor circuit 333 immediately cuts off output PWM. An active low output OC/ from overcurrent circuit OVC cuts off output PWM only after a time delay provided by circuit 373.

Figure 19:
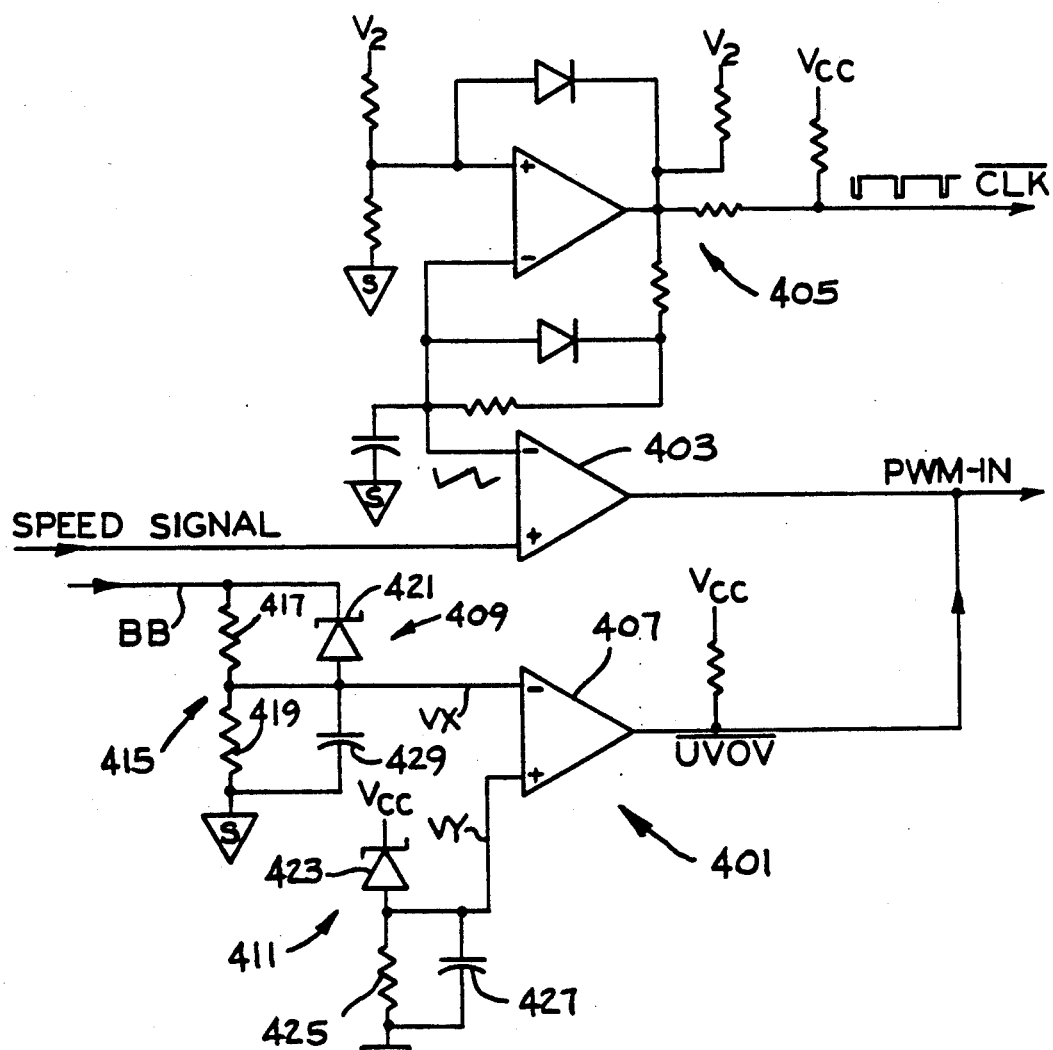
FIG. 19 is a schematic diagram of an underovervoltage circuit of the invention operating by methods of the invention and for use with the circuitry of FIG. 13.

In FIG. 19 an under-overvoltage protective circuit 401 is associated with a pulse width modulator comparator 403 and its clock oscillator 405. Clock oscillator 405 produces a square wave output CLK/ and a sawtooth output for the inverting (−) input of comparator 403. An analog speed command signal is provided to the noninverting (+) input of comparator 403. Comparator 403 produces a square wave output modulated in width in proportion to the analog level of the speed signal. The electronically commutated motor apparatus of FIGS. 1, 2 and 10 is suitably powered by a power source such as a battery 230 of FIG. 10 providing a source voltage B+ which is to be in a desired range between a lower voltage limit $V_{LL}$ and a higher voltage limit $V_{HL}$. A voltage BB, which is one diode drop below B+ by action of diode 235 of FIG. 10, is provided to the under-overvoltage circuit 401 of FIG. 19. If the source voltage goes out of range, a comparator 407 produces an output low, which prevents any PWM output from comparator 403 on line PWM-IN from controlling the motor switching when the source voltage is outside the range.

Advantageously, under-overvoltage circuit 401 detects a voltage out-of-range condition with only the one comparator 407. Remarkably, two separate comparisons are not required. This operation is facilitated by a pair of circuits 409 and 411 that feed the inverting and noninverting inputs of comparator 407 respectively.

Figure 20:
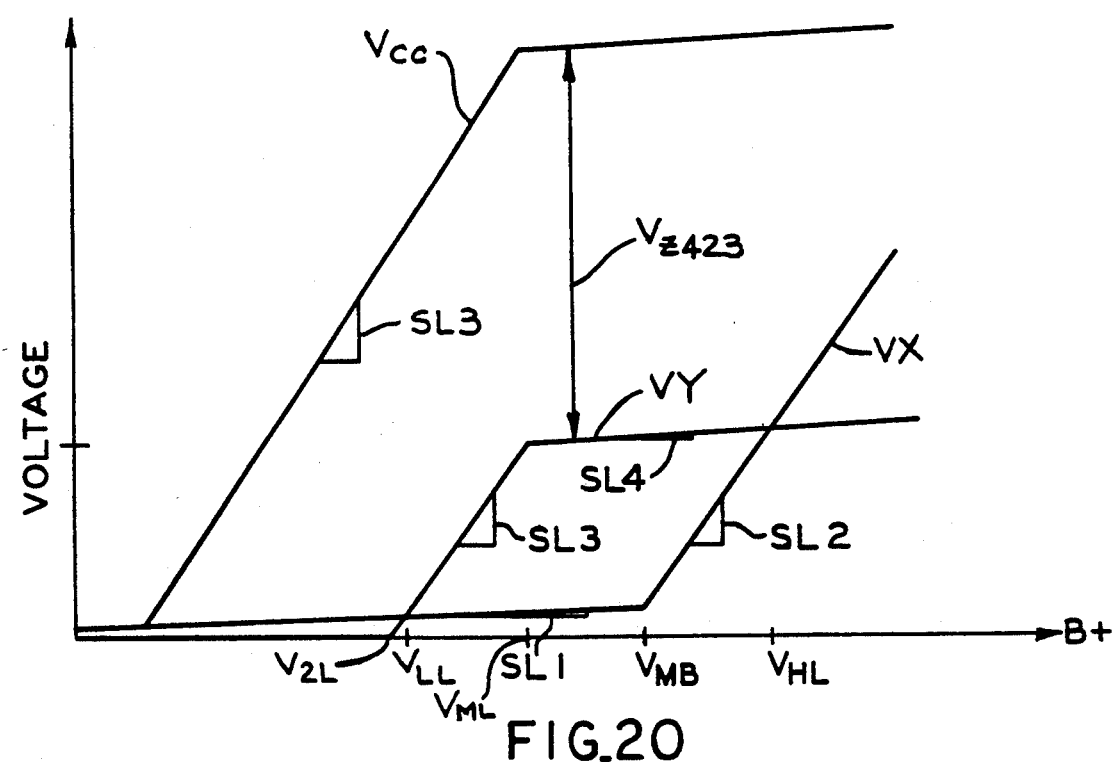
FIG. 20 is a diagram of voltage versus source voltage of various voltages in the circuit of FIG. 19, illustrating further inventive operations.

As shown in FIG. 20, first circuit 409 of FIG. 19 derives a first voltage VX from the source voltage as a first function of the source voltage. Voltage VX varies with a first slope SL1 substantially linearly with the voltage of the power source to a value $V_{MB}$ whereupon the voltage VX varies with a second slope SL2 greater than the first slope SL1. Second circuit 411 derives voltage VY from the source voltage as a second function of the source voltage. Voltage VY is relatively low and less than VX for source voltage up to a first value $V_{2L}$ and thereafter increases with the source voltage to a second value $V_{ML}$ and then is substantially constant for source voltages above $V_{ML}$. Put another way, voltage VY is relatively low for source voltage up to value $V_{2L}$ and varies with a slope SL3 substantially linearly with the source voltage to value $V_{ML}$ and then varies as a function of source voltage with a slope SL4 which is less than slope SL3.

Voltage VY is arranged to be equal to the voltage VX only at the lower voltage limit $V_{LL}$ and the higher voltage limit $V_{HL}$ where the voltage curves VX and VY intersect. Comparator 407 compares the first and second voltages VX and VY to produce low active control signal UVOV/ for the apparatus to be powered.

Figure 21:
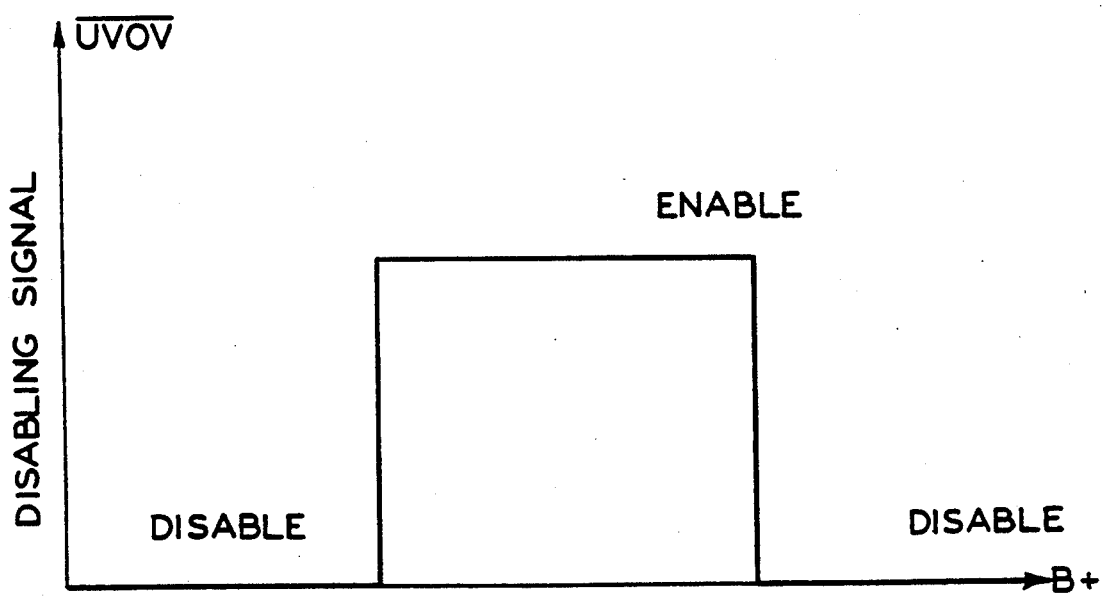
FIG. 21 is a diagram of voltage versus source voltage of an under-overvoltage disabling output UVOV/ for the circuit of FIG. 19, illustrating more inventive operations.

As shown in FIG. 21, signal UVOV/ indicates that the source voltage is within the range when UVOV/ is high, or outside the range when UVOV/ is low. Since voltage VX exceeds voltage VY when the source voltage is outside the range between the lower and higher voltage limits $V_{LL}$ and $V_{HL}$, output UVOV/ of comparator 407 goes low. When the source voltage is within the range between the lower and higher voltage limits $V_{LL}$ and $V_{HL}$, VY exceeds VX and comparator 401 produces UVOV/ inactive high.

First deriving circuit 409 includes a voltage divider 415 having resistors 417 and 419 connected across the power source. Resistor 419 is connected at one end to circuit 411 via a signal common (triangle common with "s" designation) and connected at another end to comparator 407. A zener diode 421 is connected across resistor 417. Voltage divider 415 essentially programs the voltage VX until the voltage difference across resistor 417 reaches the zener voltage of diode 421 whence voltage VX rises at essentially 45 degrees, unity slope SL2, as shown in FIG. 20.

Second deriving circuit 411 includes a zener diode 423 and a resistor 425 connected between the power source terminal for $V_{CC}$ and signal common. Voltage $V_{CC}$ is produced by a supply circuit from voltage BB in FIG. 26. As a function of voltage B+, voltage $V_{CC}$ rises with essentially unity slope SL3, as shown in FIG. 20, until a nominal regulated plateau level of $V_{CC}$ is reached by action of the circuit of FIG. 26. A zener voltage $V_{Z423}$ of zener diode 423 of FIG. 19 is selected to be less than the plateau level of voltage $V_{CC}$ in FIG. 20.

In FIG. 19, the anode of zener diode 423 and one end of the resistor 425 are connected to the noninverting input of comparator 407. The voltage across resistor 425 is essentially zero until the voltage $V_{CC}$ exceeds the zener voltage of diode 423, whence voltage VY rises at essentially 45 degrees, unity slope SL3, as shown in FIG. 20. Above voltage $V_{ML}$, voltage VY flattens out and has a voltage level approximately equal t the plateau level of $V_{CC}$ less the zener voltage of diode 423.

Figure 22:
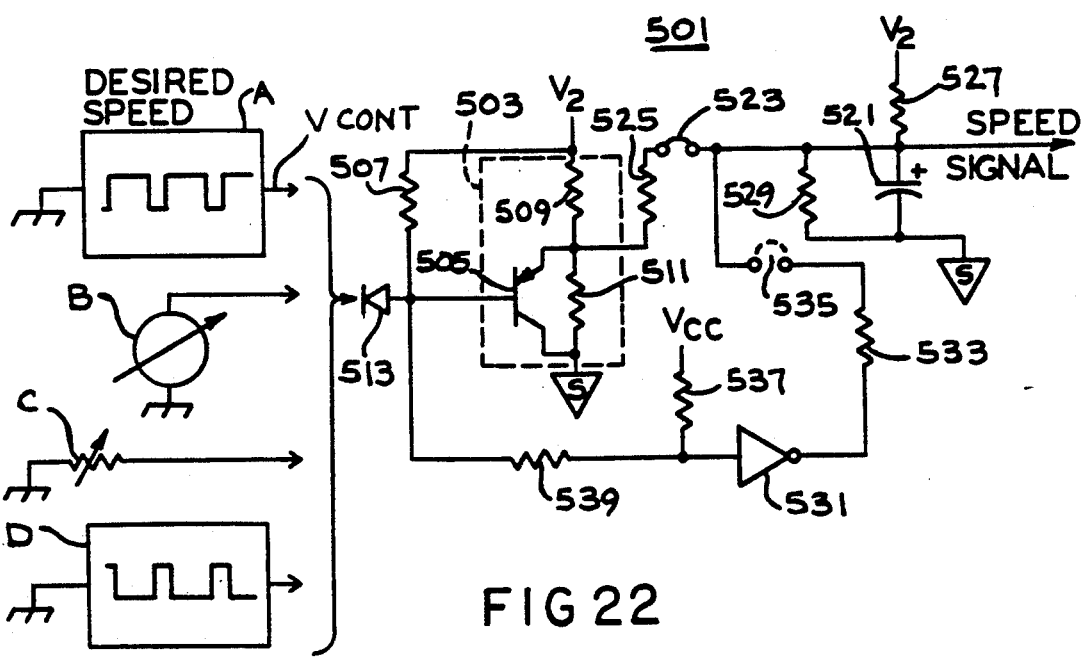
FIG. 22 is a schematic diagram of a universal input speed control circuit of the invention operating by methods of the invention and for use with the circuitry of FIG. 19.

In FIG. 22 a control circuit 501 produces the analog speed signal for PWM comparator 403 of FIG. 19. Comparator 403 generates pulse width modulated pulses to control the switches 43A-C of FIG. 2 or 221A-C of FIG. 10, and the pulses are modulated in width as a function of the analog speed signal to make the electronically commutated motor 1 rotate at a speed dependent on the energization applied to the winding stages under control of the circuit 501. Control circuit 501 is advantageously compatible with any of the following alternative external control devices: A) pulse generator with variable duty cycle to indicate desired speed, B) variable voltage source to indicate desired speed, or C) variable resistance to indicate desired speed.

Advantageously, circuit 501 has an input interface circuit 503 with an active device such as a PNP transistor 505 having its collector connected to signal common. Transistor 505 base and emitter are both resistively connected by resistors 507 and 509 to a terminal for supply voltage V2 of FIG. 26. Another resistor 511 is connected across transistor 505 emitter and collector.

Normally, pulses from circuit A or control voltage from voltage control B is merely buffered onto the emitter of transistor 505 through a diode 513 connected to the base of transistor 505 from any of the circuits A-D. However, diode 513 and transistor 505 become back-biased in case an excessive voltage is supplied by circuit A or voltage control B, and the voltage on the emitter of transistor 505 is limited to a ceiling level equal to the voltage which would appear by voltage division across resistor 511 from resistor 509 in the absence of the transistor 505 (or in case the transistor 505 were to fail open).

A variable resistor C also can program the voltage level at the emitter of transistor 505 because of the presence of resistor 507 which with resistor C divides down the supply voltage V2 and activates transistor 505 for speed control purposes. Thus the base input of interface 503 is resistively connected to a supply voltage terminal by resistor 507 for further augmenting the universal compatibility of circuit 501.

When circuit A controls speed, averaging of the emitter voltage duty cycle is performed by a capacitor 521 of sufficient capacitance for averaging purposes. Capacitor 521 is connected to signal common and connected to the emitter of transistor 505 by a jumper 523 and a resistor 525. The capacitor 521 voltage acts as the analog signal SPEED SIGNAL. If transistor 505 were to fail shorted, a speed signal is still developed across capacitor 521 by virtue of two voltage dividing resistors 527 and 529 across supply voltage V2, with capacitor 521 connected across resistor 529. Resistor 525 advantageously isolates transistor 505 from capacitor 521 in the fail short contingency, and otherwise resistor 525 couples the emitter voltage to capacitor 521 and participates in resistance-capacitance (RC) averaging with capacitor 521.

In this way the capacitor 521 develops the analog speed control signal with respect to signal common when the base of the transistor 505 is connected to any of the following external control devices: A) pulse generator with variable duty cycle to indicate desired speed, B) variable voltage source to indicate desired speed, or C) variable resistance to indicate desired speed.

Further included in circuit 501 is an inverter 531, an inverter output resistor 533, and a jumper 535 connected to capacitor 521. Jumpers 535 and 523 selectively connect either the transistor 505 or the inverter 531 in the control circuit 501 so that capacitor 521 further develops the proper analog speed control signal when the base input of transistor 505 is connected to a pulse generator D as external control device with a variable duty cycle inversely related to the desired speed. In use, jumper 523 is connected and jumper 535 is disconnected, or vice versa. In other words, jumpers 535 and 523 selectively connect capacitor 521 resistively either to the emitter of transistor 505 or to the output of inverter 531 depending on whether capacitor 521 is to develop the analog speed control signal in direct or inverse relationship respectively to the external input.

An aspect of the universal compatibility also benefits from the presence of a resistor 537 connected from voltage $V_{CC}$ to the input of inverter 531 and another resistor 539 connected from the input of inverter 531 to the base input of transistor 505 and the anode of diode 513. The resistors 537 and 539 provide coupling to inverter 531 and accessibility to supply voltage $V_{CC}$ so that not only voltage source B but also variable resistor C can be used for speed control purposes such as when they are provided with speed dials marked for speed control in a sense inverse or complementary to the marking that would be used when transistor 505 is the interface. Also, diode 513 protects the input of inverter 531 from inadvertently excessive input voltages.

Pulse circuits A and D can be hardwired circuits, or microprocessor based controllers as discussed in parent application 015,409 incorporated herein by reference. Automotive blower motor control is believed to be one of many suitable applications for the circuitry described in the present application as a whole, and the automotive blower system application is discussed in greater detail next.

In one type of blower system a fan moves air over a heat exchanger to condition the air and thereby heat or cool a compartment by blowing conditioned air to it. An electronically commutated motor 1 has a stationary armature or assembly with a core and at least two energizable wye-connected winding stages such as the three winding stages shown in FIGS. 1 and 2. The winding stages are arranged to establish a predetermined number of magnetic poles. A permanent magnet rotor as shown in FIG. 1 is coupled to the fan. An alternative motor has an exterior permanent magnet rotor and an interior stator with the winding stages wound thereon.

A temperature sensor senses an ambient temperature TA within the compartment. A temperature control acts as a level setting means for variably setting a desired level of temperature T for the compartment. The temperature sensor and temperature control are both connected to a vehicle computer, which is a microcomputer mounted sturdily for rugged vehicular use.

The vehicle computer is programmed as described in FIG. 8 of parent case 015,409 to derive a first pulse width modulated series of pulses VCONT This first series of pulses VCONT has a first duty cycle which varies as a function of the difference between temperature TA and the desired level of temperature T which is set by the temperature control. When the heat exchanger is the evaporator of an automotive air conditioner and the desired temperature T exceeds the ambient temperature TA, the first duty cycle is low or nil. On the other hand, when desired temperature T is set below ambient temperature TA, the duty cycle illustratively becomes greater in proportion to the difference between T and TA.

The pulses VCONT are a pulse width modulated series of pulses which initially begin either with a long segment having a low logic level (0% duty cycle) or with a long segment having a high logic level (100% duty cycle). Duty cycle is herein regarded as the ratio of time-on or time high to a preestablished repetition period of the series of pulses. A pulse width or time-on period of each succeeding pulse of VCONT varies depending on the motor speed which the microcomputer commands For purposes of some embodiments, a 0% duty cycle or a 100% duty cycle is not representative of any motor speed command. Then when the duty cycle lies between predetermined limits such as 5-95%, the pulse width modulation (PWM) is interpreted as indicating a motor speed proportional to the duty cycle of the pulse width modulation.

Figure 23:
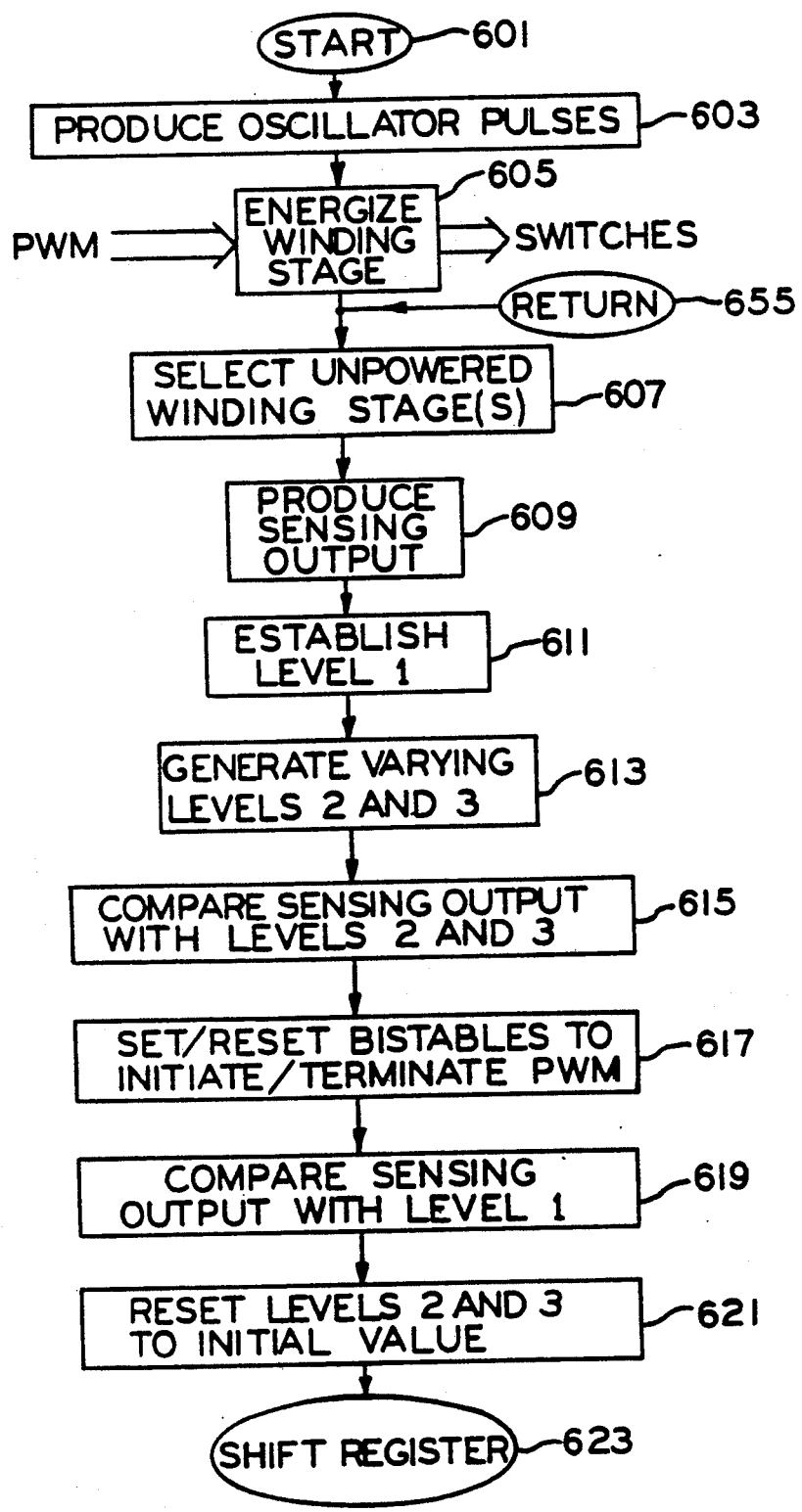
FIGS. 23 and 24 are a flow diagram of method steps of some preferred methods of operating the control circuitry and electronically commutated motor system of the earlier Figures.
Figure 24:
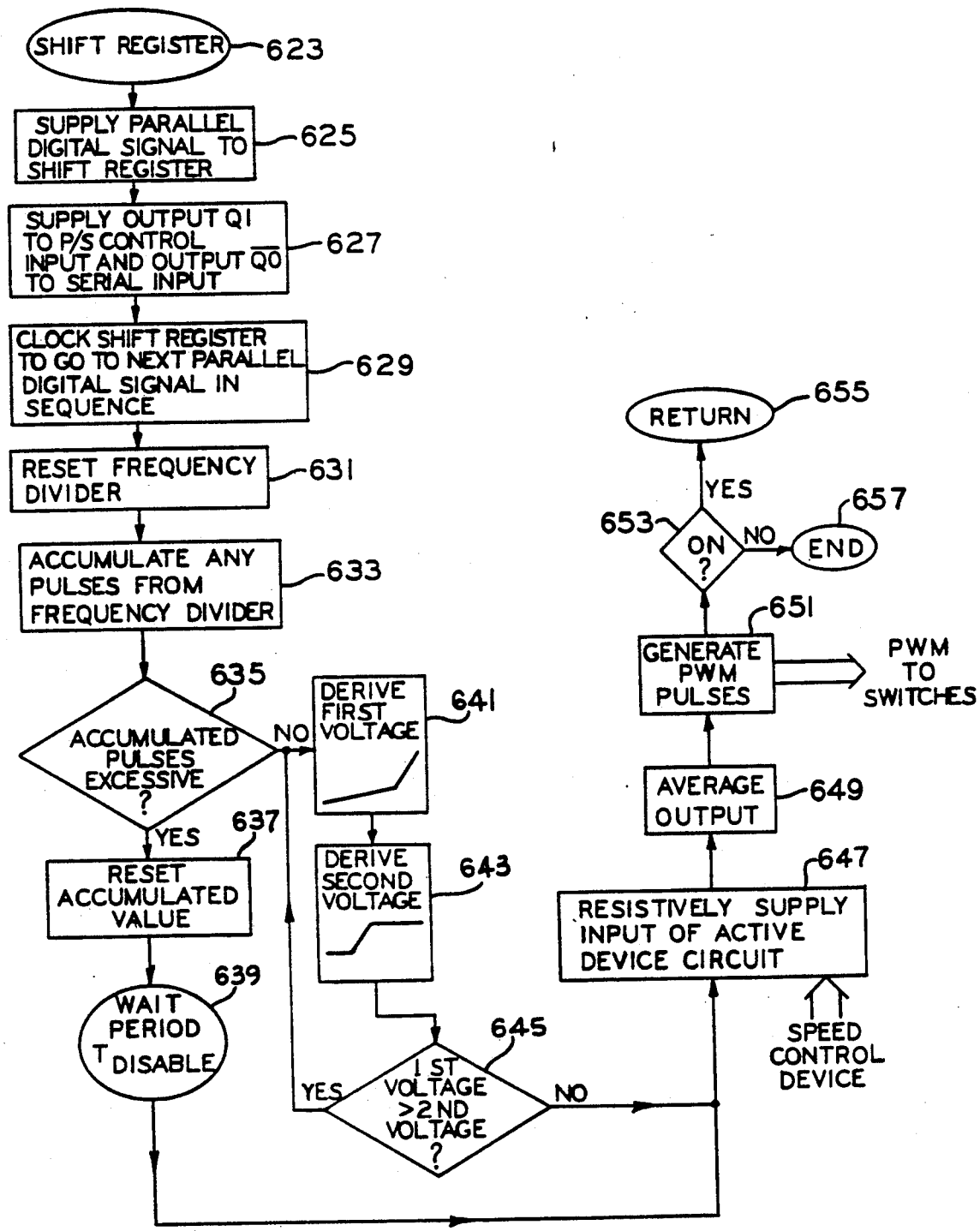

In FIGS. 23 and 24, a process of operating the control circuitry described earlier hereinabove is shown in flow diagram form. Operations commence with a START 601, and oscillator pulses are produced in a step 603. Then a step 605 energizes at least one winding stage of an electronically commutated motor by applying PWM pulses to switches connected to the motor.

Next in a step 607 selection of one or more winding stages for back emf sensing occurs. In the noise cancelling method, at least two of the unpowered winding stages are selected at any given time which have electrical signals coupled to them from each powered winding stage wherein the signals have a predetermined relationship in polarity and magnitude.

In step 609 an electrical sensing output is produced from the voltages on the winding stage terminals of the winding stages selected, so that interfering electrical signals coupled from each energized winding stage are substantially canceled when they have the predetermined relationship while the back emf is preserved for position sensing substantially free from interference from the electrical signals that are coupled from the energized winding stages to the unpowered winding stages. (Alternatively, the sensing output is derived from the terminal voltage of a single temporarily unpowered winding stage.) The sensing output is integrated or otherwise derived to be a function of angular position of the rotatable assembly.

In a step 611 a first electrical level is established to be representative of a first position of the rotatable assembly at which advancing in a sequence of commutation is to occur. Second and third electrical levels are also established in a step 613 to be representative of a second position of the rotatable assembly at which a temporarily powered winding stage is to be deenergized and third position at which a temporarily unpowered winding stage is to be energized. Any of the first, second and third electrical levels are varied, such as by beginning with an initial value, generating the variable level such as a ramp, and then in a later step 621 resetting each varying electrical level to the initial value and resuming the generating step on a later pass. Each varying electrical level thereby depends on the frequency of the sensing output that results from the speed of the rotatable assembly.

After step 613, the sensing output is compared in a step 615 with the second and third electrical levels to produce first and second control signals when the second and third angular positions are respectively reached by the rotatable assembly.

In a step 617 commutation control is performed by a set of bistables for the winding stages. Each bistable has a first state for powering a respective winding stage in response to the second control signal and a second state for terminating the application of voltage to the same winding stage in response to the first control signal. A sequence of electrical signals (e.g. a, b, c) are generated to determine or select the bistable which shall receive the first control signal and which of the bistables shall receive the second control signal. The first control signal resets a selected bistable to terminate the application of PWM voltage to a temporarily powered winding stage. The second control signal resets another selected bistable to initiate the application of PWM voltage to an unpowered winding stage.

In the next step 619, the sensing output is compared with the first electrical level, and when that level is reached, operations advance in the sequence a, b, c to effect rotation of the rotatable assembly. Then in step 621, as discussed above, the second and third electrical levels are reset to their initial values when a varying process for them is employed for speed-dependent angle advance and other purposes.

At point 623 a shift routine is provided and continued in FIG. 24, such as by employing a shift register having a serial input, a set of parallel inputs, a control input to select the serial input or parallel inputs for entry, and outputs for supplying a parallel digital signal representing a commutation in the sequence.

In step 625 of FIG. 24 a parallel digital signal representing a particular commutation in the sequence is supplied to the set of parallel inputs of the shift register. Then in a step 627 the control input of the shift register is supplied with at least one of the outputs and the serial input is supplied with a signal depending inversely on at least one of the outputs. A step 629 clocks the shift register so that if any unrepresentative parallel digital signal appears at the outputs of the shift register which does not represent any commutation in the sequence, the unrepresentative parallel digital signal is replaced by another parallel digital signal representing a commutation in the sequence when the shift register is clocked.

A step 631 involves repeatedly frequency dividing the oscillator pulses to supply lower frequency pulses, and repeatedly resetting the process in response to the sensing signal, so that when the rotatable assembly is turning at least as fast as a predetermined spin rate, the sensing signal is generated at a repetition rate for resetting that prevents the lower frequency pulses from being supplied and otherwise allows the lower frequency pulses to be supplied when the sensing signal is generated at a lower repetition rate.

Next a step 633 accumulates the lower frequency pulses when they occur to produce an electrical signal generally representing an accumulated number of the lower frequency pulses. If in a test step 635 the number of accumulated pulses is excessive, operations branch to a step 637 to reset the accumulated value. A step 639 then supplies a disabling signal for the commutating circuit for a predetermined period of time to prevent energization of the motor during that predetermined period of time.

If the accumulated value in step 635 is not excessive, operations instead go to an under-overvoltage routine. Here, a step 641 derives a first voltage from the source voltage as a first function of the source voltage and then a step 643 derives a second voltage from the source voltage as a second function of the source voltage, wherein the second voltage is equal to the first voltage only at a lower voltage limit and a higher voltage limit. A test step 645 compares the first and second voltages to produce a control signal for the apparatus to be powered, the control signal indicating whether the source voltage is within or outside the range. If the voltage is outside the range (V1 greater than V2), then operations loop back to step 641 preventing energization of the motor or other apparatus to be powered until the source voltage is within the range.

After either step 639 or step 645, a step 647 resistively supplies an input of an active device circuit means from a terminal for a voltage source, the input also for connection to any of various external speed or torque control devices. Next a step 649 averages an output of the active device circuit means to produce an analog speed or torque control signal when the input of the active device circuit means is connected to any of the following external control devices: A) pulse generator with variable duty cycle representing desired speed, B) variable voltage source representing desired speed, or C) variable resistance representing desired speed.

A step 651 then generates pulse width modulated pulses to control switches for the motor, the pulses modulated in width as a function of the analog speed control signal. If operations are to continue, as determined by a test step 653, then they go to a RETURN 655 and loop back to step 607 of FIG. 23; otherwise an END 657 of FIG. 24 is reached.

In FIG. 25, a load dump transient (LDT) protection circuit prevents excessive voltages from an automotive power system from harming the electronically commutated motor control circuit 11 generally. In an automobile, the battery voltage B+ is usually on the order of 12 volts DC. The battery is charged by an alternator driven by the engine. The battery voltage is used to power various electronic accessories including a heating and air conditioning blower motor such as motor 1 of FIG. 1. When the battery is being charged from a very low charge and is disconnected suddenly, the alternator output voltage experiences a transient voltage condition due to stored energy in the alternator. This is referred to as a load dump transient. The load dump transient voltage illustratively may reach up to 80 volts for a duration ranging from 300 milliseconds to 500 milliseconds. Even if the control circuit 11 for the motor could be constructed of electronic components rated for this transient voltage relatively higher than the normal battery voltage, the components would almost certainly be more expensive than components rated for some lower voltage approaching battery voltage.

The LDT circuit herein provides an advantageous and economical alternative to the use of expensive components rated to withstand the transient voltage. The LDT circuit allows the use of power components rated at a lower voltage than the load dump transient voltage. When the power switching components are referenced to a terminal such as the negative terminal of battery voltage or alternator, for instance, and used to control the power through a motor winding stage or any other load which is connected in likewise manner, they can be turned for the duration of the transient to dissipate it in the load if the transient exceeds or is anticipated to exceed the rated voltage of the components. This is accomplished by sensing the voltage across the power components (transistor, MOSFET, etc.) or any other voltage related to the voltage across the power components and turning on the power switching components for the duration that the transient exceeds the safe value of the voltage for the power components. The energy of the transient voltage is thus absorbed in the load (e.g., motor winding stage) and the power components do not have to be rated at full transient voltage. Solid state power switching devices, which may represent a substantial cost factor in control circuit 11, thus need not be rated at a high voltage equal to the transient voltage, and instead the LDT circuit opens the way for use of more economical power switching devices in automotive applications including brush type motor controls, electronically commutated motor controls and solenoid drives.

The LDT thus acts as a type of a control circuit for use with an electrical load and a power source with a switching device therebetween, the power source having a source voltage which is subject to a transient substantially in excess of a normal value of the source voltage. A first circuit in the control produces a varying first electrical signal for the switching device to make the switching device repeatedly connect and disconnect the electrical load to and from the power source in normal operation. A second circuit responds to the transient in the source voltage when the transient occurs and is connected to the first circuit to override the first circuit so that the first electrical signal is forced to a level to make the switching means connect the electrical load to the power source for the duration of the transient.

The circuitry of FIG. 25 is described in further detail in connection with the FIG. 10 circuitry associated with winding stages 4. The voltage across capacitor 253 of FIG. 10 is about the same as voltage B+ at neutral 4N. When the voltage across capacitor 253 exceeds a desired set point or predetermined level (e.g. 40 volts in one embodiment), a zener diode 711 of FIG. 25 conducts. Zener diode 711 is connected to a voltage divider having resistors 713 and 715 between diode 711 and common. The resistor 715 is also connected to the non-inverting (+) input of a comparator 717. Comparator 717 also has an inverting (−) input connected to a second voltage divider 719 which derives a reference voltage from supply voltage Vcc. A bypass capacitor 721 is connected from voltage Vcc to common. A resistor 723 connected between the output of comparator 717 and its noninverting input provides hysteresis for comparator 717. A pullup resistor 725 is connected between comparator 717 output and Vcc.

When the voltage across capacitor 253 exceeds the desired set point and zener diode 711 conducts, the voltage at the noninverting (+) input of comparator 717 exceeds the reference voltage from divider 719 at the inverting (−) input of the comparator 717. Consequently, the output of comparator 717 becomes high, indicative of a load dump transient condition.

Commutation pulses with PWM for lines B, A and C of FIGS. 10 and 25 are derived in FIG. 25 from control lines a, c and b of FIG. 12 respectively by gating circuitry 731 of FIG. 25. Circuitry 731 is more complex than circuit 305 of FIG. 12 to accommodate load dump transient (LDT) protection and an autoprotective driver circuit for overcurrent sensing. The circuitry of FIG. 13 with output line PWM is suitably used as the PWM input in FIG. 25 for a series of AND gates 733, 735 and 737. These AND gates also have respective inputs for lines a, c and b of FIG. 12. The AND gates 733, 735 and 737 have outputs respectively connected to inputs of three NOR gates 743, 745 and 747. Each NOR gate 743, 745 and 747 has another input connected to the output of comparator 717 in the LDT circuit. Consequently, when the output of the comparator 717 goes high, it overrides all the signals from the AND gates 733, 735 and 737 and forces all three outputs of the NOR gates 743, 745 and 747 low. The outputs of the NOR gates 743, 745 and 747 are respectively connected to inputs of three inverters 753, 755 and 757 which have their outputs connected to lines B, A and C respectively to the FET switch circuits 221B, 221A and 221C of FIG. 10. Consequently, when the outputs of the NOR gates are low, the outputs of the inverters on lines B, A and C become high, which turn on all of the power FETs and the load dump transient energy is absorbed by the load, in this case the motor winding stages 4 of FIG. 10. The voltage across capacitor 253 of FIG. 10 falls as the transient is absorbed, so that the comparator 717 output of FIG. 25 eventually goes low, and normal commutation by the AND gates, NOR gates and inverters of FIG. 25 resumes.

An autoprotective driver circuit 761 of FIG. 25 is discussed next. Overcurrent protection with a current sensing resistor in series with the power circuit to the motor is a workable approach for current sensing, but it is believed that an alternative improved approach, called an autoprotective driver herein, is desirable to improve circuit efficiency and economy. In the autoprotective driver, each FET power switch such as 223 of FIG. 10 is advantageously protected by detecting involuntary desaturation. In a preferred embodiment, an uncomplicated circuit and method of sensing the involuntary desaturation recognize that as the current through power switch 223 increases, the saturation voltage across the switch increases. This voltage is detected when the voltage across the FET 223 exceeds a predetermined level. A comparator circuit or a Zener diode detector or other comparing circuits are suitably used for this purpose and to turn off the drive to the power switch when the excessive voltage is detected.

"Involuntary desaturation" as used herein generally refers to an excessive rise in voltage across the power switch due to excessive current therethrough during drive conditions. On the other hand, "voluntary desaturation" herein generally refers to a rise in voltage across the power switch when drive is off, as when back EMF across an unpowered winding stage is present. Accordingly, it is desirable to also provide a preventive circuit 763 to prevent production of an excessive-current condition signal when no winding stage is powered, since voluntary desaturation is occurring.

In protective circuit 761, a NAND gate 765 produces low-active overcurrent disabling signal OC/ for PWM circuit 335 of FIG. 13, for instance. One input of NAND gate 765 is connected to wire-ORed low-active open-collector outputs of a set of comparators 767A-C equal in number to the number of winding stages Each of the comparators 767A-C has an inverting input connected to a circuit 769 that produces a dynamically variable electrical level representing current limit as a function of speed (or in other embodiments, torque or a combination of speed and torque). Each of the comparators 767A-C has its noninverting input resistively connected to a respective terminal 4AT, 4BT, 4CT of the winding stages. A protective network has diodes 771A-C connected from each noninverting input to a zener diode 773. Since the winding stage terminals 4AT, 4BT, 4CT are connected to the FET switches 221A-C of FIG. 10, comparators 767A-C sense the saturation voltage of each FET switch that is conductive. Due to the wire-OR connection of the comparators 767A-C, their output line to NAND gate 765 is low if any FET switch is on and has saturation voltage which is not excessive. Back EMF sensed from terminals of the unpowered other winding stages does not effect the level on the output line unless all of the winding stages are unpowered. However, if any FET switch is conductive and has excessive saturation voltage due to overcurrent, then its corresponding comparator in the set 767A-C is high, and all of the comparators 767A-C have output high, enabling NAND gate 765 and producing overcurrent output OC/ low. Thus, when the saturation voltage across a switching FET exceeds the variable electrical level from circuit 769 in magnitude, current for the motor is limited as a function of motor speed.

NAND gate 763 has three inputs respectively connected to the outputs of NOR gates 743, 745 and 747 in the commutating logic. NAND gate 763 operates when the commutation pulses are absent on lines B, A, C for preventing production of the disabling overcurrent signal OC/ by NAND gate 765. NAND gate 763 supplies a low preventing signal to NAND gate 765 via a fast discharge, slow-charge resistance-capacitance network 775 when all of lines B, A, C have the same level (low) for making solid state switching devices such as the FETs 221A-C nonconductive. In this way, false overcurrent OC/ lows are prevented when voluntary desaturation is present.

Circuit 769 supplies the dynamically variable overcurrent reference level to comparators 767A-C. Circuit 769 has a voltage divider of resistors 775 and 776 connected to a supply terminal for the source voltage $V_{CC}$ and a capacitor 777 connected across the resistor 776 part of the voltage divider. A coupling capacitor 778 and resistor 779 are connected between line a of the commutating logic and capacitor 777. A diode 780 is connected with its anode to common and cathode to capacitor 778 and resistor 779. In this way capacitor 777 is charged from the commutation pulses on line a. If the commutation pulses are absent, capacitor 777 has a voltage indicative of a preset overcurrent level established by voltage divider resistors 775 and 776. The voltage across capacitor 777 increases as a direct function of repetition rate of commutation pulses supplied to it from line a. In this way, capacitor 777 has a motor-speed-dependent voltage representing a speed-dependent overcurrent level or limit for the motor.

FIG. 26 shows a power supply circuit 781 for producing voltages $V_{CC}$, V2 and T from voltage BB (diode drop below B+) in response to presence of a speed control voltage VCONT. When VCONT is present, a first transistor 782 charges a capacitor 783 (unless VCONT goes high and remains high). Voltage across capacitor 783, turns on a second transistor 785 and a third transistor 786. Transistor 786 connects voltage BB to output T to activate the relay 231 of FIG. 10. Transistor 786 also provides energization for a zener diode 787, the voltage across which is provided to the base of a fourth transistor 788. Transistor 788 has its collector connected to voltage BB, and its emitter connected to a filter capacitor 789 and to the output line for voltage $V_{CC}$ there produced. A lower regulated voltage level V2 is provided by a resistor 790 and a zener diode 791, where the V2 output is the voltage across zener diode 791. The anode of zener diode 791 is connected to signal ground. Capacitor 789 is connected between the emitter of transistor 788 and power ground. A resistor 792 on the order of ten ohms connects power ground and signal ground. In this way, ground loop voltages developed by power current in motor 1 and elsewhere in an automotive electrical system are isolated and prevented from interfering substantially with lower level signal voltages or currents.

Figure 27:
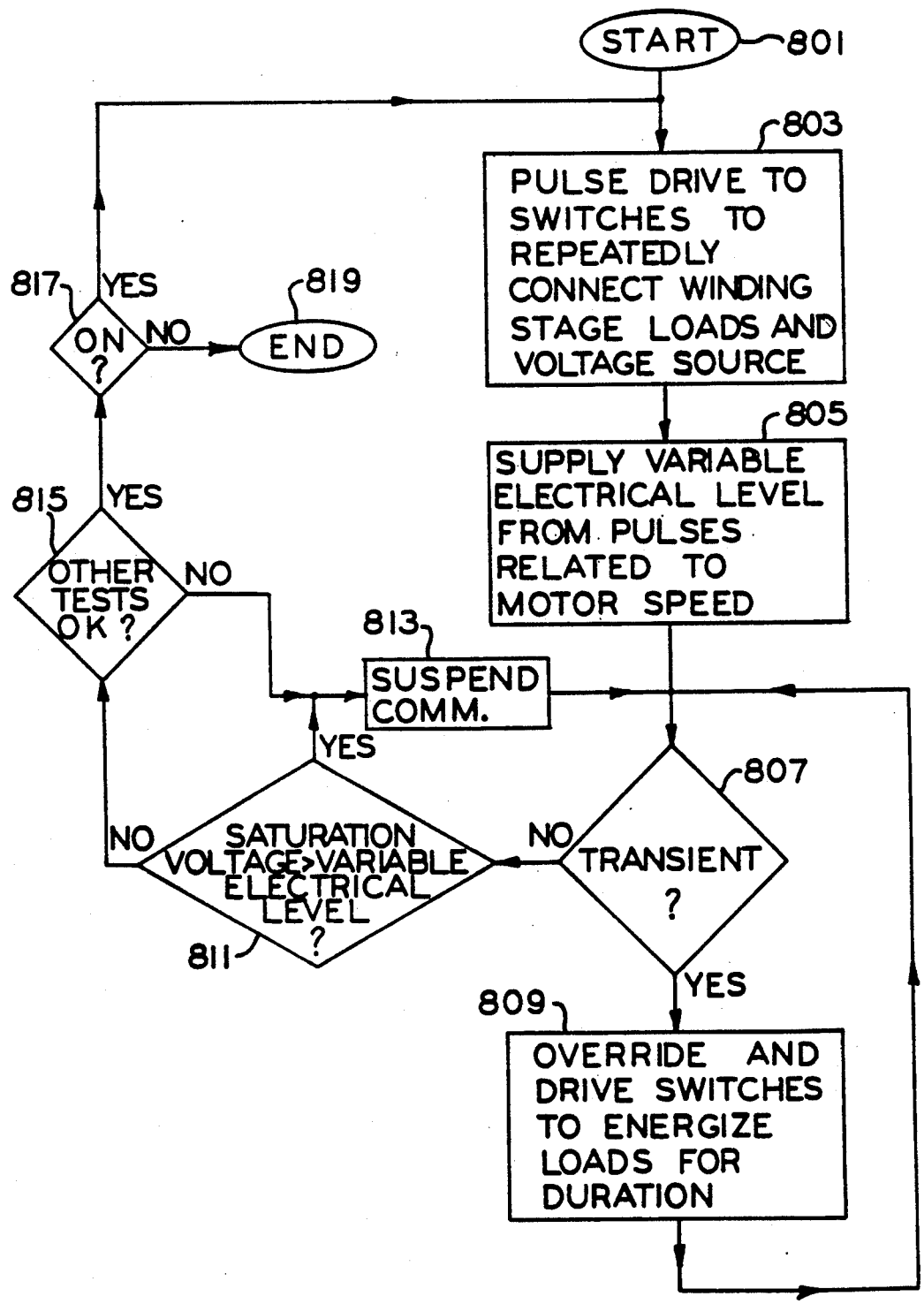
FIG. 27 is a flow diagram of method steps of some preferred methods of operating the control circuitry and electronically commutated motor system of FIGS. 10 and 25.

FIG. 27 shows steps in a method of operating circuitry like that of FIG. 25 and FIG. 10 that has solid state switching devices between an electrical load and a power source in which overcurrents and load dump transients are to be prevented. The switching devices have a saturation voltage depending on current flowing through them when conducting.

Operations commence with a START 801 and proceed to a step 803 for producing a varying first electrical signal for the switching devices to make them repeatedly connect and disconnect the electrical load to and from the power source in normal operation. For example, in an electronically commutated motor system, commutation pulses are generated in a preselected sequence to make the solid state switching devices conduct and commutate the winding stages in the preselected sequence to rotate the rotatable assembly. The repetition rate of the commutation pulses is generally directly related to the speed of the rotatable assembly.

In a next step 805, a variable electrical level is made to vary in magnitude as a function of the repetition rate of the commutation pulses. The electrical level is used to represent a current limit for the motor as a function of motor speed.

A test step 807 determines whether a power source transient such as a load dump transient exists. If so, operations proceed to a step 809 to override step 803 when the transient occurs by forcing the drive for the switches to a level to make the switches connect the electrical motor load to the power source for the duration of the transient. Operations loop back from step 809 to 807 until the transient is ended.

When the transient is no longer present, operations branch from test step 807 to another test step 811 to determine whether the saturation voltage across any of the switches exceeds the variable electrical level derived in step 805. If so, an overcurrent exists at the motor speed presently occurring, and operations branch to a step 813 to suspend or circumvent commutation step 803 by entering a tight loop back to test step 807. Thus, when the saturation voltage across the switches exceeds the step 805 speed dependent level in magnitude, current for the motor is limited as a function of motor speed because step 803 is not executed.

When the transient is absent and the overcurrent is no longer present, operations proceed from step 811 to any further tests which are advisably implemented in a test step 815. If other tests are not passed, operations branch back to step 813 to suspend commutation. Otherwise, operations proceed to a step 817. If operations are to continue on, then they loop to step 803 to continue to drive the motor load, else they branch to an END 819. It should be apparent that the operations of FIG. 27 can be merged with those of FIGS. 23 and 24 or executed in parallel with appropriate interrupts to the process of FIGS. 23 and 24.

Since FIGS. 23, 24 and 27 are representative of operations which can be programmed as software for operating a microcomputer, as well as representing operations in hardware, it is to be understood that various computer embodiments are also within the scope of the invention.

The exemplifications set out herein illustrate preferred embodiments of the invention in one form thereof, and such exemplifications are not to be construed as limiting the scope of the invention in any manner.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A control circuit for an electronically commutated motor having a rotatable assembly and further having a stationary assembly with a plurality of winding stages having terminals for energization, and switching means for applying a voltage to one or more of the terminals of the winding stages at a time and commutating the winding stages in a preselected sequence to rotate the rotatable assembly, leaving a preselected sequence of winding stages correspondingly unpowered so that a plurality of the winding stages are unpowered at some time, wherein the winding stages generate back emf signals and also couple electrical signals from each energized winding stage to the unpowered winding stages which signals can interfere with detection of back emf for position sensing purposes, the control circuit comprising:

means for selecting at least two of the unpowered winding stages which have electrical signals coupled to them that have a predetermined relationship in polarity and magnitude; and means for producing an electrical output from the voltages on the winding stage terminals of the winding stages selected, so that the electrical signals coupled from each energized winding stage are substantially canceled when they have the predetermined relationship while the back emf is preserved for position sensing substantially free from interference from the electrical signals that are coupled from each energized winding stage to the unpowered winding stages.

2. A control circuit as set forth in claim 1 wherein said means for producing includes means for providing the electrical output as a function of the difference of the voltages on the terminals of a pair of the winding stages selected.

3. A control circuit as set forth in claim 1 wherein said means for producing includes means operable generally for integrating a function of the difference of the voltages on the winding stage terminals of a pair of the winding stages selected so that the back emf is integrated substantially free of interference from the electrical signals coupled from the energized winding stages and the integrated output is generally representative of the angular position of the rotatable assembly.

4. A control circuit as set forth in claim 1 further comprising means for establishing a first electrical level representative of a first angular position of the rotatable assembly at which an energized winding stage is to be deenergized, and a second electrical level representative of a second angular position of the rotatable assembly at which the switching means is to advance in the sequence, and comparing means, connected to said means for producing, for comparing the electrical output with the first and second electrical levels to produce first and second control signals for the switching means when the first and second angular positions are respectively reached by the rotatable assembly.

5. A control circuit as set forth in claim 4 wherein said means for establishing includes means for varying at least one of the first and second electrical levels as an inverse function of speed of the rotatable assembly.

6. A control circuit as set forth in claim 5 wherein said means for varying includes means for generating the first electrical level to represent a varying value beginning with an initial value and for resetting the first electrical level to the initial value in response to the second control signal whereupon said means for generating resumes generating the varying first electrical level.

7. A control circuit as set forth in claim 5 wherein said means for varying includes a capacitor and means for repeatedly charging and discharging said capacitor, to vary the first electrical level.

8. A control circuit as set forth in claim 1 wherein said means for selecting includes controlling means responsive to an input signal for generating a sequence of control signals representing a sequence of winding stages to be energized by advancing in the sequence upon each occurrence of the input signal, comparing means for supplying the input signal by comparing with an electrical level the electrical output of said means for producing, and electronically controlled switch means responsive to said controlling means to connect a pair of unpowered winding stages in sequence to said means for producing.

9. A control circuit as set forth in claim 1 wherein said means for producing has two inputs for the winding stages selected by said means for selecting, and said means for selecting includes electronically controlled switch means for selectively connecting to a given winding stage either of said two inputs of said means for producing to maintain the same polarity of the back emf across said two inputs for position sensing purposes.

10. A control circuit as set forth in claim 1 further comprising shift register means having a serial input, a set of parallel inputs, a control input to select the serial input or the parallel inputs for entry, and a set of outputs for supplying a parallel digital signal representing a commutation in the sequence, said shift register to be protected from electrical interference which could cause the outputs to supply a parallel digital signal unrepresentative of any commutation in the sequence, further means for supplying a parallel digital signal representing a particular commutation in the sequence to the set of parallel inputs of said shift register means, and means for clocking said shift register means in response to said means for producing, said control input of said shift register means connected to respond to at least one of the outputs and said serial input connected to respond to at least one of the outputs so that if any unrepresentative parallel digital signal appears which does not represent any commutation in the sequence at the outputs of said shift register, the unrepresentative parallel digital signal is replaced by another parallel digital signal representing a commutation in the sequence when said means for clocking next clocks said shift register means.

11. A control circuit as set forth in claim 1 wherein the voltage for the motor comprises a source voltage which should be in a range between a lower voltage limit and a higher voltage limit, the control circuit further comprising first means for deriving a first voltage from the source voltage as a first function of the source voltage, second means for deriving a second voltage from the source voltage as a second function of the source voltage, wherein the second voltage is equal to the first voltage only at the lower voltage limit and the higher voltage limit, and means, connected to said first and second means for deriving, for comparing the first and second voltages to produce a disabling signal for the switching means when the source voltage is outside the range.

12. A control circuit as set forth in claim 1 further comprising oscillator means for producing oscillator pulses; means for frequency dividing the oscillator pulses to supply lower frequency pulses, said means for frequency dividing having a reset input for repeated resetting by said means for producing, so that when the rotatable assembly is turning at least as fast as a predetermined spin rate, the electrical output is generated at a repetition rate for resetting said means for frequency dividing that prevents the lower frequency pulses from being supplied and otherwise allows the lower frequency pulses to be supplied when the electrical output is generated at a lower repetition rate; means responsive to the lower frequency pulses when they occur for producing an electrical signal generally representing an accumulated number of the lower frequency pulses; and means for supplying a disabling signal for a predetermined period of time for the switching means when the electrical signal representing the accumulated number of the lower frequency pulses reaches a predetermined value.

13. A control circuit as set forth in claim 1 for use with a voltage source and external control devices for setting speed and further comprising means responsive to said electrical output for operating the switching means, and means for supplying an analog speed control signal to said means for operating the switching means, said means for supplying including a capacitor and active device circuit means having an output resistively connected to said capacitor, and also having an input resistively connected to a terminal for the voltage source, so that said capacitor develops the analog speed control signal when the input of said active device circuit means is connected to any of the following external control devices: A) pulse generator with variable duty cycle representing desired speed, B) variable voltage source representing desired speed, or C) variable resistance representing desired speed.

14. A control circuit for an electronically commutated motor to be energized from a power source and including a stationary assembly having a plurality of winding stages connected to a neutral adapted to be electronically commutated in a preselected sequence, and a rotatable assembly associated in selective magnetic coupling relation with the winding stages, each winding stage having a terminal and a terminal voltage associated therewith, the control circuit comprising:

commutating means for applying a voltage from the power source to energize the motor so that a winding stage is temporarily powered and another winding stage is temporarily unpowered, terminating the application of voltage to a temporarily powered winding stage in response to a first control signal and advancing in the sequence in response to a second control signal to effect rotation of the rotatable assembly;

means responsive to the terminal voltage of a temporarily unpowered winding stage for producing a sensing output which is a function of angular position of the rotatable assembly;

voltage divider means for the neutral for providing a voltage generally proportional to the voltage on the neutral to said means for producing the sensing output;

means for establishing a first electrical level representative of a first position of the rotatable assembly at which a temporarily powered winding stage is to be deenergized, and a second electrical level representative of a second position of the rotatable assembly at which said commutating means is to advance in the sequence; and means for comparing the sensing output with the first and second electrical levels to produce the first and second control signals for said commutating means when the first and second positions are respectively reached by the rotatable assembly.

15. A control circuit as set forth in claim 14 wherein said commutating means includes a set of bistable means for the winding stages, each bistable means having a first state for powering a respective winding stage and a second state for terminating the application of voltage to the same winding stage in response to the first control signal, and controlling means for generating a sequence of electrical signals to determine which of said bistable means shall receive the first control signal, said controlling means being responsive to the second control signal to advance in the, sequence upon each occurrence of the second control signal.

16. The control circuit as set forth in claim 15 further comprising electronically controlled switch means, responsive to the electrical signals from said controlling means for selectively connecting at least one unpowered winding stage at any given time to said means for producing the sensing output.

17. A control circuit as set forth in claim 14 further comprising means for supplying an analog speed control signal with respect to a common to said commutating means, said means for supplying including a capacitor and active device circuit means having an output resistively connected to said capacitor, and also having an input resistively connected to a terminal for the power source, so that said capacitor develops the analog speed control signal when the input of said active device circuit means is connected to any of the following external control devices: A) pulse generator with variable duty cycle representing desired sped, B) variable voltage source representing desired speed, or C) variable resistance representing desired speed.

18. A control circuit as set forth in claim 14 wherein said means for establishing includes means for varying at least one of the first and second electrical levels as an inverse function of speed of the rotatable assembly.

19. A control circuit as set forth in claim 14 wherein said means for establishing includes a capacitor and means for charging said capacitor, to produce the first electrical level.

20. A control circuit as set forth in claim 19 further comprising means for discharging said capacitor in response to the second control signal whereupon said means for charging resumes charging said capacitor to produce the first electrical level.

21. A control circuit as set forth in claim 14 wherein said commutating means includes shift register means having a serial input, a set of parallel inputs, a control input to select the serial input or parallel inputs for entry, and outputs for supplying a parallel digital signal representing a commutation in the sequence, said shift register means to be protected from electrical interference which could cause the outputs to supply a parallel digital signal unrepresentative of any commutation in the sequence, further includes means for supplying a parallel digital signal representing a particular commutation in the sequence to the set of parallel inputs of said shift register means, and means for clocking said shift register means in response to the second control signal, said control input of said shift register means connected to respond to at least one of the outputs and said serial input connected to respond to at least one of the outputs so that if any unrepresentative parallel digital signal appears which does not represent any commutation in the sequence at the outputs of said shift register means, the unrepresentative parallel digital signal is replaced by another parallel digital signal representing a commutation in the sequence when said means for clocking next clocks said shift register means.

22. A control circuit as set forth in claim 14 wherein the power source for the motor should have its source voltage in a range between a lower voltage limit and a higher voltage limit, the control circuit further comprising first means for deriving a first voltage from the source voltage as a first function of the source voltage, second means for deriving a second voltage from the source voltage as a second function of the source voltage, wherein the second voltage is equal to the first voltage only at the lower voltage limit and the higher voltage limit, and means, connected to said first and second means for deriving, for comparing the first and second voltages to produce a disabling signal for said commutating means when the source voltage is outside the range.

23. A control circuit as set forth in claim 14 further comprising oscillator means for producing oscillator pulses; means for frequency dividing the oscillator pulses to supply lower frequency pulses, said means for frequency dividing having a reset input for repeated resetting responsive to the second control signal, so that when the rotatable assembly is turning at least as fast as a predetermined spin rate, the second control signal is generated at a repetition rate for resetting said means for frequency dividing that prevents the lower frequency pulses from being supplied and otherwise allows the lower frequency pulses to be supplied when the second control signal is generated at a lower repetition rate; means responsive to the lower frequency pulses when they occur for producing an electrical signal generally representing an accumulated number of the lower frequency pulses; and means for supplying a disabling signal for a predetermined period of time for the commutating means when the electrical signal representing the accumulated number of the lower frequency pulses reaches a predetermined value.

24. A method of operating an electronically commutated motor having a rotatable assembly and further having a stationary assembly with a plurality of winding stages having terminals and terminal voltages, and solid state switching means for applying a source voltage to one or more of the terminals of the winding stages at a time, the solid state switching means having a saturation voltage depending on current flowing through them when conducting, the method comprising the steps of:

generating commutation pulses in a preselected sequence to make the solid state switching means conduct and commutate the winding stages in the preselected sequence to rotate the rotatable assembly, the repetition rate of the commutation pulses being related to the speed of the rotatable assembly;

supplying a variable electrical level which varies in magnitude as a function of the repetition rate of the commutation pulses, the electrical level representing a current limit for the motor as a function of motor speed; and suspending the commutating step when the saturation voltage across the switching means exceeds the variable electrical level in magnitude whereby current for the motor is limited as a function of motor speed.

25. A control circuit for an electronically commutated motor to be energized from a power source and including a stationary assembly having at least first, second and third winding stages adapted to be electronically commutated in a preselected sequence, and a rotatable assembly associated in selective magnetic coupling relation with the winding stages, each winding stage having a terminal and a terminal voltage associated therewith, the control circuit comprising:

commutating means for applying a voltage from the power source to temporarily power the first winding stage while the second and third winding stages are temporarily unpowered, initiating the application of voltage to the second winding stage in response to a first control signal and terminating the application of voltage to the first winding stage in response to a second control signal, and advancing in the sequence in response to a third control signal to effect rotation of the rotatable assembly;

means responsive to the terminal voltage of the temporarily unpowered third winding stage for producing a sensing output which is a function of angular position of the rotatable assembly;

means for establishing a first electrical level representative of a first position of the rotatable assembly at which voltage is to be applied to the second winding stage, a second electrical level representative of a second position of the rotatable assembly at which voltage to the first winding stage is to be terminated, and a third electrical level representative of a third position of the rotatable assembly at which said commutating means is to advance in the sequence; and means for comparing the sensing output with the first, second and third electrical levels to produce the first, second and third control signals for said commutating means when the first, second and third positions are respectively reached by the rotatable assembly.

26. A control circuit as set forth in claim 25 wherein said commutating means includes a set of bistable means for the winding stages, each bistable means having a first state for powering a respective winding stage in response to the first control signal and a second state for terminating the application of voltage to the respective winding stage in response to the second control signal, and controlling means for generating a sequence of electrical signals to determine which of said bistable means shall receive the first control signal and which of said bistable means shall receive the second control signal, said controlling means being responsive to the third control signal to advance in the sequence upon each occurrence of the third control signal.

27. A control circuit as set forth in claim 26 further comprising electronically controlled switch means responsive to the electrical signals from said controlling means for selectively connecting at least one unpowered winding stage at any given time to said means for producing the sensing output.

28. A control circuit as set forth in claim 25 wherein said winding stages are connected at a neutral, the circuit further comprising voltage divider means for the neutral for providing a voltage generally proportional to the voltage on the neutral to said means for producing the sensing output.

29. A control circuit as set forth in claim 25 wherein said means for establishing includes means for varying at least one of the first and second electrical levels as an inverse function of speed of the rotatable assembly.

30. A control circuit as set forth in claim 25 wherein said means for establishing includes a capacitor and means for charging said capacitor, to produce the first electrical level.

31. A control circuit as set forth in claim 30 further comprising means for discharging said capacitor in response to said third control signal whereupon said means for charging resumes charging said capacitor to produce the first electrical level.

32. A control circuit for an electronically commutated motor to be energized from a power source and including a stationary assembly having at least first, second and third winding stages adapted to be electronically commutated in a preselected sequence, and a rotatable assembly associated in selective magnetic coupling relation with the winding stages, each winding stage having a terminal and a terminal voltage associated therewith, the control circuit comprising:

commutating means for applying a voltage from the power source to temporarily power the first winding stage while the second and third winding stages are temporarily unpowered, terminating the application of voltage to the first winding stage in response to a first control signal and initiating the application of voltage to the second winding stage in response to a second control signal, and advancing in the sequence in response to a third control signal to effect rotation of the rotatable assembly;

means responsive to the terminal voltage of the temporarily unpowered third winding stage for producing a sensing output which is a function of angular position of the rotatable assembly;

means for establishing a first electrical level representative of a first position of the rotatable assembly at which voltage to the first winding stage is to be terminated, a second electrical level representative of a second position of the rotatable assembly at which voltage to the second winding stage is to be applied, and a third electrical level representative of a third position of the rotatable assembly at which said commutating means is to advance in the sequence; and means for comparing the sensing output with the first, second and third electrical levels to produce the first, second and third control signals for said commutating means when the first, second and third positions are respectively reached by the rotatable assembly.

33. A control circuit as set forth in claim 32 wherein said commutating means includes a set of bistable means for the winding stages, each bistable means having a first state for powering a respective winding stage in response to the second control signal and a second state for terminating the application of voltage to the respective winding stage in response to the first control signal, and controlling means for generating a sequence of electrical signals to determine which of said bistable means shall receive the first control signal and which of said bistable means shall receive the second control signal, said controlling means being responsive to the third control signal to advance in the sequence upon each occurrence of the third control signal.

34. A control circuit as set forth in claim 33 further comprising electronically controlled switch means responsive to the electrical signals from said controlling means for selectively connecting at least one unpowered winding stage at any given time to said means for producing the sensing output.

35. A control circuit as set forth in claim 32 wherein said winding stages are connected at a neutral, the circuit further comprising voltage divider means for the neutral for providing a voltage generally proportional to the voltage on the neutral to said means for producing the sensing output.

36. A control circuit as set forth in claim 32 wherein said means for establishing includes means for varying at least one of the first and second electrical levels as an inverse function of speed of the rotatable assembly.

37. A control circuit as set forth in claim 32 wherein said means for establishing includes a capacitor and means for charging said capacitor, to produce the first electrical level.

38. A control circuit as set forth in claim 37 further comprising means for discharging said capacitor in response to said third control signal whereupon said means for charging resumes charging said capacitor to produce the first electrical level.

39. A control circuit for an electronically commutated motor to be energized from a power source and including a stationary assembly having at least three winding stages adapted to be electronically commutated in a preselected sequence, and a rotatable assembly associated in selective magnetic coupling relation with the winding stages, each winding stage having a terminal and a terminal voltage associated therewith, the control circuit comprising:

a set of bistable means for the winding stages, each bistable means having a first state for powering a respective winding stage in response to a first control signal and a second state for terminating the application of voltage to the same winding stage in response to a second control signal; electrical signals to determine which of said bistable means shall receive the first control signal and which of said bistable means shall receive the second control signal, wherein at least one winding stage is temporarily unpowered, said controlling means being responsive to a third control signal to advance in the sequence;

means responsive to the terminal voltage of at least one temporarily unpowered winding stage to produce a sensing output which is a function of angular position of the rotatable assembly; and means for comparing the sensing output with first, second and third electrical levels to respectively produce the first and second control signals for said bistable means and the third control signal for said controlling means.

40. A control circuit as set forth in claim 39 further comprising means for varying at least one of the first and second electrical levels relative to the other so that at least two of the winding stages variably overlap in a time period of energization or variably in time to terminate the voltage applied to one of the winding stages before a time when the second of the two winding stages has voltage applied to it.

41. A control circuit as set forth in claim 39 further comprising means for varying at least one of the first and second electrical levels as a function of speed of the rotatable assembly.

42. A control circuit as set forth in claim 39 further comprising means for varying at least one of the first and second electrical levels as an inverse function of speed of the rotatable assembly.

43. A control circuit as set forth in claim 39 further comprising a capacitor and means for charging said capacitor, to produce the first electrical level.

44. A control circuit as set forth in claim 43 further comprising means for discharging said capacitor in response to the third control signal whereupon said means for charging resumes charging said capacitor to produce the first electrical level.

45. A control circuit for an electronically commutated motor to be energized from a power source and including a stationary assembly having a plurality of winding stages, a rotatable assembly associated in selective magnetic coupling relation with the winding stages, and commutating means for electronically commutating the winding stages in a preselected sequence in response to at least one control signal, each winding stage having a terminal and a terminal voltage associated therewith, the control circuit comprising:

means responsive to the terminal voltage of at least one winding stage for producing a sensing output which is a function of angular position of the rotatable assembly, the sensing output having a-variable frequency which depends on the speed of the rotatable assembly;

means for comparing the sensing output with a first electrical level to produce a first control signal for the commutating means; and means for generating a varying second electrical level representing a varying value beginning with an initial value, for resetting the second electrical level to the initial value in response to the first control signal and for resuming the generation of the varying second electrical level which thereby depends on the frequency of the sensing output that results from the speed of the rotatable assembly, said comparing means including means for also comparing the sensing output with the second electrical level to produce a second control signal for the commutating means.

46. A control circuit as set forth in claim 45 wherein said means for generating the varying second electrical level includes means for restraining the second electrical level from varying beyond a predetermined value provided it reaches the predetermined value before the first control signal next occurs, whereby the second electrical level reaches and is limited to the predetermined value at speeds of the rotatable assembly less than a predetermined speed.

47. A control circuit as set forth in claim 45 wherein said means for generating the varying second electrical level includes a capacitor, means for charging said capacitor to produce the second electrical level, and means for discharging said capacitor in response to the first control signal whereupon said means for charging resumes charging said capacitor to produce the second electrical level.

48. A control circuit as set forth in claim 47 wherein said means for generating the varying second electrical level further includes a high impedance buffer circuit means connected across said capacitor for producing a buffer output to provide the second electrical level, and zener diode means for limiting the buffer output provided it reaches a predetermined level.

49. A control circuit as set forth in claim 47 wherein said means for generating the varying second electrical level further includes voltage division means connected between the power source and said capacitor, said means for comparing having an input connected to said voltage division means.

50. A control circuit as set forth in claim 49 wherein said voltage division means includes two independently adjustable potentiometers, and said means for comparing includes means connected to adjustable points on both potentiometers for comparing the voltages thereat to the sensing output for turn-on and turn-off purposes of the commutating means in commutating the winding stages of the electronically commutated motor.

51. A control circuit as set forth in claim 49 wherein said voltage division means includes an adjustable potentiometer for setting a firing angle for the motor at slower speeds, and said means for charging said capacitor includes variable resistor means for controlling angle advance of the firing angle at speeds beyond the slower speeds.

52. A control circuit as set forth in claim 45 wherein said means for producing the sensing output includes means for integrating, the control circuit further comprising electronic switch means for selectively connecting the winding stage terminals to said means for integrating.

53. Control circuit for an electronically commutated motor having a rotatable assembly and further having a stationary assembly with a plurality of winding stages, and switching means for commutating the winding stages in a preselected sequence to rotate the rotatable assembly, the control circuit comprising:

shift register means having a serial input, a set of parallel inputs, a control input to select the serial input or parallel inputs for entry, and outputs for supplying a parallel digital signal representing a commutation in the sequence, said shift register means to be protected from electrical interference which could cause the outputs to supply a parallel digital signal unrepresentative of any commutation in the sequence;

means for supplying a parallel digital signal representing a particular commutation in the sequence to the set of parallel inputs of said shift register means; and means for clocking said shift register means, said control input of said shift register means connected to respond to at least one of the outputs and said serial input connected to respond to at least one of the outputs so that if any unrepresentative parallel digital signal appears which does not represent any commutation in the sequence at the outputs of said shift register means, the unrepresentative parallel digital signal is replaced by another parallel digital signal representing a commutation in the sequence when said means for clocking next clocks said shift register means.

54. A control circuit as set forth in claim 53 wherein said shift register means has at least first, second, and third outputs, said second output connected to said control input.

55. A control circuit as set forth in claim 53 wherein said shift register means has at least first, second and third outputs, the control circuit further comprising inverting means for supplying the logical complement of the first output of said shift register means to said serial input of said shift register means.

56. A control circuit as set forth in claim 53 wherein said shift register means has at least first, second, and third outputs, said second output connected to said control input, further comprising inverting means for supplying the logical complement of the first output of said shift register means to said serial input of said shift register means.

57. A control circuit as set forth in claim 53 wherein said means for supplying a parallel digital signal representing a particular commutation in the sequence to the set of parallel inputs of said shift register means includes means for supplying the parallel digital signal to have one bit with a first logic state and two further bits with the complementary logic state.

58. A control circuit as set forth in claim 53 wherein said means for supplying a parallel digital signal representing a particular commutation in the sequence to the set of parallel inputs of said shift register means includes means for supplying the parallel digital signal in a fixed form with one bit high and two further bits low.

59. A control circuit as set forth in claim 53 for use with a power source and further comprising means for resetting the outputs of said shift register means when power from the power source is interrupted and resumes.

60. A control circuit as set forth in claim 53 wherein said means for clocking includes means for comparing an externally derived signal generally representative of angular position of the rotatable assembly with an electrical level, and means for supplying a clock pulse to said shift register means when said externally derived signal reaches the electrical level.

61. A control circuit as set forth in claim 60 wherein said means for clocking further includes means for generating a series of pulses for starting the motor, and said means for supplying a clock pulse to said shift register means when said externally derived signal reaches the electrical level includes a one-shot circuit means having an input connected to said means for comparing and having an output for supplying a clock pulse, OR-gate means having a first input connected to said output of said one-shot circuit means and a second input connected to said means for generating a series of pulses for starting the motor, the OR-gate means having an output connected to clock said shift register means.

62. A control circuit as set forth in claim 53 further comprising a set of logic gate means respectively connected to the outputs of said shift register means, and means for supplying pulse width modulated pulses to said logic gate means, said logic gate means producing respective outputs for the switching means to commutate the motor.

63. A control circuit as set forth in claim 62 for use with a power source for the motor having a source voltage which is supposed to be in a range between a lower voltage limit and a higher voltage limit, the control circuit further comprising first means for deriving a first voltage from the source voltage as a first function of the source voltage, second means for deriving a second voltage from the source voltage as a second function of the source voltage, wherein the second voltage is equal to the first voltage only at the lower voltage limit and the higher voltage limit, and means, connected to said first and second means for deriving, for comparing the first and second voltages to prevent the pulse width modulated pulses from activating the switching means when the source voltage is outside the range.

64. A control circuit as set forth in claim 62 for use with a voltage source and further comprising means for supplying an analog speed control signal to said means for supplying the pulse width modulated pulses, including a capacitor and active device circuit means having an output resistively connected to said capacitor, and an input resistively connected to a terminal for the voltage source, so that said capacitor develops the analog speed control signal when the input of said active device circuit means is connected to any of the following external control devices: A) pulse generator with variable duty cycle representative of desired speed, B) variable voltage source representative of desired speed, or C) variable resistance representative of desired speed.

65. A control circuit as set forth in claim 53 further for use with position sensing means for repeatedly generating a sensing signal generally representative of rotation of the rotatable assembly, the control circuit further comprising oscillator means for producing oscillator pulses; means for frequency dividing the oscillator pulses to supply lower frequency pulses, said means for frequency dividing having a reset input for repeated resetting by the sensing signal, so that when the rotatable assembly is turning at least as fast as a predetermined spin rate the sensing signal is generated at a repetition rate for resetting that prevents the lower frequency pulses from being supplied and otherwise allows the lower frequency pulses to be supplied when the sensing signal is generated at a lower repetition rate; means responsive to the lower frequency pulses when they occur for producing an electrical signal generally representing an accumulated number of the lower frequency pulses; and means for supplying a disabling signal for a predetermined period of time to prevent the pulse width modulated pulses from activating the switching means when a predetermined value is reached by the electrical signal representing the accumulated number of lower frequency pulses.

66. A control circuit as set forth in claim 53 wherein said shift register means has at least first, second and third outputs, said second output connected to said control input, and the control circuit further comprises inverter means for supplying the logical complement of the first output of said shift register means to said serial input of said shift register means, said means for supplying a parallel digital signal to the set of parallel inputs including means for supplying the parallel digital signal to have one bit with a first logic state and two further bits with the complementary logic state, said means for clocking including means for comparing an externally derived signal generally representative of angular position of the rotatable assembly with an electrical level, and means for supplying a clock pulse to said shift register means when said externally derived signal reaches the electrical level.

67. A control circuit as set forth in claim 66 further comprising a set of logic gate means respectively connected to the outputs of said shift register means, and means for supplying pulse width modulated pulses to said logic gate means, said logic gate means producing respective outputs for the switching means to commutate the motor.

68. Control circuit for an electronically commutated motor having a rotatable assembly and further having a stationary assembly with a plurality of winding stages, position sensing means for repeatedly generating a sensing signal generally representative of rotation of the rotatable assembly, and commutating means responsive to the sensing signal for commutating the winding stages in a preselected sequence to energize the winding stages and thereby rotate the rotatable assembly, the control circuit comprising:

oscillator means for producing oscillator pulses;

means for frequency dividing the oscillator pulses to supply lower frequency pulses, said means for frequency dividing having a reset input for repeated resetting by said sensing signal, so that when the rotatable assembly is turning at least as fast as a predetermined spin rate the sensing signal is generated at a repetition rate for resetting that prevents the lower frequency pulses from being supplied and otherwise allows the lower frequency pulses to be supplied when the sensing signal is generated at a lower repetition rate; means responsive to the lower frequency pulses when they occur for producing an electrical signal generally representing an accumulated number of the lower frequency pulses; and means for comparing with a predetermined value the electrical signal representing the accumulated number of the lower frequency pulses, and for supplying a disabling signal for a predetermined period of time for the commutating means after the predetermined value is reached by the electrical signal, to prevent energization of the motor during that predetermined period of time.

69. A control circuit as set forth in claim 68 wherein said means for frequency dividing includes a binary counter having an output for supplying the lower frequency pulses.

70. A control circuit as set forth in claim 68 wherein said means for frequency dividing includes a binary counter having a first output for supplying the lower frequency pulses and the counter additionally including means for frequency dividing the lower frequency pulses to produce a series of start pulses at a second output for the commutating means.

71. A control circuit as set forth in claim 68 wherein said means for frequency dividing includes a binary counter having a first output for frequency division of the oscillator pulses by a factor at least equal to the ratio of the repetition rate of the oscillator pulses to the repetition rate of the sensing signal at the predetermined spin rate of the motor above which the lower frequency pulses are prevented.

72. A control circuit as set forth in claim 68 wherein said motor has a first number of pairs of magnetic poles and a second number of winding stages, wherein said means for frequency dividing includes a binary counter having a first output for frequency division of the oscillator pulses by a factor of two-to-a-power-Q ($2^Q$) where the power Q at least equals the logarithm-to-the-base-2 of the ratio of the repetition rate of the oscillator pulses to the product of the predetermined spin rate with the first and second numbers.

73. A control circuit as set forth in claim 68 wherein said means for comparing includes means for temporarily isolating said means for producing the electrical signal representing the accumulated number of the lower frequency pulses from said means for frequency dividing, when the electrical signal reaches the predetermined value.

74. A control circuit as set forth in claim 73 wherein said means for temporarily isolating includes a diode network interconnecting said means for frequency dividing, said means for producing the electrical signal representing the accumulated number, and said means for comparing.

75. A control circuit as set forth in claim 68 wherein said means for producing the electrical signal generally representing an accumulated number of the lower frequency pulses includes a resistance-capacitance (RC) charging network connected between said means for frequency dividing and said means for comparing, so that the lower frequency pulses charge the capacitance in the RC charging network to a voltage representing an accumulated number of the lower frequency pulses when they occur.

76. A control circuit as set forth in claim 75 wherein said means for comparing includes a comparator with hysteresis having an input connected to said RC network.

77. A control circuit as set forth in claim 75 wherein said means for comparing includes a diode network, a voltage divider for establishing a reference voltage representing the predetermined value, a comparator having a first input connected to said RC network for sensing the voltage to which said capacitance is charged, a second input connected to said voltage divider, and a comparator output for providing the disabling signal, said diode network connecting said comparator output to said voltage divider to reduce the reference voltage when the disabling signal occurs, said diode network further interconnecting said means for frequency dividing to said RC network and to said comparator output so that said RC network is isolated from said means for frequency dividing when said disabling signal is produced, said RC network including resistive discharging means for discharging the capacitance over the predetermined period of time to the reference voltage so reduced whereupon the comparator output ceases to produce the disabling signal and said RC network is again chargeable by said means for frequency dividing.

78. A control circuit as set forth in claim 68 for use with a power source for the motor having a source voltage which is supposed to be in a range between a lower voltage limit and a higher voltage limit, the control circuit further comprising first means for deriving a first voltage from the source voltage as a first function of the source voltage, second means for deriving a second voltage from the source voltage as a second function of the source voltage, wherein the second voltage is equal to the first voltage only at the lower voltage limit and the higher voltage limit, and second comparing means, connected to said first and second means for deriving, for comparing the first and second voltages to produce a second disabling signal, on a line shared with the disabling signal for said first-named means for comparing, for the commutating means to also prevent energization of the motor when the source voltage is outside the range.

79. Control circuit for an electronically commutated motor having a rotatable assembly and further having a stationary assembly with a plurality of winding stages, and switching means for commutating the winding stages in a preselected sequence to rotate the rotatable assembly, the control circuit comprising:

first means for comparing an externally derived signal generally representative of angular position of the rotatable assembly with an electrical level and for supplying a sensing signal when said externally derived signal reaches the electrical level;

means for generating clock pulses;

means for generating pulse width modulated pulses for causing the switching means to energize the motor;

means for frequency dividing the clock pulses to produce lower frequency pulses, said means for frequency dividing being reset by the sensing signal from said first means, so that unless the rotatable assembly is turning at least as fast as a predetermined spin rate, the sensing signal is produced at a sufficiently low repetition rate for resetting said means for frequency dividing to permit the lower frequency pulses to be produced;

means for producing an electrical signal generally representing an accumulated number of the lower frequency pulses when they occur; and means for comparing with a predetermined value the electrical signal representing the accumulated number of the lower frequency pulses, said means for comparing connected to said means for generating pulse width modulated pulses to prevent the generation of the pulse width modulated pulses for a predetermined period of time after the predetermined value is reached by the electrical signal.

80. A control circuit as set forth in claim 79 wherein said means for frequency dividing includes a binary counter having a first output for supplying the lower frequency pulses and the counter additionally including means for frequency dividing the lower frequency pulses to produce a series of start pulses at a second output.

81. A control circuit as set forth in claim 79 wherein the predetermined period of time exceeds a period of the lower frequency pulses and the control circuit further comprising means operative during the predetermined period of time for resetting the electrical signal representing the accumulated number to represent a lower number instead.

82. A control circuit as set forth in claim 79 wherein said motor has a first number of pairs of magnetic poles and a second number of winding stages, wherein said means for frequency dividing includes a binary counter having a first output representing frequency division of the clock pulses by a factor of two-to-a-power-Q ($2^Q$) where the power Q at least equals the logarithm-to-the-base-2 of the ratio of the repetition rate of the clock pulses to the product of the predetermined spin rate with the first and second numbers.

83. A control circuit as set forth in claim 79 wherein said means for comparing includes means for temporarily isolating said means for producing the electrical signal representing the accumulated number of the lower frequency pulses from said means for frequency dividing, when the electrical signal reaches the predetermined value.

84. A control circuit as set forth in claim 83 wherein said means for temporarily isolating includes a diode network interconnecting said means for frequency dividing, said means for producing the electrical signal representing the accumulated number, and said means for comparing.

85. A control circuit as set forth in claim 79 for use with a power source for the motor having a source voltage which is supposed to be in a range between a lower voltage limit and a higher voltage limit, the control circuit further comprising first means for deriving a first voltage from the source voltage as a first function of the source voltage, second means for deriving a second voltage from the source voltage as a second function of the source voltage, wherein the second voltage is equal to the first voltage only at the lower voltage limit and the higher voltage limit, and second comparing means, connected to said first and second means for deriving, for comparing the first and second voltages to produce a disabling signal for said means for generating the pulse width modulated pulses when the source voltage is outside the range.

86. A control circuit for use with an electronically commutated motor having a rotatable assembly and further having a stationary assembly with a plurality of winding stages to be powered by a power source having a source voltage which is supposed to be in a range between a lower voltage limit and a higher voltage limit, the control circuit comprising:

first means for deriving a first voltage from the source voltage as a first function of the source voltage, said first means for deriving including means for providing the first voltage so that it varies with a first slope substantially linearly with the voltage of the power source to a value whereupon the first voltage varies with a second slope greater than the first slope;

second means for deriving a second voltage from the source voltage as a second function of the source voltage, wherein the second voltage is equal to the first voltage only at the lower voltage limit and the higher voltage limit;

means, connected to said first and second means for deriving, for comparing the first and second voltages to produce a control signal for the winding stages to be powered, the control signal indicating whether the source voltage is within or outside the range;

means, connected to said means for comparing, for generating pulse width modulated pulses when the control signal indicates that the source voltage is within the range; and switching means responsive to the pulse width modulated pulses for commutating the winding stages in a preselected sequence to energize the winding stages and thereby rotate the rotatable assembly.

87. A control circuit as set forth in claim 86 wherein said first means for deriving includes a voltage divider connected across the lower source.

88. A control circuit as set forth in claim 86 wherein said first means deriving includes a voltage divider having a first resistor and a second resistor connected across the power source, the second resistor connected at one end to said second means for deriving and connected at another end to said means for comparing, and a zener diode connected across the first resistor.

89. A control circuit as set forth in claim 86 wherein said second means for deriving includes means for providing the second voltage to be relatively low for source voltage up to a first value and to increase with the source voltage to a second value and then to be substantially constant for source voltage above the second value.

90. A control circuit as set forth in claim 86 wherein said second means for deriving includes means for providing the second voltage to be relatively low for source voltage up to a first value and to vary with a first slope substantially linearly with the source voltage to a second value and then to vary as a function of source voltage with a second slope less than the first slope.

91. A control circuit as set forth in claim 86 wherein said second means for deriving includes means for providing the second voltage to be substantially constant for source voltage up to a first value and to increase with the source voltage to a second value and then to be substantially constant for voltages of the power source above the second value.

92. A control circuit as set forth in claim 86 wherein said first means for deriving includes means for providing the first voltage to exceed the second voltage when the source voltage is outside the range between the lower and higher voltage limits and said second means for deriving includes means for providing the second voltage to exceed the first voltage when the source voltage is within the range between the lower and higher voltage limits.

93. A control circuit as set forth in claim 86 wherein said means for comparing includes means for producing the control signal as a first output level when the first voltage exceeds the second voltage and a second output level when the second voltage exceeds the first voltage.

94. A control circuit as set forth in claim 93 wherein said first means for deriving includes means for providing the first voltage so that it varies with a first slope substantially linearly with the source voltage to a value whereupon the first voltage varies with a second slope greater than the first slope.

95. A control circuit as set forth in claim 94 wherein said second means for deriving includes means for providing the second voltage to be relatively low for source voltages up to a first value and to increase with the source voltage to a second value and then to be substantially constant for source voltages above the second value.

96. A method of operating a control circuit for an electronically commutated motor having a rotatable assembly and further having a stationary assembly with a plurality of winding stages for energization, and switching means for applying a voltage from a voltage source to one or more of the winding stages at a time and commutating the winding stages in a preselected sequence to rotate the rotatable assembly at a speed dependent on the energization applied to the winding stages, the method to be compatible with utilization of alternative external control devices for desired speed and comprising the steps of:

resistively supplying an input of an active device circuit means from a terminal for the voltage source, the input also for connection to any of the external control devices;

averaging an output of the active device circuit means to produce an analog speed control signal when the input of the active device circuit means is connected to any of the following external control devices: A) pulse generator with variable duty cycle representing desired speed, B) variable voltage source representing desired speed, or C) variable resistance representing desired speed; and generating pulse width modulated pulses to control the switching means for the motor, the pulses modulated in width as a function of the analog speed control signal.

97. A method of protecting an electronically commutated motor having a rotatable assembly and further having a stationary assembly with a plurality of winding stages, position sensing means for repeatedly generating a sensing signal generally representative of rotation of the rotatable assembly, and commutating means responsive to the sensing signal for commutating the winding stages in a preselected sequence to energize the winding stages and thereby rotate the rotatable assembly, the method comprising the steps of:

producing oscillator pulses;

frequency dividing the oscillator pulses by a frequency dividing means to supply lower frequency pulses, said frequency dividing means having a reset input for repeated resetting in response to the sensing signal, so that when the rotatable assembly is turning at least as fast as a predetermined spin rate, the sensing signal is generated at a repetition rate for resetting that prevents the lower frequency pulses from being supplied and otherwise allows the lower frequency pulses to be supplied when the output signal is generated at a lower repetition rate;

responding to the lower frequency pulses when they occur to produce an electrical signal generally representing an accumulated number of the lower frequency pulses; and supplying a disabling signal for a predetermined period of time for the commutating means when a predetermined value is reached by the electrical signal representing the accumulated number, to prevent energization of the motor during that predetermined period of time.

98. A control circuit for an electronically commutated motor having a rotatable assembly and further having a stationary assembly with a plurality of winding stages for energization, and switching means for applying a voltage from a voltage source to one or more of the winding stages at a time and commutating the winding stages in a preselected sequence to rotate the rotatable assembly at a speed dependent on the energization applied to the winding stages, the control circuit to be compatible with alternative external control devices indicating desired speed, and the control circuit comprising:

means for generating pulse width modulated pulses to control the switching means, the pulses modulated in width as a function of an analog speed control signal; and means for supplying the analog speed control signal with respect to a common to said means for generating the pulse width modulated pulses, said means for supplying including a capacitor and active device circuit means having an input resistively connected to a terminal for the voltage source, said input also for connection to any of the external control devices, and an output resistively connected to said capacitor so that said capacitor develops the analog speed control signal when the input of said active device circuit means is connected to any of the following external control devices: A) pulse generator with a duty cycle representative of desired speed, B) variable voltage source representative of desired speed, or C) variable resistance representative of desired speed.

99. A control circuit as set forth in claim 98 further comprising inverting circuit means and means for selectively connecting said inverting circuit means in the control circuit so that said capacitor further develops the analog speed control signal when the input of said active device circuit means is connected to D) a pulse generator as external control device with a variable duty cycle inversely related to the desired speed.

100. A control circuit as set forth in claim 98 wherein the voltage source has a source voltage which should be in a range between a lower voltage limit and a higher voltage limit, the control circuit further comprising first means for deriving a first voltage from the source voltage as a first function of the source voltage, second means for deriving a second voltage from the source voltage as a second function of the source voltage, wherein the second voltage is equal to the first voltage only at the lower voltage limit and the higher voltage limit, and means, connected to said first and second means for deriving, for comparing the first and second voltages to produce a signal for said means for generating pulse width modulated pulses to prevent the pulse width modulated pulses from controlling the switching means when the source voltage is outside the range and otherwise to permit the pulse width modulated pulses to control the switching means.

101. A control circuit as set forth in claim 98 further for use with position sensing means for repeatedly generating a sensing signal generally representative of rotation of the rotatable assembly, the control circuit further comprising oscillator means for producing oscillator pulses; means for frequency dividing the oscillator pulses to supply lower frequency pulses, said means for frequency dividing having a reset input for repeated resetting by the sensing signal, so that when the rotatable assembly is turning at least as fast as a predetermined spin rate the sensing signal is generated at a repetition rate for resetting that prevents the lower frequency pulses from being supplied and otherwise allows the lower frequency pulses to be supplied when the sensing signal occurs at a lower repetition rate; means responsive to the lower frequency pulses when they occur for producing an electrical signal generally representing an accumulated number of the lower frequency pulses; and means for supplying a disabling signal for a predetermined period of time for the means for generating pulse width modulated pulses when a predetermined value is reached by the electrical signal representing the accumulated number of the lower frequency pulses.

102. A control circuit for an electronically commutated motor having a rotatable assembly and further having a stationary assembly with a plurality of winding stages for energization, and switching means for applying a voltage from a voltage source to one or more of the winding stages at a time and commutating the winding stages in a preselected sequence to rotate the rotatable assembly at a speed dependent on the energization applied to the winding stages, the control circuit to be compatible with alternative external control devices indicating desired speed, and the control circuit comprising:

means for generating pulse width modulated pulses to control the switching means, the pulses modulated in width as a function of an analog speed control signal; and means for supplying the analog speed control signal with respect to a common to said means for generating the pulse width modulated pulses, said means for supplying including a transistor having a collector, an emitter and a base, the collector connected to the common, a capacitor connected to the common and resistively connected to the emitter of said transistor, and the emitter and the base both resistively connected to a terminal for the voltage source, so that said capacitor develops the analog speed control signal when the base of the transistor is connected to any of the following external control devices: A) pulse generator with variable duty cycle to indicate desired speed, B) variable voltage source to indicate desired speed, or C) variable resistance to indicate desired speed.

103. A control circuit as set forth in claim 102 further comprising inverting circuit means having an output connected to said capacitor and an input connected to the base of said transistor and means for selectively connecting the capacitor resistively either to the emitter of said transistor or to the output of said inverting circuit means, whereby said capacitor further develops the analog speed control signal when the base of the transistor is connected to an external control device comprising a pulse generator with variable duty cycle inversely related to the desired speed.

104. A control circuit for use with an electrical load and a power source with switching means therebetween, the power source having a source voltage which is subject to a transient substantially in excess of a normal value of the source voltage, the control circuit comprising:

first control means, including means for producing control pulses and logic gate means responsive to the control pulses, for producing a varying first electrical signal for the switching means to make the switching means repeatedly connect and disconnect the electrical load to and from the power source in normal operation; and second control means responsive to the transient in the source voltage when the transient occurs and connected to said first control means for overriding said first control means so that the first electrical signal is forced to a level to make the switching means connect the electrical load to the power source for the duration of the transient, said logic gate means responsive to said second control means;

said second control means including means for sensing the source voltage and comparator means, responsive to said means for sensing, for producing an override signal for said first control means.

105. A control circuit as set forth in claim 104 wherein said second control means includes a zener diode connected to sense said source voltage, said second control means producing an override signal when the transient substantially exceeds a predetermined voltage for said zener diode.

106. A control circuit as set forth in claim 104 wherein said means for sensing includes a zener diode connected to sense the source voltage, and wherein said comparator means is connected oppositely to said zener diode for producing an override signal for said first control means.

107. A control circuit as set forth in claim 104 for use with an electronically commutated motor having a rotatable assembly and further having a stationary assembly with a plurality of electrical loads comprising winding stages having terminals for energization, said first control means including means for generating commutation pulses in a preselected sequence as the first electrical signal.

108. A control circuit as set forth in claim 107 wherein electrical signals from each energized winding stage can be coupled to and interfere with a back emf of each unpowered winding stage of the electronically commutated motor and said first control means further includes means for selecting at least two unpowered winding stages at a time which have electrical signals coupled to them that have a predetermined relationship in polarity and magnitude, and means for producing an electrical output from the voltages on the winding stage terminals of the winding stages selected, so that the electrical signals coupled from each energized winding stage are substantially canceled when they have the predetermined relationship while the back emf is preserved, said means for generating commutation pulses being responsive to the electrical output so produced for advancing in the preselected sequence.

109. A control circuit as set forth in claim 107 for use with an electronically commutated motor wherein each winding stage has a terminal voltage associated therewith, and said means for generating commutation pulses in the preselected sequence includes commutating means for supplying commutation pulses so that a winding stage is temporarily powered and another winding stage is temporarily unpowered, terminating a commutation pulse in response to a first control signal and advancing in the sequence in response to a second control signal; and wherein said first control means further includes means responsive to the terminal voltage of a temporarily unpowered winding stage for producing a sensing output which is a function of angular position of the rotatable assembly, means for establishing a first electrical level representative of a first position of the rotatable assembly at which a temporarily powered winding stage is to be deenergized and a second electrical level representative of a second position of the rotatable assembly at which said commutating means is to advance in the sequence, and means for comparing the sensing output with the first and second electrical levels to produce the first and second control signals for said commutating means when the first and second positions are respectively reached by the rotatable assembly.

110. A control circuit as set forth in claim 107 wherein each winding stage has a terminal voltage associated therewith and said means for generating commutation pulses in the preselected sequence includes means for initiating each commutation pulse in response to a turn-on signal, the control circuit further including means responsive to the terminal voltage of at least one winding stage for producing a sensing output which is a function of angular position of the rotatable assembly, the sensing output having a variable frequency which depends on the speed of the rotatable assembly, means for comparing the sensing output with a first electrical level to produce a first control signal to make the commutating means advance in the sequence, further means for generating a varying second electrical level representing a varying value beginning with an initial value, and means responsive to the first control signal for resetting said further means for generating so that the second electrical level is returned to the initial value whereupon said further means for generating resumes generating the varying second electrical level which thereby depends on the frequency of the sensing output that results from the speed of the rotatable assembly, said comparing means including means for also comparing the sensing output with the second electrical level to produce the turn-on signal for initiation of each commutation pulse by said means for generating the commutation pulses.

111. A control circuit as set forth in claim 107 wherein said means for generating commutation pulses in the preselected sequence includes shift register means having a serial input, a set of parallel inputs, a control input to select the serial input or parallel inputs for entry, and outputs for supplying a parallel digital signal representing a commutation in the sequence, said shift register means to be protected from electrical interference which could cause the outputs to supply a parallel digital signal unrepresentative of any commutation in the sequence, means for supplying a parallel digital signal representing a particular commutation in the sequence to the set of parallel inputs of said shift register means, and means for clocking said shift register means, said control input of said shift register means connected to respond to at least one of the outputs and said serial input connected to respond to at least one of the outputs so that if any unrepresentative parallel digital signal appears which does not represent any commutation in the sequence at the outputs of said shift register means, the unrepresentative parallel digital signal is replaced by another parallel digital signal representing a commutation in the sequence when said means for clocking next clocks said shift register means.

112. A control circuit as set forth in claim 107 further comprising position sensing means for repeatedly generating a sensing signal generally representative of rotation of the rotatable assembly, oscillator means for producing oscillator pulses, means for frequency dividing the oscillator pulses to supply lower frequency pulses, said means for frequency dividing having a reset input for repeated resetting by said sensing signal, so that when the rotatable assembly is turning at least as fast as a predetermined rate the sensing signal is generated at a repetition rate for resetting that prevents the lower frequency pulses from being supplied and otherwise allows the lower frequency pulses to be supplied when the sensing signal is generated at a lower repetition rate, means responsive to the lower frequency pulses when they occur for producing an additional electrical signal generally representing an accumulated number of the lower frequency pulses, and means for comparing the additional electrical signal with a predetermined value to prevent said means for generating the commutation pulses from doing so for a predetermined period of time after the predetermined value is reached by the additional electrical signal.

113. A control circuit as set forth in claim 107 the control circuit to be compatible with alternative external control devices indicating desired speed of the rotatable assembly, further comprising means for modulating the commutation pulses in width as a function of an analog speed control signal, and means for supplying the analog speed control signal to said means for modulating, said means for supplying including a capacitor and active device circuit means having an input resistively connected to a terminal for the power source, said input also for connection to any of the external control devices, and an output resistively connected to said capacitor so that said capacitor develops the analog speed control signal when the input of said active device circuit means is connected to any of the following external control devices: A) pulse generator with a duty cycle representative of desired speed, B) variable voltage source representative of desired speed, or C) variable resistance representative of desired speed.

114. A control circuit as set forth in claim 104 wherein the normal value of the source voltage is supposed to be in a range between a lower voltage limit and a higher voltage limit, the control circuit further comprising first means for deriving a first voltage from the source voltage as a first function of the source voltage, second means for deriving a second voltage from the source voltage as a second function of the source voltage, wherein the second voltage is equal to the first voltage only at the lower voltage limit and the higher voltage limit, and means, connected to said first and second means for deriving, for comparing the first and second voltages to produce a disabling signal for said first control means to make the switching means disconnect the electrical load from the power source when the source voltage is outside the range, subject to overriding by said second control means.

115. A method of operating a control circuit for an electronically commutated motor having a rotatable assembly and further having a stationary assembly with a plurality of winding stages, and switching means for commutating the winding stages in a preselected sequence to rotate the rotatable assembly, the method comprising the steps of:

providing shift register means having a serial input, a set of parallel inputs, a control input to select the serial input or parallel inputs for entry, and outputs for supplying a parallel digital signal representing a commutation in the sequence, said shift register means to be protected form electrical interference which could cause the outputs to supply a parallel digital signal unrepresentative of any commutation in the sequence;

supplying a parallel digital signal representing a particular commutation in the sequence to the set of parallel inputs of the shift register means;

supplying the control input of the shift register means with at least one of the output sand supplying the serial input with a signal depending on at least one of the outputs; and clocking and shift register means so that if any unrepresentative parallel digital signal appears at the outputs of the shift register means which does not represent any commutation in the sequence, the unrepresentative parallel digital signal is replaced by another parallel digital signal representing a commutation in the sequence when the shift register means is clocked.

116. A method of operating a control circuit for an electronically commutated motor to be energized from a power source and including a stationary assembly having a plurality of winding stages, a rotatable assembly associated in selective magnetic coupling relation with the winding stages, and commutating means for electronically commutating the winding stages in a preselected sequence in response to at least one control signal, each winding stage having a terminal and a terminal voltage associated therewith, the method comprising the steps of:

producing a sensing output which is a function of angular position of the rotatable assembly, the sensing output having a variable frequency which depends on the speed of the rotatable assembly;

comparing the sensing output with a first electrical level to produce a first control signal;

generating a varying second electrical level representing a varying value beginning with an initial value;

resetting the second electrical level to the initial value in response to the first control signal and resuming the generating step, the varying second electrical level thereby depending on the frequency of the sensing output that results from the speed of the rotatable assembly; and comparing the sensing output with the second electrical level to produce a second control signal for the commutating means.

117. A method of operating an electronically cummutated motor to be energized from a power source and including a stationary assembly having at least three winding stages adapted to be electronically commutated in a preselected sequence, and a rotatable assembly associated in selective magnetic coupling relation with the winding stages, each winding stage having a terminal and a terminal voltage associated therewith, the method comprising the steps of:

commutating the motor under control of a set of bistable means for the winding stages, each bistable means having a first stage for powering a respective winding stage in response to a first control signal and a second stage for terminating the application of voltage to the same winding stage in response to a second control signal;

generating a sequence of electrical signals to determine which of the bistable means shall receive the first control signal and which of the bistable means shall receive the second control signal, advancing in the sequence in response to a third control signal;

producing a sensing output which is a function of angular position of the rotatable assembly; and comparing the sensing output with first, second and third electrical levels to respectively produce the first, second and third control signals.

118. A control circuit for use with an electronically commutated motor having a rotatable assembly and further having a stationary assembly with a plurality of winding stages having terminals and terminal voltages, and solid state switching means for applying a source voltage to one or more of the terminals of the winding stages at a time, the solid state switching means having a saturation voltage depending on current flowing through them when conducting, the control circuit comprising:

commutating means for generating commutation pulses in a preselected sequence to make the solid state switching means conduct and commutate the winding stages in the preselected sequence to rotate the rotatable assembly, the repetition rate of the commutation pulses being related to the speed of the rotatable assembly;

means responsive to said commutation pulses for supplying a variable electrical level which varies in magnitude as a function of the repetition rate of the commutation pulses, the electrical level representing a current limit for the motor as a function of motor speed; and means for producing a disabling signal for said commutating means when the saturation voltage across said switching means exceeds the variable electrical level in magnitude whereby current for the motor is limited as a function of motor speed.

119. A control circuit as set forth in claim 118 wherein said means for supplying the variable electrical level includes means for producing the variable electrical level as a direct function of the repetition rate of the commutation pulses.

120. A control circuit as set forth in claim 118 wherein said means for supplying the variable electrical level includes a voltage divider connected to a terminal for the source voltage, a capacitor connected across part of the voltage divider, and means resistively connected between said commutating means and said capacitor for charging said capacitor from the commutation pulses whereby said capacitor has a speed-dependent voltage comprising the variable electrical level.

121. A control circuit as set forth in claim 118 further comprising means connected to said commutating means and operable when the commutation pulses are absent for preventing production of the disabling signal by said means for producing the disabling signal.

122. A control circuit as set forth in claim 121 wherein said commutating means includes first logic means for supplying the commutation pulses on a set of lines for the solid state switching means and said preventing means includes second logic means connected to said first logic means to supply a preventing signal to said means for producing the disabling signal so that preventing signal is supplied when all of said lines have the same level for making the solid state switching means nonconductive.

123. A control circuit as set forth in claim 122 wherein said preventing means further includes slow-charge, fast discharge resistance-capacitance network means for coupling the preventing signal to said means for producing the disabling signal.

124. A control circuit as set forth in claim 118 wherein said means for producing the disabling signal includes a set of comparator means equal in number to the number of winding stages, each of said comparator means having a first input connected to said variable electrical level and having second input connected to a respective terminal of the winding stages.

125. A control circuit as set forth in claim 124 wherein said means for producing the disabling signal further includes a protective network including diodes respectively connected from each second input of said comparator means to a zener diode.

126. A control circuit as set forth in claim 118 wherein electrical signals from each energized winding stage can be coupled to and interfere with a back emf of each unpowered winding stage of the electronically commutated motor, the control circuit further including means for selecting at least two unpowered winding stages at a time which have electrical signals coupled to them that have a predetermined relationship in polarity and magnitude, and means for producing an electrical output from the voltages on the winding stage terminals of the winding stages selected, so that the electrical signals coupled from each energized winding stage are substantially canceled when they have the predetermined relationship while the back emf is preserved, said commutating means including means responsive to the electrical output so produced for advancing in the preselected sequence.

127. A control circuit as set forth in claim 118 wherein said commutating means includes means for supplying the commutation pulses so that a winding stage is temporarily powered and another winding stage is temporarily unpowered, terminating a commutation pulse in response to a first control signal and advancing in the sequence in response to a second control signal, and wherein the control circuit further includes means responsive to the terminal voltage of a temporarily unpowered winding stage for producing a sensing output which is a function of angular position of the rotatable assembly, means for establishing a first electrical level representative of a first position of the rotatable assembly at which a temporarily powered winding stage is to be deenergized and a second electrical level representative of a second position of the rotatable assembly at which said commutating means is to advance in the sequence, and means for comparing the sensing output with the first and second electrical levels to produce the first and second control signals for said commutating means when the first and second positions are respectively reached by the rotatable assembly.

128. A control circuit as set forth in claim 118 wherein said commutating means includes means for initiating each commutation pulse in response to at least one control signal, the control circuit further including means responsive to the terminal voltage of at least one winding stage for producing a sensing output which is a function of angular position of the rotatable assembly, the sensing output having a variable frequency which depends on the speed of the rotatable assembly, means for comparing the sensing output with a first electrical level to produce a first control signal to make the commutating means advance in the sequence, further means for generating a varying second electrical level representing a varying value beginning with an initial value, and means responsive to the first control signal for resetting said further means for generating so that the second electrical level is returned to the initial value whereupon said further means for generating resumes generating the varying second electrical level which thereby depends on the frequency of the sensing output that results from the speed of the rotatable assembly, said comparing means including means for also comparing the sensing output with the second electrical level to produce a second control signal for initiation of each commutation pulse by said commutating means.

129. A control circuit as set forth in claim 118 wherein said commutating means includes shift register means having a serial input, a set of parallel inputs, a control input to select the serial input or parallel inputs for entry, and outputs for supplying a parallel digital signal comprising the commutation pulses and representing each commutation in sequence, said shift register means to be protected from electrical interference which could cause the outputs to supply a parallel digital signal unrepresentative of any commutation in the sequence, means for supplying a parallel digital signal representing a particular commutation in the sequence to the set of parallel inputs of said shift register means, and means for clocking said shift register means, said control input of said shift register means connected to respond to at least one of the outputs and said serial input connected to respond to at least one of the outputs so that if any unrepresentative parallel digital signal appears which does not represent any commutation in the sequence at the outputs of said shift register means, the unrepresentative parallel digital signal is replaced by another parallel digital signal representing a commutation in the sequence when said means for clocking next clocks said shift register means.

130. A control circuit as set forth in claim 118 further comprising position sensing means for repeatedly generating a sensing signal generally representative of rotation of the rotatable assembly, oscillator means for producing oscillator pulses, means for frequency dividing the oscillator pulses to supply lower frequency pulses, said means for frequency dividing having a reset input for repeated resetting by said sensing signal, so that when the rotatable assembly is turning at least as fast as a predetermined rate the sensing signal is generated at a repetition rate for resetting that prevents the lower frequency pulses from being supplied and otherwise allows the lower frequency pulses to be supplied when the sensing signal is generated at a lower repetition rate, means responsive to the lower frequency pulses when they occur for producing an additional electrical signal generally representing an accumulated number of the lower frequency pulses, and means for comparing the additional electrical signal with a predetermined value to prevent said commutating means from generating the commutation pulses for a predetermined period of time after the predetermined value is reached by the additional electrical signal.

131. A control circuit as set forth in claim 118, the control circuit to be compatible with alternative external control devices indicating desired speed of the rotatable assembly, further comprising means for modulating the commutation pulses in width as a function of an analog speed control signal, and means for supplying the analog speed control signal to said means for modulating, said means for supplying including a capacitor and active device circuit means having an input resistively connected to a terminal for the power source, said input also for connection to any of the external control devices, and an output resistively connected to said capacitor so that said capacitor develops the analog speed control signal when the input of said active device circuit means is connected to any of the following external control devices: A) pulse generator with a duty cycle representative of desired speed, B) variable voltage source representative of desired speed, or C) variable resistance representative of desired speed.

132. A control circuit as set forth in claim 118 wherein the source voltage is to be in a range between a lower voltage limit and a higher voltage limit, the control circuit further comprising first means for deriving a first voltage from the source voltage as a first function of the source voltage, second means for deriving a second voltage from the source voltage as a second function of the source voltage, wherein the second voltage is equal to the first voltage only at the lower voltage limit and the higher voltage limit, and means, connected to said first and second means for deriving, for comparing the first and second voltages to produce a disabling signal for said commutating means when the source voltage is outside the range.

133. A control circuit as set forth in claim 118 wherein the source voltage is subject to a transient substantially in excess of a normal value of the source voltage, and further comprising control means responsive to the transient in the source voltage when the transient occurs and connected to said commutating means for overriding the commutation pulses to make at least one of the solid state switching means conduct for the duration of the transient.

134. An electronically commutated motor system comprising:
- an electronically commutated motor having a rotatable assembly and further having a stationary assembly with a plurality of winding stages connected together at a neutral for energization, the winding stages having terminals for switching;
- switching means connected to the terminals for applying a voltage to one or more of the winding stages at a time;
- commutating means, connected to control said switching means, for commutating the winding stages in a preselected sequence to rotate the rotatable assembly, leaving a preselected sequence of winding stages correspondingly unpowered so that at least two of the winding stages are unpowered at some time, wherein the winding stages generate back emf signals and also couple electrical signals from each energized winding stage to the unpowered winding stages which signals can interfere with detection of back emf for position sensing purposes;
- means for selecting a pair of the unpowered winding stages which have electrical signals coupled to them that are substantially the same in polarity and magnitude; and
- means, connected to control said commutating means, for producing an electrical output which is a function of the difference of the voltages on the winding stage terminals of the pair of the winding stages selected, whereby the electrical signals coupled from each energized winding stage are substantially canceled while the back emf is preserved and the electrical output varies as a function of the position of the rotatable assembly substantially free from interference from the electrical signals that are coupled from each energized winding stage to the unpowered winding stages.

135. An electronically commutated motor system energizable from a power source and comprising:
- an electronically commutated motor including a stationary assembly having a plurality of winding stages adapted to be electronically commutated in a preselected sequence, and a rotatable assembly associated in selective magnetic coupling relation with said winding stages, each of said winding stages having a terminal and a terminal voltage associated therewith;
- commutating means for applying a voltage from the power source to energize the motor so that a winding stage is temporarily powered and another winding stage is temporarily unpowered, terminating the application of voltage to the temporarily powered winding stage in response to a first control pulse and advancing in the sequence in response to a second control pulse to effect rotation of said rotatable assembly;
- means operable generally for integrating for terminal voltage of the temporarily unpowered winding stage to produce an integrated output generally representative of angular position of said rotatable assembly;
- means for establishing a first electrical level representative of a first angular position of the rotatable assembly at which the temporarily powered winding stage is to be deenergized, and a second electrical level representative of a second angular position of said rotatable assembly at which said commutating means is to advance in the sequence; and
- means for comparing the integrated output with the first and second electrical levels to produce the first and second control pulses for said commutating means when the first and second angular positions are respectively reached by said rotatable assembly.

136. An electronically commutated motor system energizable from a power source and comprising:
- an electronically commutated motor including a stationary assembly having at least three winding stages adapted to be electronically commutated in a preselected sequence, and a rotatable assembly associated in selective magnetic coupling relation with said winding stages, each of said winding stages having a terminal and a terminal voltage associated therewith;
- bistable means for each winding stage and having a first state for powering a respective winding stage in response to a first control signal and a second state for terminating the application of voltage to the same winding stage in response to a second control signal;
- controlling means for generating a sequence of electrical signals for said bistable means to determine which of said winding stages shall be powered in response to the first control signal and which of said winding stages shall have voltage terminated in response to the second control signal, said controlling means being responsive to a third control signal to advance in the sequence upon each occurrence of the third control signal;
- means responsive to the terminal voltage of at least one temporarily unpowered winding stage to produce a sensing output which is a function of angular position of said rotatable assembly; and
- means for comparing the sensing output with first, second and third electrical levels to respectively produce the first and second control signals for said bistable means and the third control signal for said controlling means.

137. An electronically commutated motor system energizable from a power source and comprising:
- an electronically commutated motor including a stationary assembly having a plurality of winding stages, and a rotatable assembly associated in selective magnetic coupling relation with said winding stages;
- means for electronically commutating said winding stages in a preselected sequence in response to at least one control signal, each said winding stage having a terminal and a terminal voltage associated therewith;

means responsive to the terminal voltage of at least one said winding stage to produce a sensing output which is a function of angular position of said rotatable assembly, the sensing output having a variable frequency which depends on the speed of said rotatable assembly;

means for comparing the sensing output with a first electrical level to produce a first control signal for said means for electronically commutating; and means for generating a varying second electrical level representing a varying value beginning with an initial value, for resetting the second electrical level to the initial value in response to the first control signal and for resuming the generation of the varying second electrical level which thereby depends on the frequency of the sensing output that results from the speed of the rotatable assembly, said comparing means including means for also comparing the sensing output with the second electrical level to produce a second control signal for said means for electronically commutating.

138. An electronically commutated motor system comprising:

an electronically commutated motor having a rotatable assembly and further having a stationary assembly with a plurality of winding stages;

switching means for commutating said winding stages in a preselected sequence to rotate said rotatable assembly;

shift register means having a serial input, a set of parallel inputs, a control input to select the serial input or parallel inputs for entry, and outputs for supplying a parallel digital signal representing a commutation in the sequence, said switching means responsive to the outputs and said shift register means to be protected from electrical interference which could cause the outputs to supply a parallel digital signal unrepresentative of any commutation in the sequence;

means for supplying a parallel digital signal representing a particular commutation in the sequence to the set of parallel inputs of said shift register means; and means for clocking said shift register means to cause its outputs to supply a parallel digital signal representing a commutation in the sequence, said control input of said shift register means connected to respond to at least one of the outputs and said serial input connected to respond to at least one of the outputs so that if any unrepresentative parallel digital signal appears which does not represent any commutation in the sequence at the outputs of said shift register means, the unrepresentative parallel digital signal is replaced by another parallel digital signal representing a commutation in the sequence when said means for clocking next clocks said shift register means.

139. An electronically commutated motor system comprising:

an electronically commutated motor having a rotatable assembly and further having a stationary assembly with a plurality of winding stages;

position sensing means for repeatedly generating a sensing signal generally representative of rotation of said rotatable assembly;

commutating means responsive to the sensing signal for commutating said winding stages in a preselected sequence to energize said winding stages and thereby rotate said rotatable assembly;

oscillator means for producing oscillator pulses;

means for frequency dividing the oscillator pulses to supply lower frequency pulses, said means for frequency dividing having a reset input for repeated resetting by the sensing signal from said position sensing means, so that when said rotatable assembly is turning at least as fast as a predetermined spin rate the sensing signal is generated at a repetition rate for resetting that prevents the lower frequency pulses from being supplied and otherwise allows the lower frequency pulses to be supplied when the sensing signal occurs at a lower repetition rate;

means responsive to the lower frequency pulses when they occur for producing an electrical signal generally representing an accumulated number of the lower frequency pulses; and means for supplying a disabling signal for a predetermined period of time to said commutating means after a predetermined value is reached by the electrical signal, to prevent continued energization of the motor during that predetermined period of time.

140. An electronically commutated motor system for use with a power source having a source voltage which is supposed to be in a range between a lower voltage limit and a higher voltage limit, the system comprising:

an electronically commutated motor having a rotatable assembly and further having a stationary assembly with a plurality of winding stages;

position sensing means for repeatedly generating a sensing signal generally representative of rotation of said rotatable assembly;

commutating means responsive to the sensing signal for commutating said winding stages in a preselected sequence to energize said winding stages and thereby rotate said rotatable assembly;

first means for deriving a first voltage source voltage as a first function of the source voltage;

second means for deriving a second voltage from the source voltage as a second function of the source voltage, wherein the second voltage is equal to the first voltage only at the lower voltage limit and the higher voltage limit; and means, connected to said first and second means for deriving, for comparing the first and second voltages to produce a disabling signal for said commutating means when the source voltage is outside the range.

141. An electronically commutated motor system for use with a voltage source and with alternative external control devices for desired speed, and comprising:

an electronically commutated motor having a rotatable assembly and further having a stationary assembly with a plurality of winding stages for energization;

switching means for applying a voltage from a voltage source to one or more of said winding stages at a time and commutating said winding stages in a preselected sequence to rotate said rotatable assembly at a speed dependent on the energization applied to said winding stages;

means for generating pulse width modulated pulses to control said switching means, the pulses modulated in width as a function of an analog speed control signal; and means for supplying the analog speed control signal to said means for generating the pulse width modulated pulses, said means for supplying including a capacitor and active device circuit means having an input resistively connected to a terminal for the voltage source, said input also for connection to any of the external control devices, and an output resistively connected to said capacitor so that said capacitor develops the analog speed control signal when the input of said active device circuit means is connected to any of the following external control devices: A) pulse generator with variable duty cycle representative of desired speed, B) variable voltage source representative of desired speed, or C) variable resistance representative of desired speed.

142. An electronically commutated motor system comprising:

an electronically commutated motor having a rotatable assembly and further having a stationary assembly with a plurality of winding stages;

solid state switching means for applying a source voltage to one or more of said winding stages at a time, said solid state switching means having a saturation voltage depending on current flowing through them when conducting;

commutating means for generating commutation pulses in a preselected sequence to make said solid state switching means conduct and commutate said winding stages in the preselected sequence to rotate said rotatable assembly, the repetition rate of the commutation pulses being related to the speed of said rotatable assembly;

means responsive to said commutation pulses for supplying a variable electrical level which varies in magnitude as a function of the repetition rate of the commutation pulses, the electrical level representing a current limit for said motor as a function of motor speed; and means for producing a disabling signal for said commutating means when the saturation voltage across said solid state switching means exceeds the variable electrical level in magnitude whereby current for said motor is limited as a function of motor speed.

143. A method of operating a control circuit for an electronically commutated motor having a rotatable assembly and further having a stationary assembly with a plurality of winding stages having terminals for energization, and switching means for applying a voltage to one or more of the terminals of the winding stages at a time and commutating the winding stages in a preselected sequence to rotate the rotatable assembly, leaving a preselected sequence of winding stages correspondingly unpowered so that a plurality of the winding stages are unpowered at some time, wherein the winding stages generate back emf signals and also couple electrical signals from each energized winding stage to the unpowered winding stages which signals can interfere with detection of back emf for position sensing purposes, the method comprising the steps of:

selecting at least two of the unpowered winding stages which have electrical signals coupled to them that have a predetermined relationship in polarity and magnitude; and producing an electrical output from the voltages on the winding stage terminals of the winding stages selected, so that the electrical signals coupled from each energized winding stage are substantially canceled when they have the predetermined relationship while the back emf is preserved for position sensing substantially free from interference from the electrical signals that are coupled from each energized winding stage to the unpowered winding stages.

* * * * *